United States Patent
Yamaguchi et al.

[11] Patent Number: 6,053,444
[45] Date of Patent: Apr. 25, 2000

[54] FISHLINE GUIDE DEVICE FOR DOUBLE BEARING TYPE REEL

[75] Inventors: Nobuyuki Yamaguchi; Mikiharu Kobayashi; Hiroshi Toma; Masayoshi Ishikawa, all of Tokyo, Japan

[73] Assignee: Diawa Seiko, Inc., Tokyo, Japan

[21] Appl. No.: 09/042,632

[22] Filed: Mar. 17, 1998

[30] Foreign Application Priority Data

| Mar. 18, 1997 | [JP] | Japan | 9-084388 |
| Jul. 23, 1997 | [JP] | Japan | 9-212451 |
| Sep. 5, 1997 | [JP] | Japan | 9-256169 |
| Sep. 25, 1997 | [JP] | Japan | 9-260380 |

[51] Int. Cl.[7] .............................. A01K 89/00
[52] U.S. Cl. .................. 242/280; 242/275; 242/281
[58] Field of Search .................. 242/273, 274, 242/279, 280, 281, 275

[56] References Cited

U.S. PATENT DOCUMENTS

| 1,862,682 | 6/1932 | Kautzky . | |
| 2,057,178 | 10/1936 | Balz | 242/279 X |
| 2,160,175 | 5/1939 | Shakespeare, Jr. | 242/279 |
| 2,310,654 | 2/1943 | Sanborn . | |
| 2,564,086 | 8/1951 | Von Beck . | |
| 2,639,870 | 5/1953 | Graham . | |
| 2,652,212 | 9/1953 | Holahan, Jr. | 242/279 |
| 2,927,745 | 3/1960 | Shook . | |
| 3,171,609 | 3/1965 | Baenzinger . | |
| 3,237,900 | 3/1966 | Odom . | |
| 4,799,628 | 1/1989 | Watanabe et al. | 242/280 X |
| 5,127,600 | 7/1992 | Ikuta | 242/280 |

FOREIGN PATENT DOCUMENTS

| 2347879 | 11/1977 | France . |
| 671216 | 2/1939 | Germany . |
| 57-14178 | of 1982 | Japan . |
| 59-50269 | of 1984 | Japan . |
| 60-15165 | of 1985 | Japan . |
| 62-062967 | of 1987 | Japan . |
| 62-16277 | of 1987 | Japan . |

*Primary Examiner*—Donald P. Walsh
*Assistant Examiner*—Emmanuel M. Marcelo
*Attorney, Agent, or Firm*—Liniak, Berenato, Longacre & White

[57] ABSTRACT

A double bearing type reel includes: a reel main body having a pair of side plates; a spool rotatably supported between the side plates; and a fishline guide device reciprocatingly provided between the side plates extending in front of the spool, said fishline guide device winding a fishline parallel around the spool. The fishline guide device includes a fishline guide portion having a lower portion which guides the fishline in a fishline take-up state and an upper portion which guides the fishline in a fishline play-out state. The upper portion is larger in width than the lower portion. The fishline guide device may have a pair of arm portions movably supported to the side plates by outer ends thereof.

22 Claims, 39 Drawing Sheets

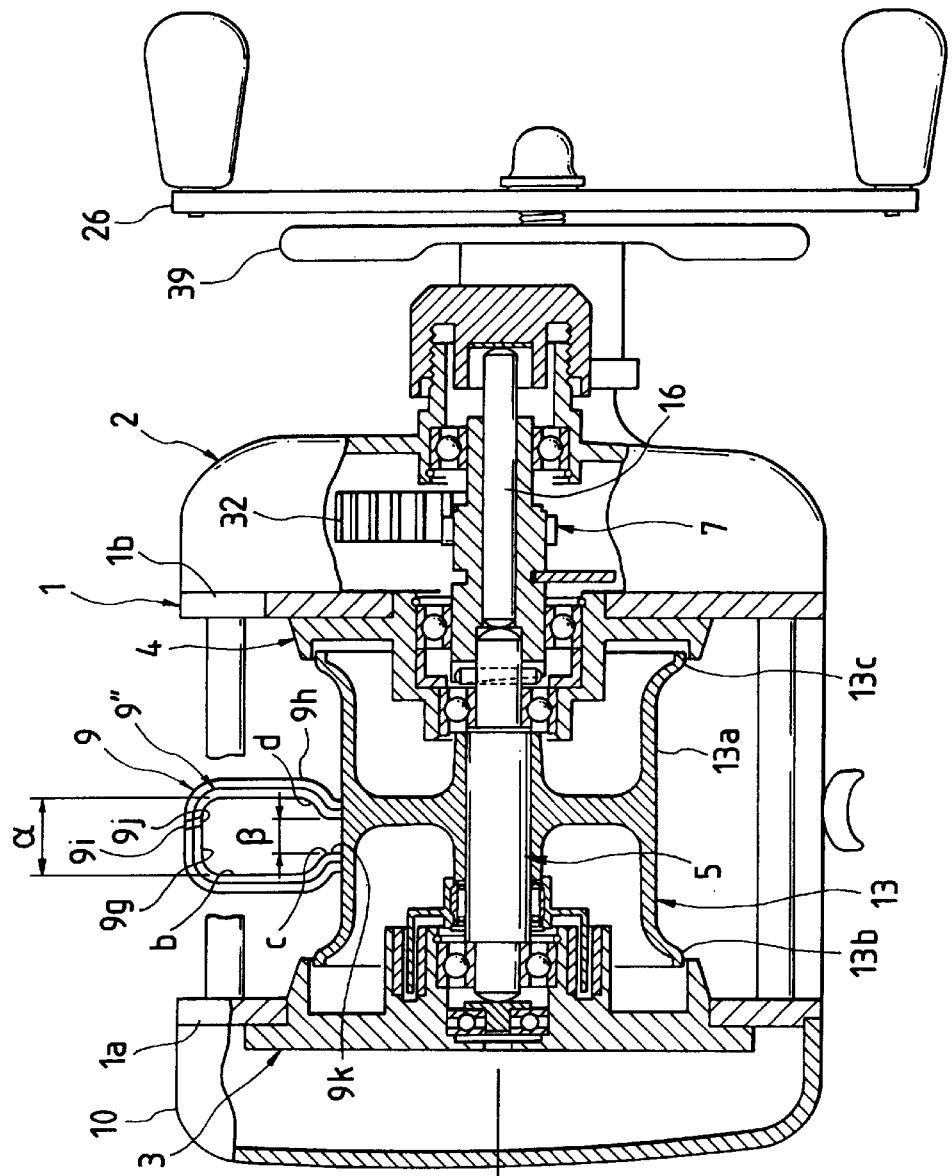
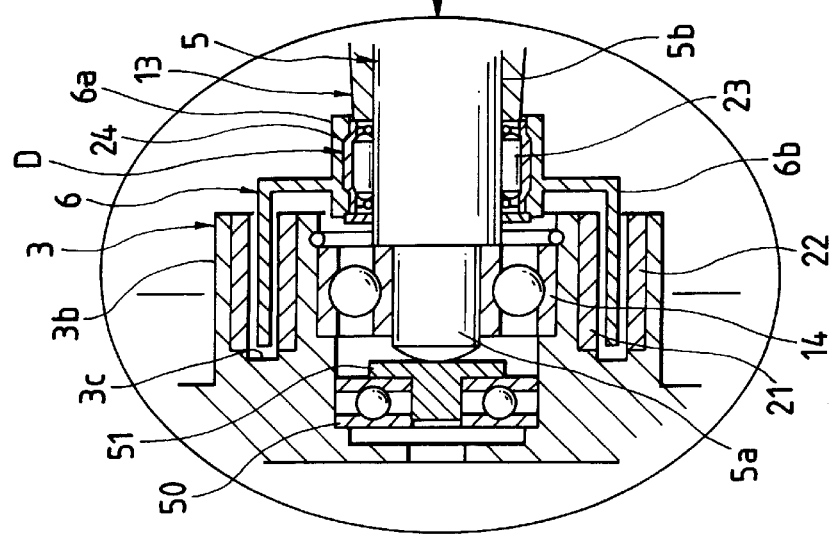
FIG. 9A
FIG. 9B

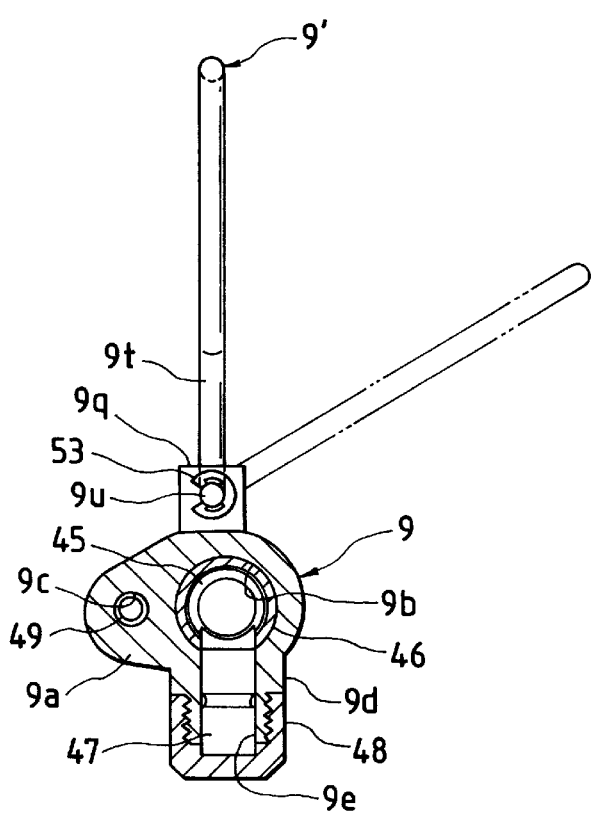
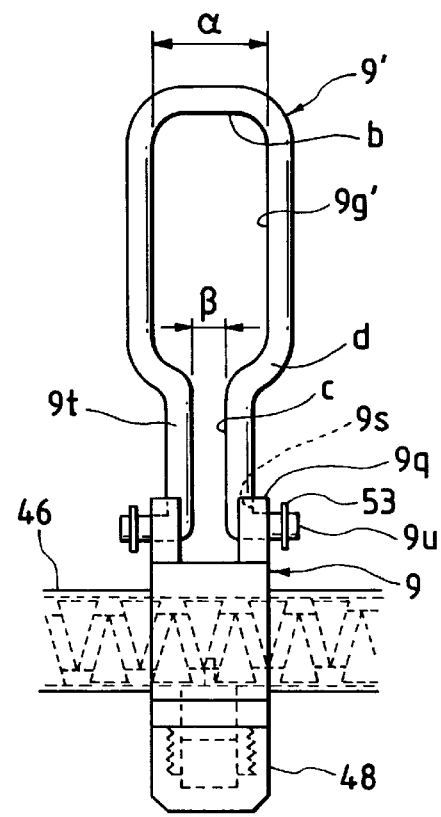
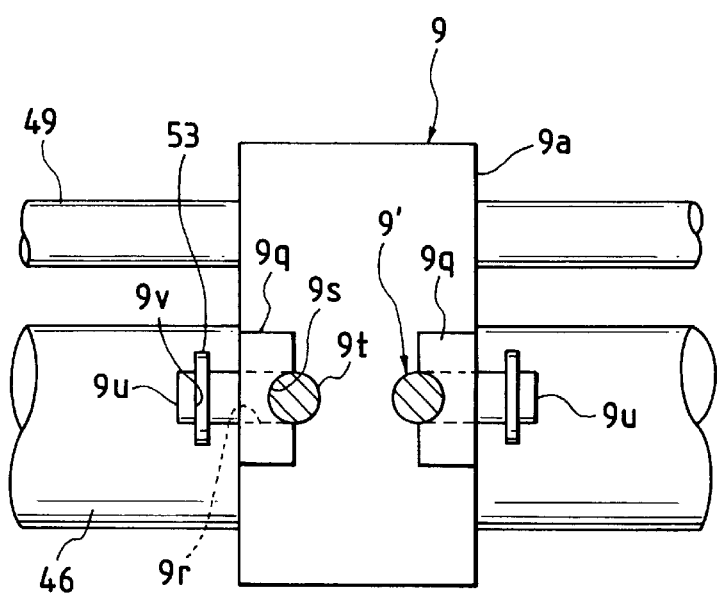

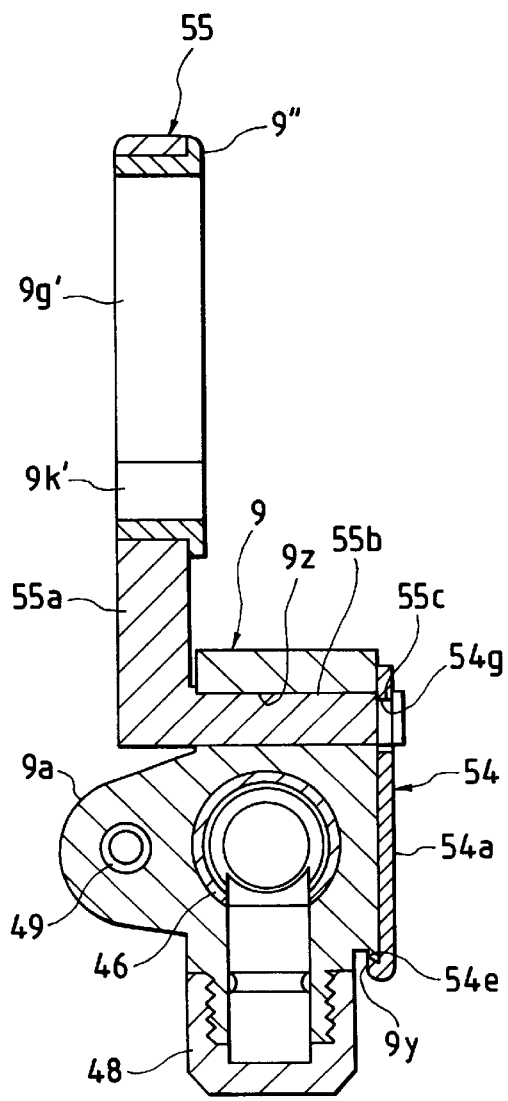
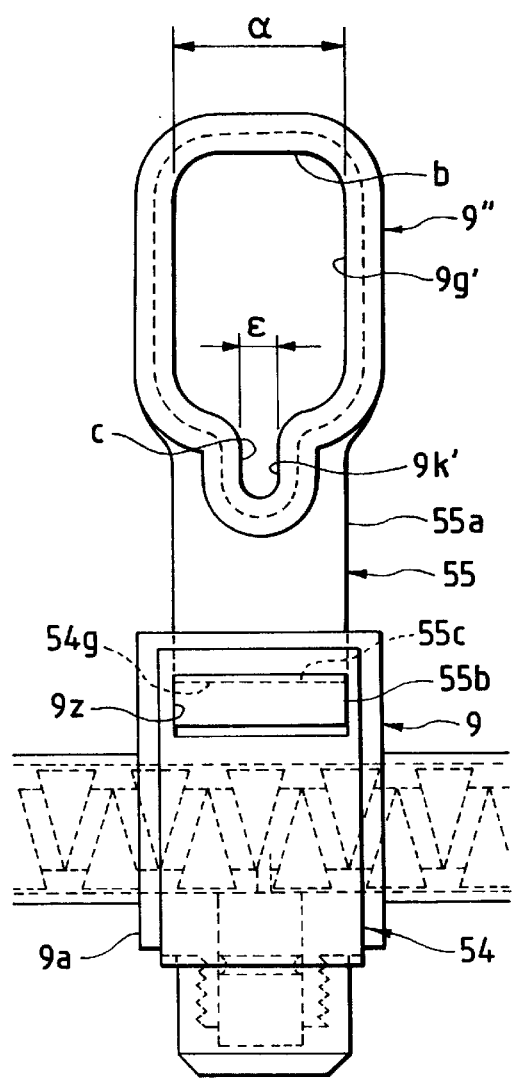
FIG. 23A
FIG. 23B

FISHLINE GUIDE DEVICE FOR DOUBLE BEARING TYPE REEL

BACKGROUND OF THE INVENTION

1. Field of the Invention

The present invention relates to a fishline guide device for a double bearing type fishing reel, which is structured such that it takes up a fishline parallel around a spool.

2. Description of the Related Art

Conventionally, as disclosed in Japanese Utility Model Unexamined Publications Nos. 57-141768 of Showa, 59-50269 of Showa, 62-162967 of Showa, there is generally known a fishing reel including a fishline guide device which is used to wind a fishline parallel around a spool rotatably supported between the two side plates of a reel main body.

Each of the conventional fishline guide devices includes a fishline guide portion, while the fishline guide portion is normally formed in a round shape or in an elliptical shape being narrow in width because it must have a function to wind a fishline parallel around a spool being large in width.

As shown in FIG. 48A, a fishline 318, which is played out from a spool 313 in a fishline play-out operation, is played out forwardly while spreading out upwardly like a δ manner, that is, more widely than the winding diameter of the fishline around the spool due to the relationship between a velocity at which the terminal tackles (such as a sinker, a lure and the like) of the fishing reel pull the fishline and a centrifugal force which is applied to the fishline when the spool is rotated.

Also, as shown in FIG. 48B, since the fishline is caused to spread out right and left by an amount equivalent to the width of the spool 313 according to a diagonal angle formed due to a width difference between the fishline guide portion 352 of a fishline guide device B' and the spool 313, there is a possibility that there can be produced a difference between the play-out position of the fishline wound around the spool and the fishline guide portion.

On the other hand, if the whole transverse width of the fishline guide portion is increased, then the winding condition of the fishline is worsened.

As described above, in an actual fishing operation, in more particular, in the fishline play-out operation thereof, due to the influences as shown in FIGS. 48A and 48B, the fishline is contacted with the fishline guide portion to thereby receive resistance therefrom. This lowers the casting distance of the terminal tackles and, at the same time, because the fishline receives an unnecessary friction resistance, there is a possibility that the fishline can be damaged or the life of the fishline can be reduced.

In addition, in order to do away with the inconveniences found in the above-mentioned conventional double bearing type reel when the fishline is played out, as disclosed in Japanese Utility Model Unexamined Publications Nos. 60-15165 of Showa and 62-16277 of Showa, there is known a technique in which a fishline guide member including a fishline guide hole which is open in the upper portion thereof is fallen down forwardly when a fishline is played out, thereby preventing the fishline from receiving a contact resistance from the inner peripheral surface of the fishline guide hole.

However, in the technique disclosed in the above-mentioned Japanese Utility Model Publication No. 60-15165 of Showa, when taking up the fishline after it is played out, it is difficult to position the right and left moving fishline just in the opening of the fishline guide member and lead the fishline into the fishline guide hole of the fishline guide member. Therefore, an angler must pick up the fishline and insert it into the fishline guide hole each time the fishline is taken up; that is, it is troublesome to operate a fishing reel using the present technique.

Further, in the technique disclosed in the above-mentioned Japanese Utility Model No. 62-16277 of Showa, a fishline guide member, which includes an opening guide portion in the central portion thereof and has a substantially mushroom-like shape, is connected with a brake plate including a substantially trapezoidal-shaped window; that is, the fishline induction portion of the fishline guide member is complicated in structure, and, when a tensile force is applied to the fishline, the fishline is induced upwardly with a friction resistance. With use of this technique, the fishline cannot be guided to the opening guide portion of the fishline guide member with ease, and the fishline can be twined easily.

Although the above fishline guide devices are respectively structured such that, when the fishline is played out, the fishline is prevented from receiving the contact resistance from the fishline guide member, they are not able to carry out smoothly a series of fishing operations which are switched from the fishline play-out operation over to the fishline take-up operation and, at the same time, they are complicated in structure.

SUMMARY OF THE INVENTION

In view of the above circumstances, it is an object of the invention to provide a fishline guide device which not only can reduce the resistance of a fishline due to a fishline insertion portion when the fishline is played out, but also can carry out a fishline take-up operation smoothly and quickly.

To solve the above object, there is a double bearing type reel including: a reel main body having a pair of side plates; a spool rotatably supported between the side plates; and a fishline guide device reciprocatingly provided between the side plates extending in front of the spool, the fishline guide device winding a fishline parallel around the spool. The fishline guide device includes a fishline guide portion defining a fishline guide hole having a lower portion which guides the fishline in a fishline take-up state and an upper portion which guides the fishline in a fishline play-out state. The upper portion is larger in width than the lower portion.

Further, there is also provided a double bearing type reel including; a reel main body having a pair of side plates; a spool rotatably supported between the side plates; and a fishline guide device reciprocatingly provided between the side plates extending in front of the spool, the fishline guide device winding a fishline parallel around the spool. The fishline guide device includes a fishline guide portion opened upwardly and having a substantially U-shaped, and a pair of arm portions extending outwardly of the fishline guide portion, outer ends of the arm portions movably supported to the side plates respectively.

Further, there is provided a double bearing type reel including: a reel main body having a pair of side plates; a spool rotatably supported between the side plates; and a fishline guide device reciprocatingly provided between the side plates extending in front of the spool, the fishline guide device winding a fishline parallel around the spool. The fishline guide device includes a fishline guide portion guiding the fishline right and left in a fishline take-up state, and an induction portion inducing the fishline released from the fishline guide portion in a fishline play-out state, to the fishline guide portion when switching from the fishline play-out state to the fishline take-up state.

BRIEF DESCRIPTION OF THE DRAWINGS

Similar reference characters denote corresponding features consistently throughout the attached drawings. The preferred embodiments of the invention will be descried in detail, with reference to the following figures, wherein:

FIG. 9A is a partially sectional back view of the double bearing type reel shown in FIG. 7;

FIG. 9B is a partially enlarged sectional back view of FIG. 9A

FIG. 19A is an enlarged sectional side view of a fishline guide device according to the fourth embodiment;

FIG. 19B is an enlarged front view of the fishline guide device according to the fourth embodiment;

FIG. 20 is an enlarged sectional plan view of the main portions of the fishline guide device according to the fourth embodiment;

FIG. 23A is an enlarged sectional side view of a fishline guide device according to a seventh embodiment of the invention;

FIG. 23B is an enlarged back view of the fishline guide device according to the seventh embodiment of the invention;

BRIEF DESCRIPTION OF THE PREFERRED EMBODIMENTS

Now, description will be given below in detail of the present invention by means of the embodiments thereof respectively shown in the accompanying drawings.

Figure 1:
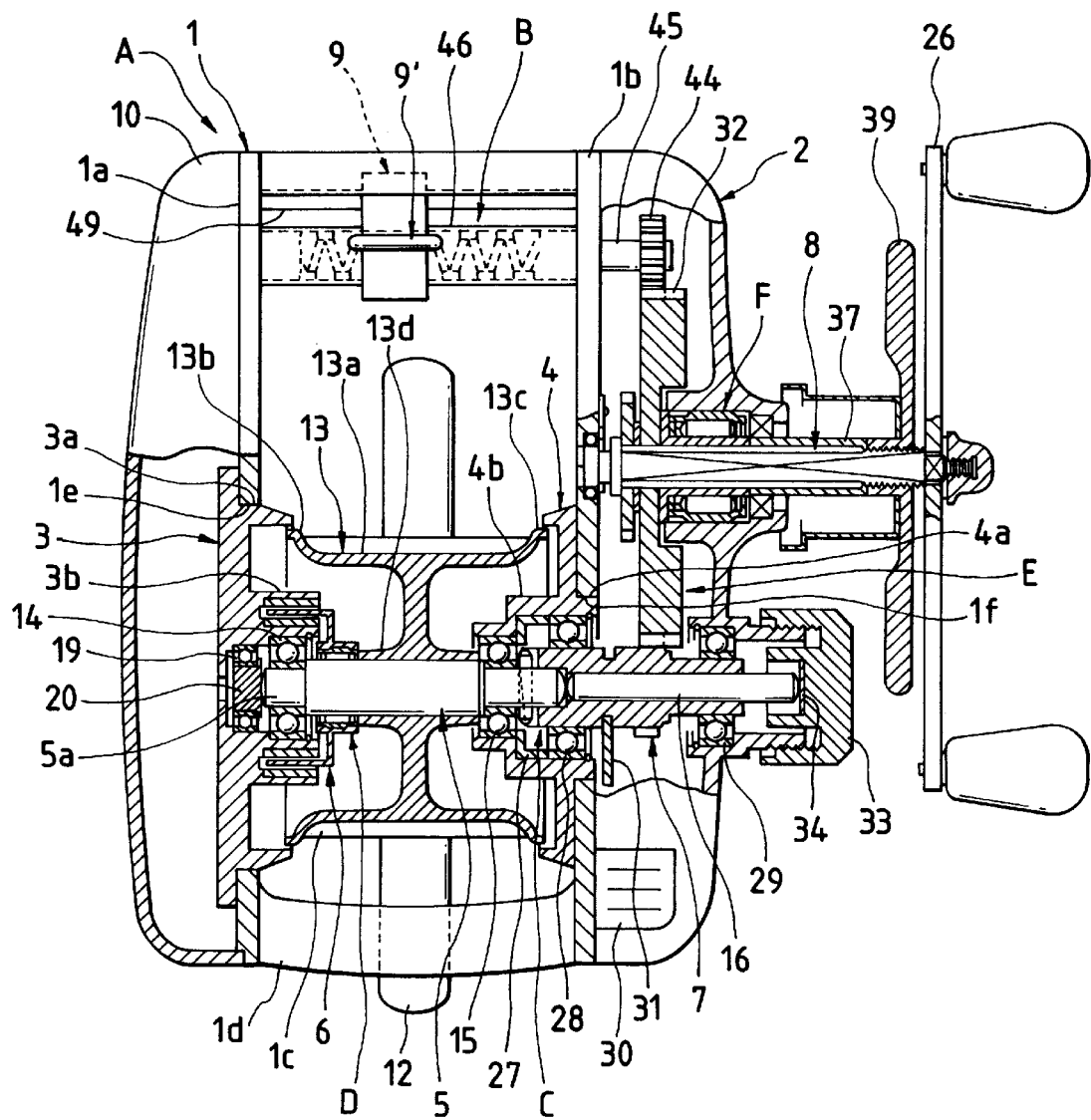
FIG. 1 is a partially sectional plan view of a double bearing type reel to which a first embodiment of a fishline guide device according to the invention is applied.
Figure 2:
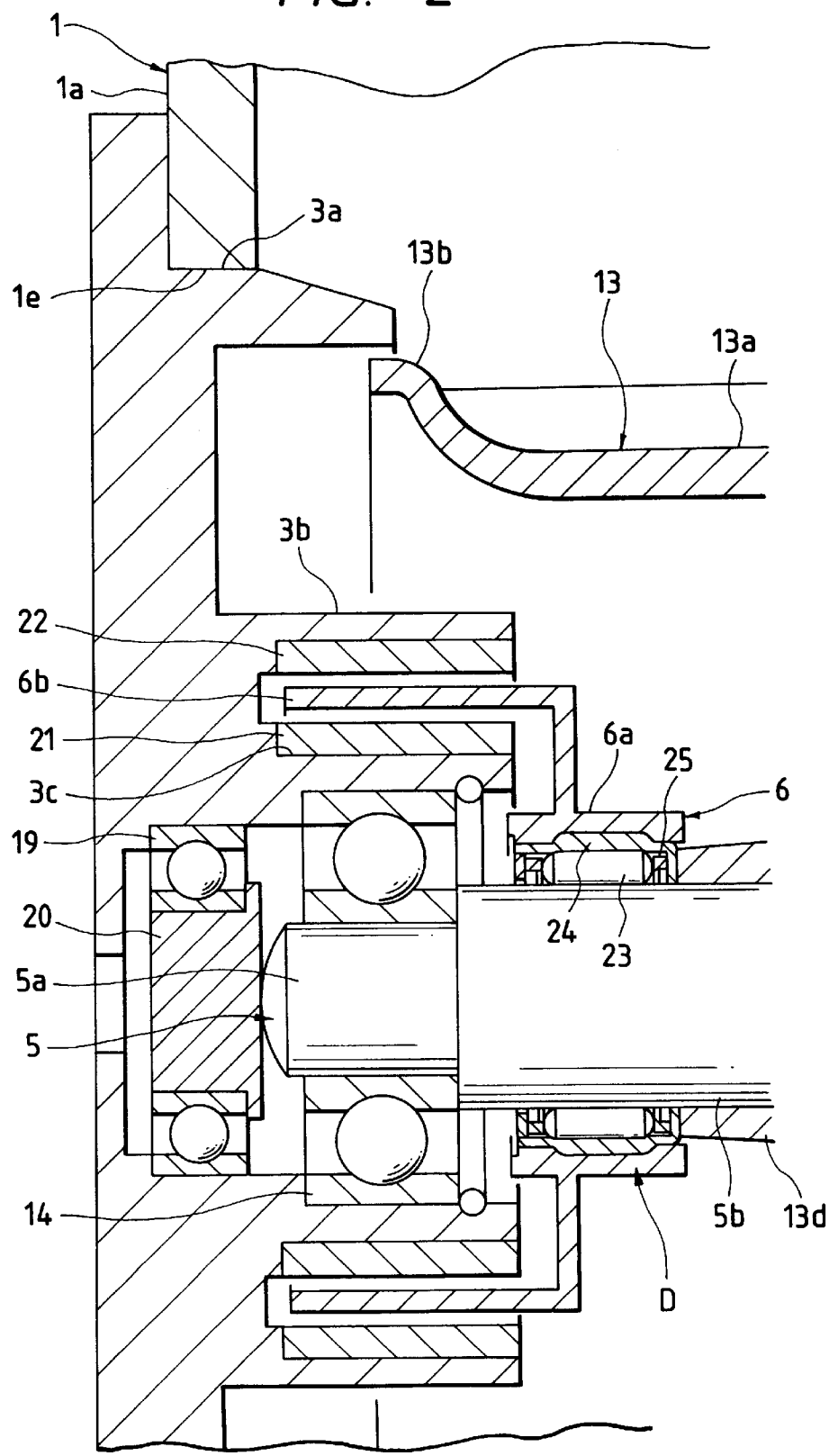
FIG. 2 is an enlarged sectional plan view of a spool shaft support mechanism disposed in the double bearing type reel on the opposite side of a handle.
Figure 3:
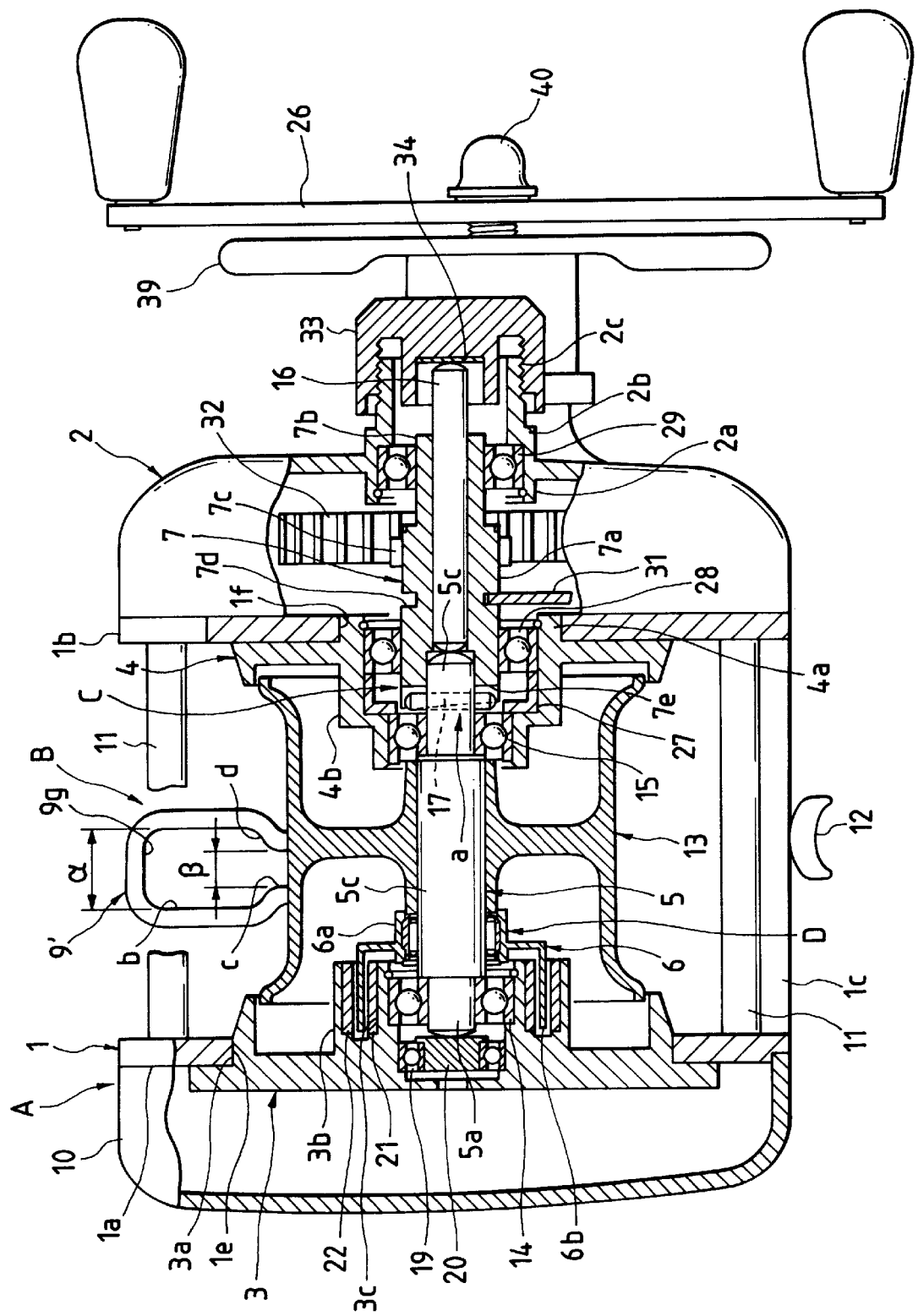
FIG. 3 is a partially sectional back view of the double bearing type reel.
Figure 4:
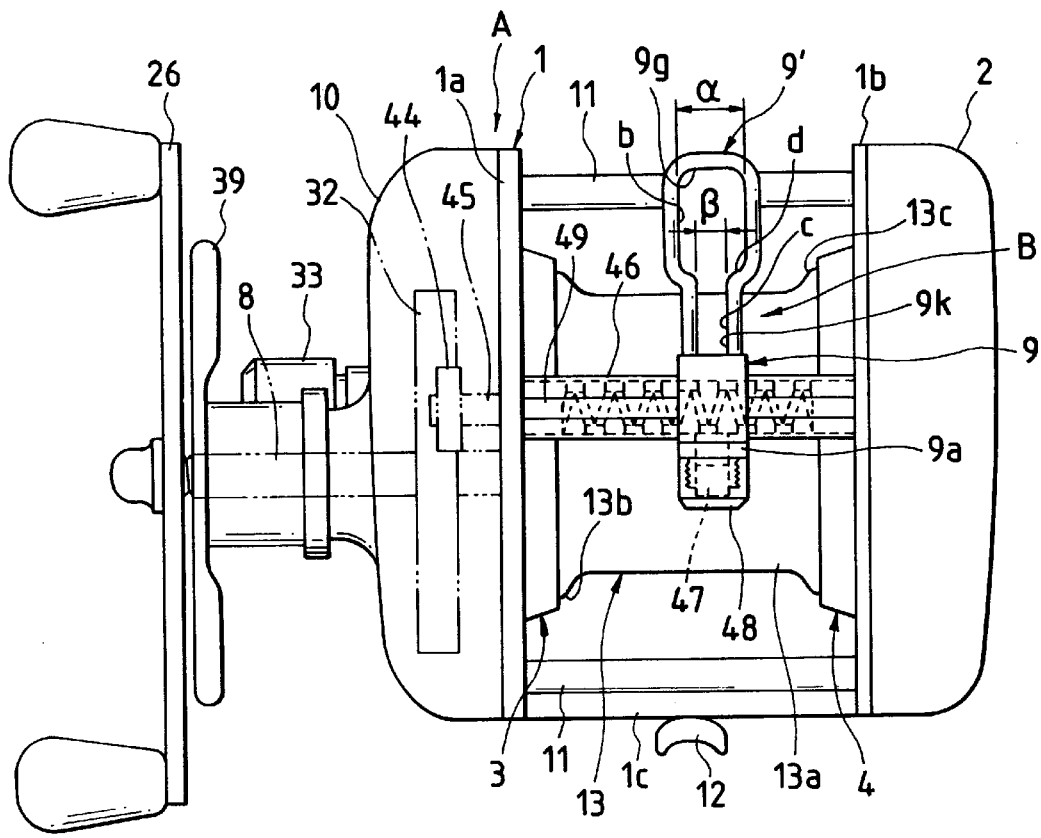
FIG. 4 is a front view of the double bearing type reel.
Figure 5:
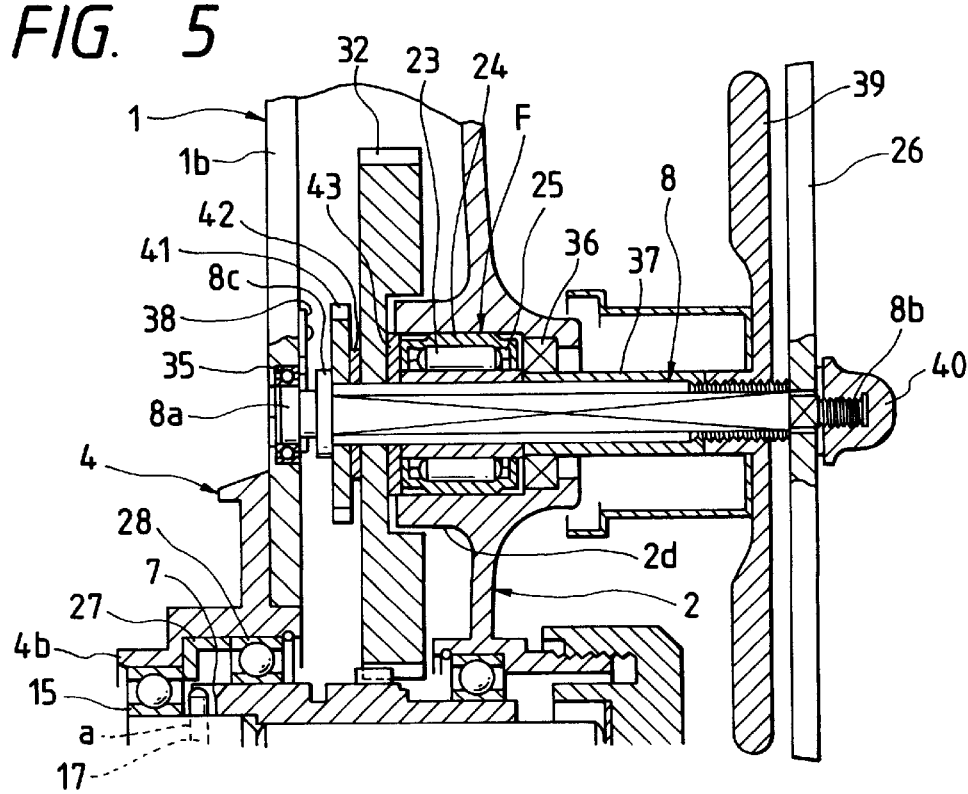
FIG. 5 is an enlarged sectional plan view of the drive mechanism side of the double bearing type reel.
Figure 6:
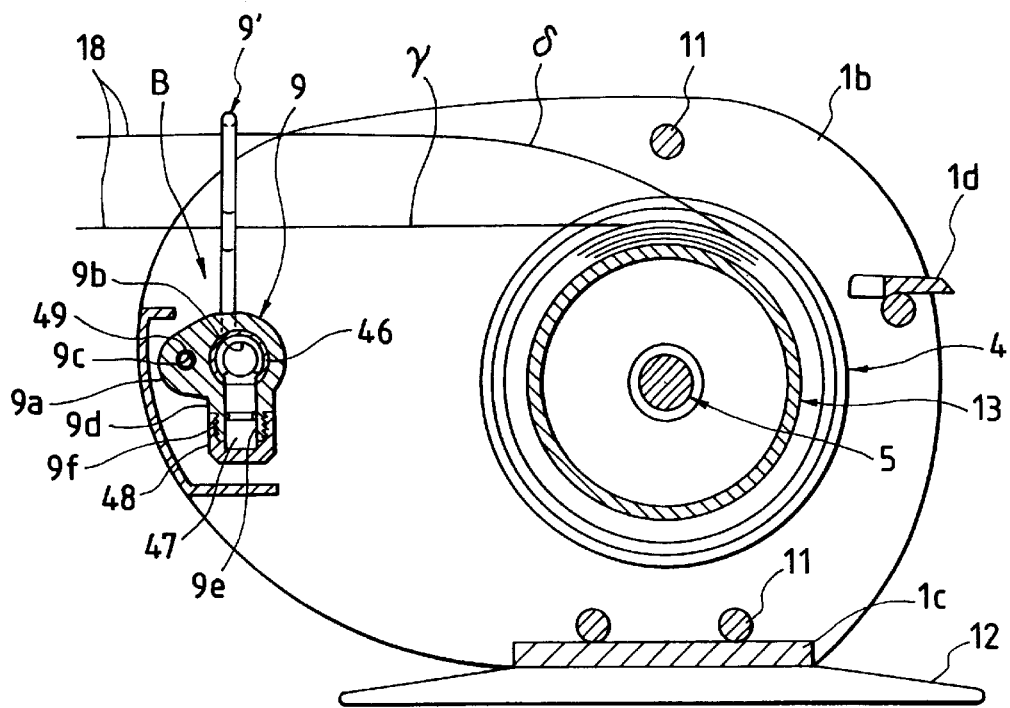
FIG. 6 is a sectional side view of the side frame inner side of the double bearing type reel.

At first, in FIGS. 1 to 6, there is shown a first embodiment of a fishline guide device according to the invention which is applied to a fishing reel. In particular, FIG. 1 is a partially sectional plan view of a fishing reel, FIG. 2 is an enlarged sectional plan view of a spool shaft support mechanism provided on the opposite side of a handle mounted in the fishing reel, FIG. 3 is a partially sectional back view of the fishing reel, FIG. 4 is a front view of the fishing reel, FIG. 5 is an enlarged sectional plan view of the drive mechanism side of the fishing reel, and FIG. 6 is a sectional side view of the side frame inner side of the fishing reel.

A reel main body A comprises a side frame 1, a left side plate 10 mounted on the left and right side frame members 1a, 1b, and a right side plate 2.

The left and right side frame members 1a and 1b of the side frame 1 are formed integrally with each other through a plurality of pillars 11, a fixing plate 1c for fixing a reel leg 12, and a finger placement rod 1d, while the left and right side frame members 1a and 1b of are held in parallel to each other.

Spool covers 3 and 4 are respectively mounted on the two side frame members 1a and 1b by screws (not shown).

A spool 13 is rotatably supported between the two side frame members 1a and 1b and is fixed to a spool shaft 5. The spool shaft 5 is rotatably carried by one radial bearing 14 mounted on the spool cover 3 and the other radial bearing 15 mounted on the spool cover 4.

A fishline guide device B is interposed between the two left and right side frame members 1a and 1b on the fishline play-out direction side of the spool 13.

The spool 13 includes a fishline winding barrel portion 13a, one side flange 13b, the other side flange 13c, and a center shaft portion 13d.

The spool shaft 5 includes a small diameter portion 5a to be carried by the bearing 14, a large diameter portion 5b to which the spool 13 can be fixed, a small-diameter outwardly extending end portion 5c which is to be carried by the bearing 15 and is projected out toward the pinion 7 side, while one side portion of a pressure shaft rod 16 is in contact with the end portion of the outwardly extending end portion 5c.

A fitting protrusion 17, which is a pin and constitutes a clutch mechanism, is fixed in the small-diameter outwardly extending end portion 5c.

The spool 13 includes in the center shaft portion a central hole which is fitted with and fixed to the large diameter portion 5b of the spool shaft 5.

The fishline 18 is to be wound around the outer peripheral fishline winding barrel portion 13a of the spool 13.

The spool cover 3 includes a cover portion 3a and the outside outer peripheral portion of the cover portion 3a is removably fitted into a through hole 1e formed in the side frame member 1a, while the spool cover 3 is mounted on the outside of the side frame member 1a by a screw (not shown).

The spool cover 3 includes a cylindrical portion 3b disposed in the inside central portion thereof, the interior portion of the cylindrical portion 3b is composed of two-stage recessed portions, while the bearing 14 and radial bearing 19 are respectively mounted on the two-stage recessed portions.

A thrust bearing plate 20 is supported by the bearing 19, while the small diameter portion 5a of the spool shaft 5 is in contact with the thrust bearing plate 20.

The cylindrical portion 3b includes a circumferential groove 3c, while two magnets 21 and 22 are fixed to the interior portions of the upper and lower peripheral surfaces of the circumferential groove 3c in such a manner that they are opposed to each other at a given distance.

A plurality of bar-like rolling members 23, which are provided in a rolling type of one-way clutch D, are rotatably carried on the outer periphery of the end portions of the large diameter portion 5b of the spool shaft 5, while the shaft cylindrical portion 6a of a magnetic brake 6 is fixed to the outside of an outer wheel 24 which is included in the one-way clutch D.

The magnetic brake member 6 includes the shaft cylindrical portion 6a and a cylindrical portion 6b having a large diameter, while the large-diameter cylindrical portion 6b is inserted into between the two magnets 21 and 22.

The one-way clutch D of a rolling type is composed of the plurality of bar-like rolling members 23, the outer wheel 24, a hold body 25 formed of synthetic resin, and a spring (not shown). If a handle 26 is rotated in a direction where the fishline 18 is wound around the spool 13, then the magnetic brake member 6 is prevented against rotation, that is, it is not rotated integrally with the spool 13, and, on the other hand, if the fishline 18 is played out and the spool shaft 5 is rotated in the opposite direction, then the magnetic brake member 6 can be rotated integrally with the spool 13.

The spool cover 4 includes a cylindrical portion 4a in the outer center portion thereof, while the cylindrical portion 4a is fitted into and fixed to a through hole 1f formed in the side frame member 1b.

The spool cover 4 also includes in the inner center portion thereof, a cylindrical portion 4b and a cylindrical portion 4c which are formed integrally with each other in a stepwise manner.

The bearing 15 is removably fitted into the interior portion of the cylindrical portion 4b, whereas a cylindrical-shaped spacer 27 and a radial bearing 28 are mounted on the interior portion of the cylindrical portion 4c located on the right side of the cylindrical portion 4b, so that the spool cover 4 is prevented against removal.

The large-diameter shaft cylinder 7a of the pinion 7 is installed on the radial bearing 28 mounted on the spool cover 4 and a radial bearing 29 is mounted on the right side plate 2, while the small-diameter shaft cylinder 7b of the pinion 7 is carried on the radial bearing 29 in such a manner it can be rotated and can be moved in the axial direction thereof.

The pressure shaft rod 16 is fitted into the center hole of the pinion 7 in such a manner that it can be moved in the axial direction thereof.

The pinion 7 includes a pinion tooth 7c and a peripheral groove 7d which are respectively formed in the outer periphery of the large-diameter shaft cylinder 7a of the pinion 7.

In the one side end face a of the large-diameter shaft cylinder 7a of the pinion 7, there is formed a cut groove 7e constituting a clutch mechanism C in such a manner that it extends at right angles to the axis of the pinion 7.

The engaging projection 17 of the spool shaft 5 and the cut groove 7e of the pinion 7 can be engaged with and disengaged from each other when an operation plate 31 is operated by a clutch operation lever 30, while the operation plate 31 is engaged with the peripheral groove 7d of the pinion 7.

A drive gear 32 fitted with a drive shaft 8 is meshingly engaged with the pinion tooth 7c of the pinion 7, thereby forming a drive mechanism E.

Inside the right side plate 2, there is formed a shaft cylinder portion 2a in such a manner that it projects out inwardly of the right side plate 2, while the radial bearing 29 is mounted on the shaft cylinder portion 2a; and, outside the radial bearing 29, there is projectingly formed a shaft cylinder portion 2b, while a screw portion 2c is formed in the outer periphery of the shaft cylinder portion 2b.

The inside portion of the outer cylinder portion of an adjust knob 33 is threadedly engaged with the outer periphery screw portion 2c of the shaft cylinder portion 2b.

A thrust bearing 34 is mounted on the inner cylinder portion of the adjust knob 33, while the other side of the pressure shaft rod 16 is in contact with the thrust bearing 34.

The drive shaft 8 is carried through a collar 37 not only by a radial bearing 35 provided in the right side frame member 1b but also by a metal bearing portion 36 mounted on the side plate 2, and the one end flange portion 8a of the drive shaft 8 on the radial bearing 35 side thereof is prevented against removal by a stop plate 38.

The collar 37 is fitted with the outer periphery of the drive shaft 8 in such a manner that it is prevented against rotation.

A drag adjust knob 39 is threadedly engaged with the outer peripheral portion of the drive shaft 8 located outside the metal bearing portion 36, the cylinder portion of the drag adjust knob 39 is contacted with the collar 37, and the handle 26 is mounted on the other end 8b of the drive shaft 8 by a nut 40.

A clutch reversing gear 41 is fitted with the drive shaft 8 in a rotation preventive manner and is thereby contacted with the flange portion 8c of the drive shaft 8; and, between the clutch reversing gear 41 and collar 37, there are fitted a friction plate 42, a drive gear 32 and a friction plate 43.

By the way, in a clutch-off state where the engaging projection 17 of the spool shaft 5 is disengaged from the cut groove 7e of the pinion 7, the spool is free to rotate; and, in a clutch-on state where the engaging projection 17 is engaged with the cut groove 7e, the spool is prevented against rotation. Referring here to the structure in which the clutch-off state is switched over to the clutch-on state, when the handle 26 is rotated in a direction where the fishline 18 is wound around the outer periphery of the fishline winding barrel portion of the spool 13, the operation plate 31 held at its disengaged position is moved to its engaged position by the clutch reversing gear 41 so that the engaging projection 17 is brought into engagement with the cut groove 7e.

The side plate 2 includes, in the portion thereof that is located inside the metal bearing portion 36, a cylinder support portion 2d which is formed of a recessed portion, while the outer wheel 24 of a one-way clutch F of a rolling type is fitted into the cylinder support portion 2d in such a manner that it is prevented against rotation.

The one-way clutch F is substantially identical in shape with the above-mentioned one-way clutch D of a rolling type, whereby the handle 26 can be rotated in a direction where the fishline 18 is wound around the spool 13 and the handle 26 is prevented against rotation in the opposite direction.

A gear 44 is in meshing engagement with the drive gear 32.

A traverse cam shaft 45 included in the fishline guide device B is mounted on the gear 44.

The fishline guide device B includes a guide cylinder 46, a fishline guide body 9 which is used to slide right and left around the outer periphery of the guide cylinder 46, the above-mentioned traverse cam shaft 45 that is fixed to the two end portions of the guide cylinder 46 and is carried by a bearing (not shown), an engaging member 47 which is stored within the fishline guide body 9 and can be engaged with a traverse cam groove formed in the traverse cam shaft 45, a cap 48 for holding the engaging member 47 in a removal preventive manner, and a fishline guide portion 9' which is formed of a wire member fixed to the upper portion of the fishline guide body 9.

On the front side of the guide cylinder 46, there is provided a guide rod 49; that is, the fishline guide body 9 can be moved and guided in the longitudinal direction thereof along the guide cylinder 46 and guide rod 49.

The fishline guide body 9 includes a main body 9a which can be fitted with the outer periphery of the guide cylinder 46, a through hole 9b which is opened up in the main body 9a and into which the guide cylinder 46 can be fitted, a through hole 9c which is opened up in the main body 9a and into which the guide rod 49 can be fitted, a projecting portion 9d which projects out downwardly from the main body 9a, a through hole 9e which is opened up in the projecting portion 9d and into which the engaging member 47 can be inserted, and a screw portion 9f which is formed in the outer periphery of the projecting portion 9d and with which the cap 48 can be threadedly engaged.

Now, referring to the shape of the fishline guide hole 9g of the fishline guide portion 9', an upper portion b thereof located upwardly of the fishline winding diameter of the outer peripheries of the flanges 13b and 13c of the spool 13 is formed as a large-width portion having a large width α, and a lower portion c thereof located downwardly of the fishline winding terminal diameter of the spool 13 (which is smaller than the outer prepheral of the flanges 13b and 13c) is formed as a small-width portion 9k having a small width β, while the upper and lower portions b and c of the fishline guide hole 9g are connected with each other by a tapered connecting portion d.

The width α of the upper portion b is set according to the diagonally winding angle of the fishline and, in particular, the larger the diagonally winding angle is, the more widely the width α of the upper portion b is set.

Now, referring to the operation of the fishing reel, in the clutch-on state in which the engaging projection 17 of the spool shaft 5 is engaged with the cut groove 7e of the pinion 7, if the handle 26 is operated in a direction where the fishline 18 is wound around the spool 13, then the drive shaft 8, collar 37, drive gear 32, pinion 7, spool shaft 5, and spool 13 are respectively rotated forwardly.

If the adjust knob 33 is rotated in order to apply a brake force to the rotation of the spool 13, then the pressure force to be applied to the end portion of the outwardly extending end portion 5c of the spool shaft 5 can be adjusted through the pressure shaft rod 16.

When the spool 13 is rotated forwardly, the magnetic brake member 6 is prevented against rotation by the one-way clutch D of a rolling type and, therefore, no brake force can be applied to the rotation of the spool shaft 5.

If the drive gear 32 is rotated, then the traverse cam shaft 45 of the fishline guide device B is rotated through the gear 44 and the fishline guide body 9 is thereby reciprocated along the guide cylinder 46, so that the fishline 18, as shown by γ in FIG. 6, is guided by the lower portion c or the small-diameter portion 9k having a width β of the fishline guide hole 9g formed in the fishline guide portion 9' and is then wound around the spool 13.

Next, referring to the reversal preventive operation of the fishing reel in the clutch-on state, if the fishline 18 wound around the spool 13 is played out because it is pulled by a catch, then the spool 13 is rotated reversely and the reversed rotation of the spool 13 rotates the drive shaft 8 and collar 37 in the reversed direction.

When the drive shaft 8 and collar 37 is rotated in the reversed direction, then the reversed rotation of thereof is stopped by the one-way clutch F of a rolling type.

In this manner, in the reversed rotation thereof, the spool 13 can be stopped quickly by the one-way clutch F of a rolling type.

After then, the spool 13 is rotated reversely against a brake force set by the drag adjust knob 39 and applied to the drive gear 32, a brake force set by the adjust knob 33 and applied to the spool shaft 5, and a brake force applied by the magnet 21 and magnetic brake member 6.

When the clutch-off state is switched over to the clutch-off state in which the spool can be freely rotated, if the operation plate 31 is operated by the clutch operation lever 30, then the pinion 7 is moved in the axial direction thereof to thereby remove the engagement of the cut groove 7e of the pinion 7 with the engaging projection 17 of the spool shaft 5.

If the fishline 18 wound around the spool 13 is played out due to the rotation of the clutch operation lever 30 while the clutch mechanism C is held in the clutch-off state, then the traverse cam shaft 45 is rotated in linking with the rotation of the spool 13 so that the fishline guide body 9 is reciprocated along the guide cylinder 46.

By the way, as known well, there can also be employed a structure in which, when the fishline is played out in the clutch-off state, the fishline guide body 9 is not reciprocated in linking with the rotation of the spool 13.

If the fishline 18 wound around the spool 13 is played out while the clutch mechanism C is held in the clutch-off state, then the fishline 18, as shown by δ in FIG. 6, is played out through the wide upper portion b having a width α of the fishline guide hole 9g formed in the fishline guide portion 9'.

As described above, if the fishline guide hole 9g of the fishline guide portion 9' is formed by the large-width upper portion b having a width α and the lower portion c being the small-width portion 9k having a width β, then, when the fishline 18 is wound around the spool 13, the fishline 18 is guided by the lower portion c being the small-width portion 9k having a width β and is then wound parallel around the spool 13; and, on the other hand, when the fishline 18 is played out from the spool 13, the fishline 18 is inserted through the large-width upper portion b having a width α, and, therefore, when the fishline spreads out in the upward direction in the fishline play-out operation, the friction resistance of the fishline 18 can be reduced, which in turn can improve the casting distance of the terminal tackles and the life of the fishline.

Also, since the upper portion b of the fishline guide hole 9g of the fishline guide portion 9' is formed wide, the fishline 18 can be inserted into the fishline guide hole 9g easily, thereby being able to enhance the efficiency of the fishline insertion operation.

With use of the fishing reel structured in the above-mentioned manner, when the fishline 18 is wound around the spool 13, the fishline 18 is guided by the lower portion c being the small-diameter portion 9k having a width β and is wound parallel around the spool 13 and, in the fishline play-out operation, when the fishline 18 spreads out in the upward direction, the friction resistance of the fishline 18 can be reduced, which in turn can improve the casting distance of the terminal tackles and the life of the fishline.

Also, since the upper portion b of the fishline guide hole 9g of the fishline guide portion 9' is formed wide, the fishline 18 can be inserted into the fishline guide hole 9g easily, thereby being able to enhance the efficiency of the fishline insertion operation.

Figure 7:
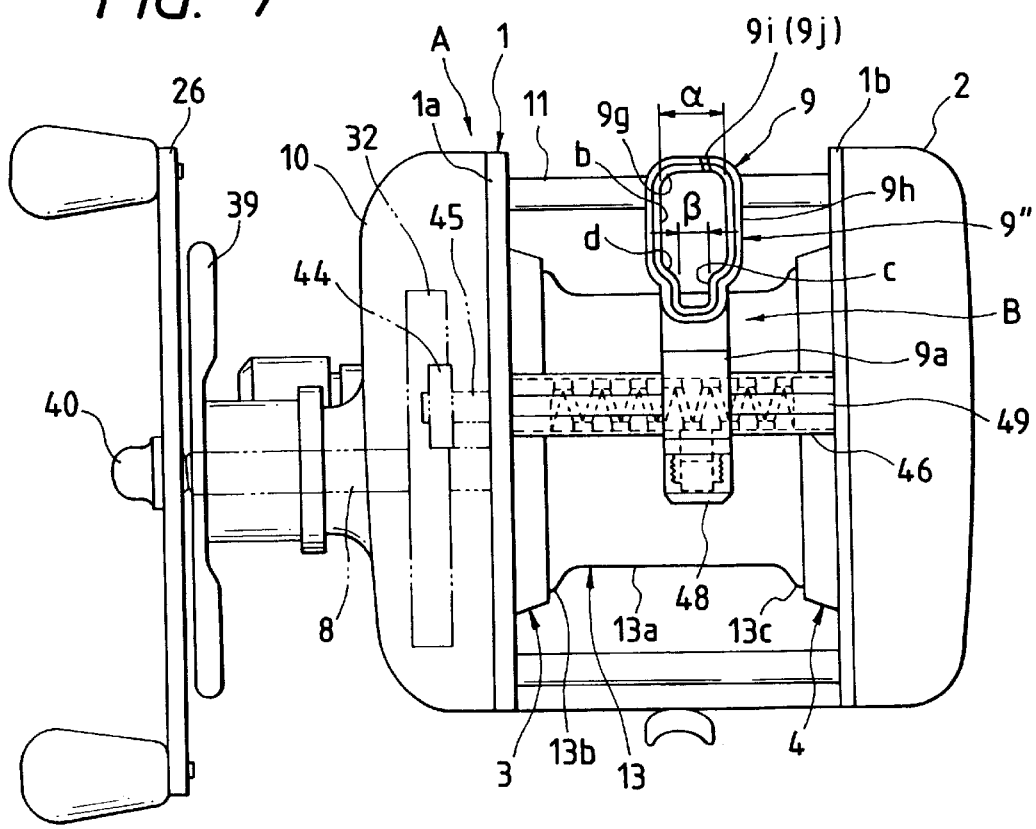
FIG. 7 is a front view of a double bearing type reel to which a second embodiment of a fishline guide device according to the invention is applied.
Figure 8:
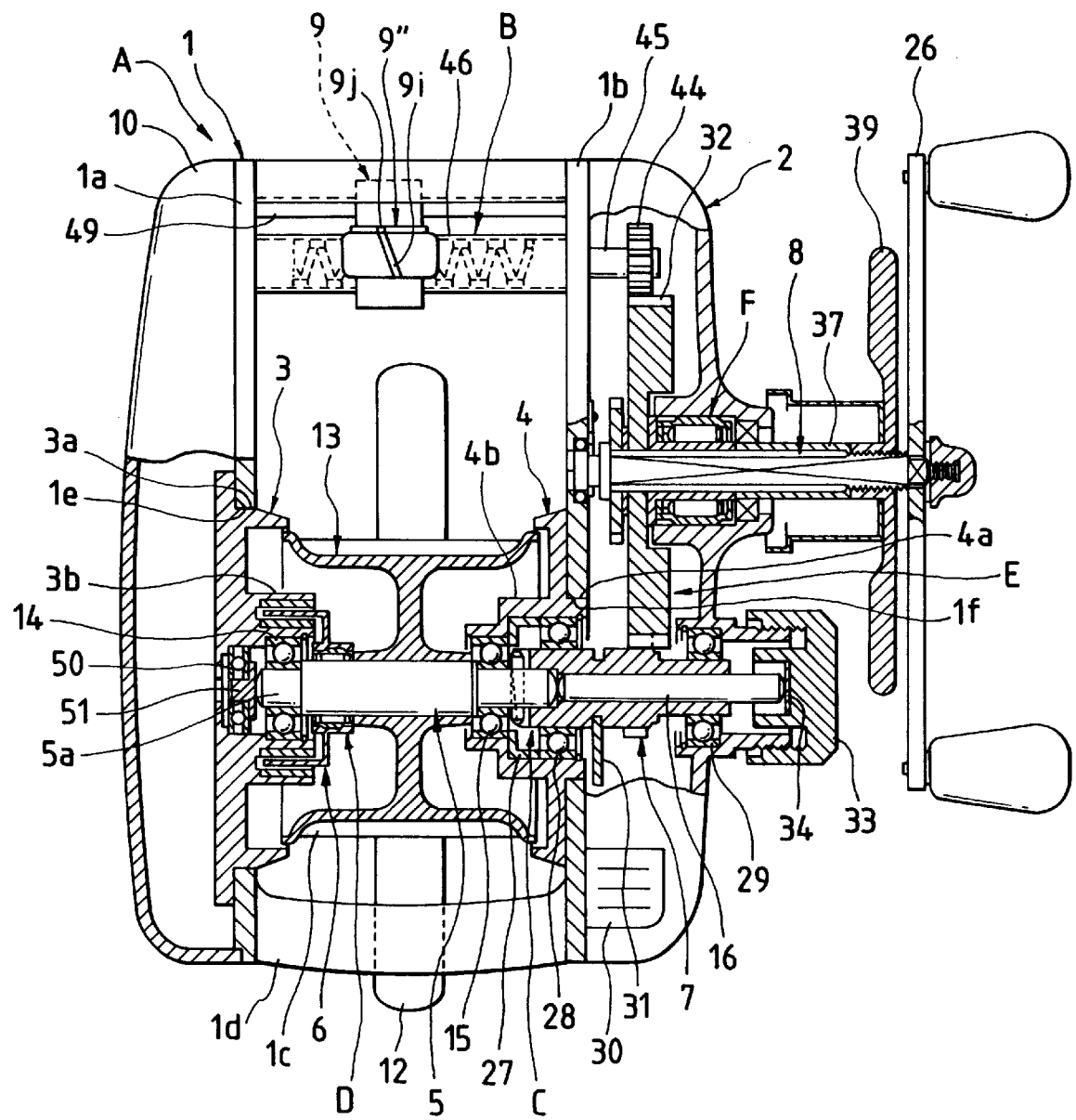
FIG. 8 is a partially sectional plan view of the double bearing type reel shown in FIG. 7.
Figure 10:
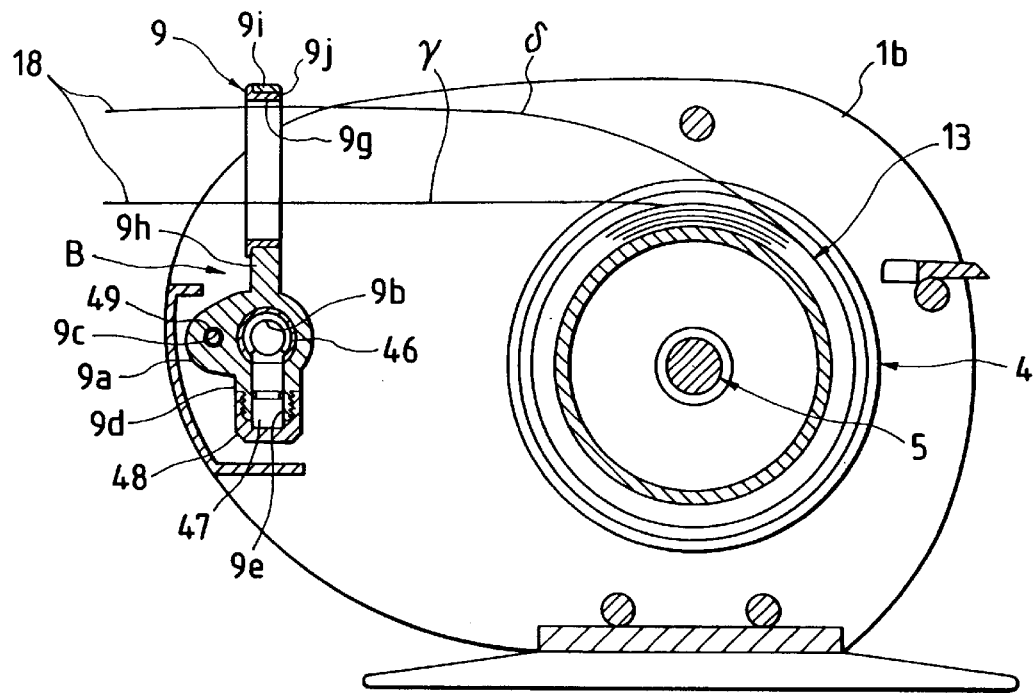
FIG. 10 is a sectional side view of the side frame inner side of the double bearing type reel shown in FIG. 7.

Now, FIGS. 7 to 10 respectively show a second embodiment of a fishline guide device for use in a fishing reel according to the invention. In particular, FIG. 7 is a front view of the fishing reel, FIG. 8 is a partially sectional plan view of the fishing reel, FIG. 9A is a partially sectional back view of the fishing reel, FIG. 9B is a partially enlarged sectional back view of the fishing reel, and FIG. 10 is a sectional side view of the side frame inner side of the fishing reel.

In the second embodiment, a spool cover 3 includes a cylinder portion 3b in the inside central portion thereof, and the interior portion of the cylinder portion 3b is formed in a two-stage recessed portion in which the above-mentioned bearing 14 and thrust bearing 50 are mounted.

The thrust bearing 50 supports a thrust bearing plate 51 with which the small-diameter portion 5a of the spool shaft 5 is in contact.

The fishline guide body 9 of the fishline guide device B includes a fishline guide portion 9h which is formed integrally with the upper portion of the fishline guide body 9.

A hard fishline guide member 9" is fixed to the fishline guide portion 9h.

The fishline guide portion 9h and hard fishline guide member 9" respectively include in the upper portions thereof slots 9i and 9j which are inclined in the X, Y and Z directions.

Referring to the shape of a fishline guide hole 9g formed in the hard fishline guide member 9" fixed to the fishline guide portion 9h, the upper portion b thereof is formed as a large-width portion having a width α and the lower portion c thereof located downwardly of the fishline winding terminal diameter of the spool 13 is formed as a small-width portion 9k having a width β, while the upper and lower portions b and c are connected with each other by a tapered connecting portion d.

The remaining portions of the structure of the second embodiment are substantially identical with those of the previously described first embodiment.

As described above, in the second embodiment, the fishline 18 may be inserted into the fishline guide hole 9g through the slots 9i, 9j, thereby being able to enhance the efficiency of the fishline insertion operation. Further, if the small-diameter portion 5a of the spool shaft 5 is contacted with the thrust bearing plate 20 supported by the radial bearing 19 or with the thrust bearing plate 51 supported by the thrust bearing 50, then (1) there is eliminated the occurrence of seizing due to friction, which eliminates the occurrence of a strange noise due to the seizing, so that the durability of the fishline guide device or the fishing reel can be improved; (2), when compared with a case in which an immovable thrust bearing plate is used, there is eliminated the displacement of the spool shaft position due to friction and a dent, so that the fishline guide device can be made a high-precision device; and, (3), due to use of the ball bearing, the additional value of the fishline guide device can be enhanced, and the rotation of the spool can be improved, so that the performance of the fishline guide device or the fishing reel can be enhanced.

Figure 11:
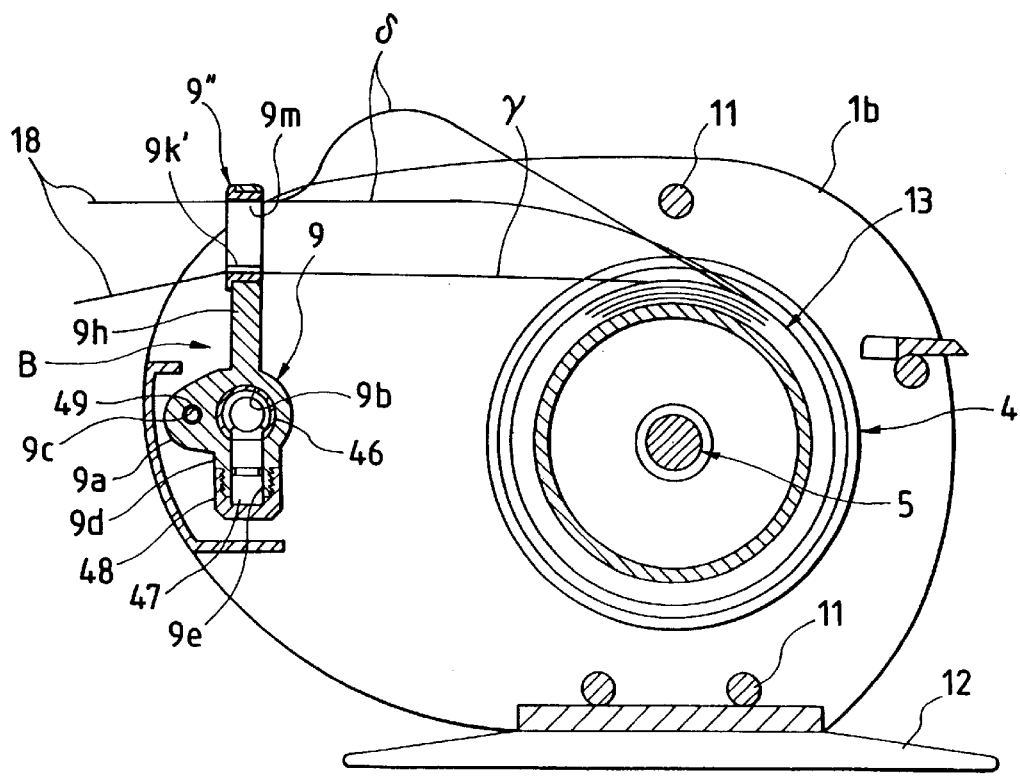
FIG. 11 is a sectional side view of the side frame inner side of a double bearing type reel to which a third embodiment of a fishline guide device according to the invention is applied.
Figure 12:
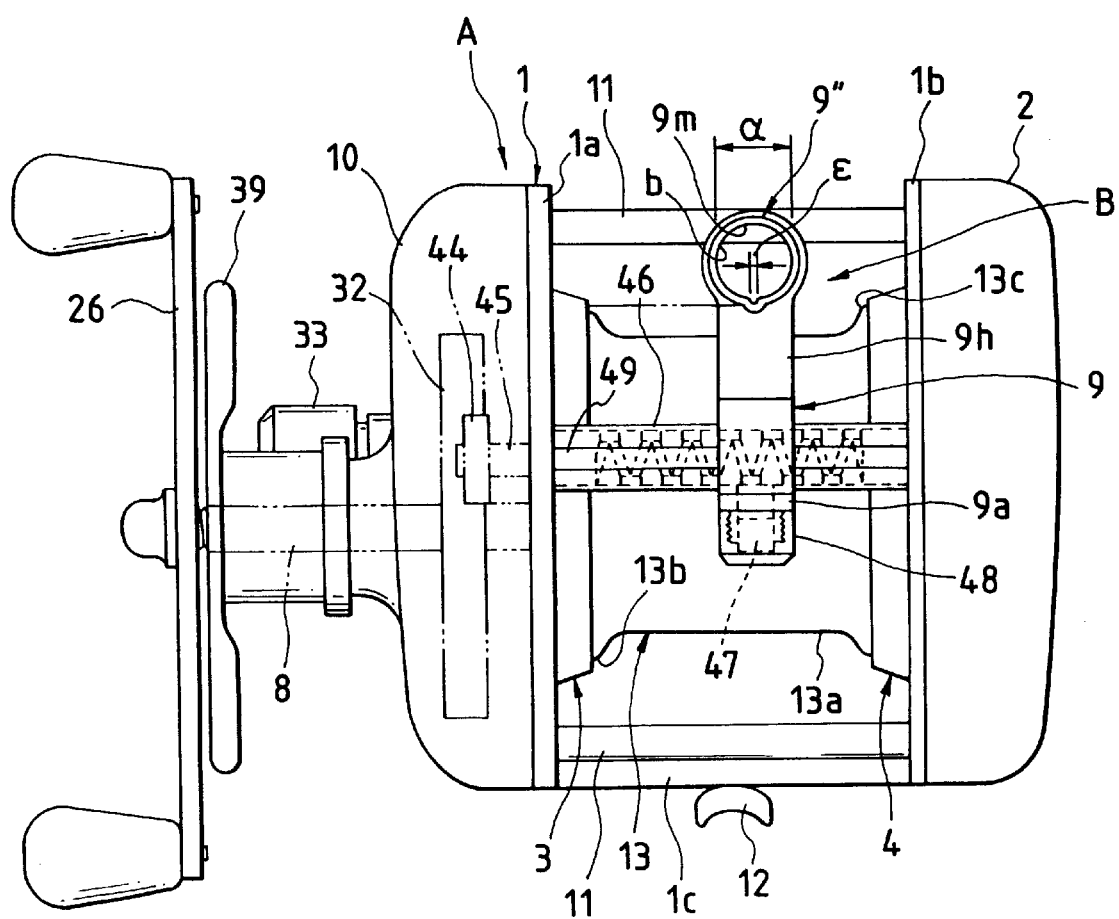
FIG. 12 is a front view of the double bearing type reel shown in FIG. 11.
Figure 13:
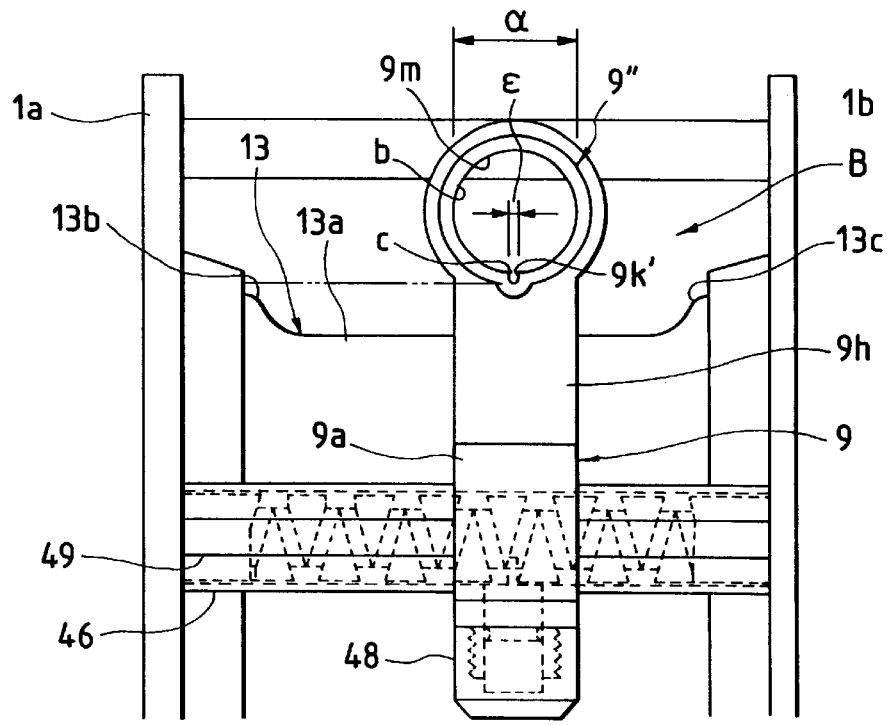
FIG. 13 is an enlarged front view of the fishline guide device according to the third embodiment of the invention.

Now, FIGS. 11 to 13 respectively show a third embodiment of a fishline guide device for use in a fishing reel according to the invention. In particular, FIG. 11 is a sectional side view of the side frame inner side of a fishing reel, FIG. 12 is a front view of the fishing reel, and FIG. 13 is an enlarged front view of a fishline guide device employed in the fishing reel.

In the third embodiment, the fishline guide device B includes a fishline guide portion 9h which is formed integrally with the upper portion of the fishline guide body 9.

A hard fishline guide member 9" is fixed to the fishline guide portion 9h.

Referring to the shape of a fishline guide hole 9m formed in the hard fishline guide member 9" fixed to the fishline guide portion 9h, the upper portion b thereof is formed as a circular portion and the lower portion c thereof is arranged in such a manner that it forms a small-width portion 9k' when the fishline 18 is wound around the spool.

The inside diameter of the upper portion b of the fishline guide hole 9m has a large width, that is, a width α, whereas the small-diameter portion 9k' of the lower portion c is located upwardly of the outer periphery diameter of the flanges 13b and 13c of the spool 13 with respect to a horizontal direction and has a small-width, that is, a width ε. Here, as shown in FIG. 11, the horizontal direction P is parallel to an attaching surface of the reel leg 12.

If the width ε is set in the range of 0.5–1.0 mm when the diameter of the fishline 18 is in the range of 0.3–0.4 mm, then the unnecessary motion of the fishline is restricted to thereby stabilize the passage of the fishline, so that the fishline can be wound around the spool in an excellent winding condition.

When the resistance of the fishline in the fishline play-out operation is taken into consideration, preferably, the width α of the upper portion b may be wide and, in particular, it may be wider than the width shown in the above figures, more particular, it may be set in the range of a half of the spool width to the spool width.

The remaining portions of the third embodiment are substantially identical in structure with the previously described second embodiment.

If the fishline guide device B is structured as in the third embodiment, when the fishline 18 is played out, as shown by δ in FIG. 11, the fishline 18 can be played out with reduced resistance through the upper portion b having a width α, and, when the fishline 18 is wound around the spool, the fishline 18 can be guided as shown by γ in FIG. 11 in the bottom portion of the small-width portion 9' located upwardly of the outer peripheral diameter of the flanges 13b and 13c, so that the passage of the fishline can be stabilized and thus it can be wound parallel around the spool positively.

Figure 14:
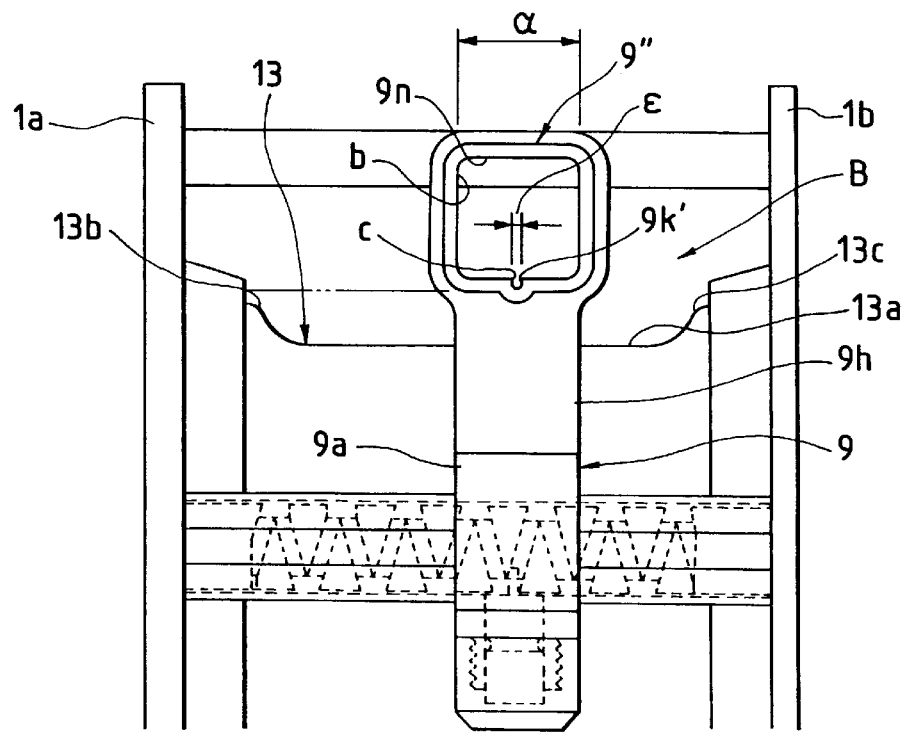
FIG. 14 is an enlarged front view of a first modification of a fishline guide device according to the third embodiment for use in a double bearing type reel.

Now, FIG. 14 shows a first modification of the above-mentioned third embodiment of the invention, while FIG. 14 is an enlarged front view of a fishline guide device employed in a fishing reel.

In the first modification of the third embodiment, a fishline guide portion 9h is arranged in the upper portion of the fishline guide body 9 of the fishline guide device B in such a manner that it is formed integrally with the fishline guide body 9 upper portion.

A hard fishline guide member 9" is fixed to the fishline guide portion 9h.

Referring to the shape of a fishline guide hole 9n formed in the hard fishline guide member 9" fixed to the fishline guide portion 9h, the upper portion b thereof is formed as a square portion and the lower portion c thereof is arranged in such a manner that it forms a small-width portion 9k' when the fishline 18 is wound around the spool.

The inside diameter of the upper portion b of the fishline guide hole 9m has a large width, that is, a width α, whereas the small-diameter portion 9k' of the lower portion c is located upwardly of the outer periphery diameter of the flanges 13b and 13c of the spool 13 and has a small-width, that is, a width ε.

The remaining portions of the first modification of the third embodiment are substantially identical in structure with those of the third embodiment.

Figure 15:
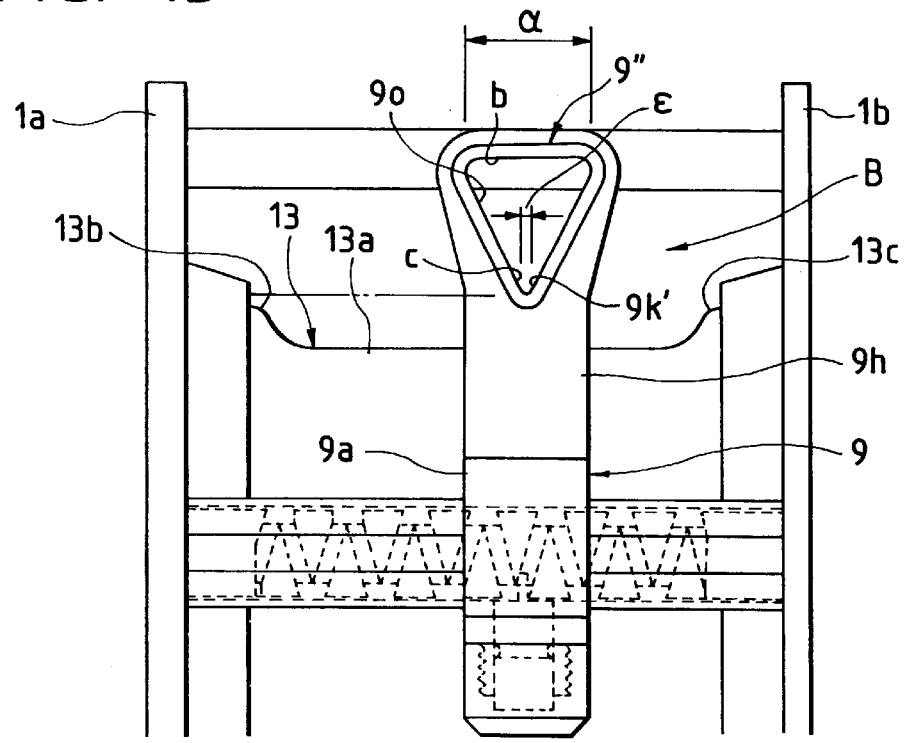
FIG. 15 is an enlarged front view of a second modification of a fishline guide device according to the third embodiment for use in a double bearing type reel.

Now, FIG. 15 shows a second modification according to the third embodiment, while FIG. 15 is an enlarged front view of a fishline guide employed in a fishing reel.

In the second modification of the third embodiment, a fishline guide portion 9h is arranged in the upper portion of the fishline guide body 9 of the fishline guide device B in such a manner that it is formed integrally with the fishline guide body 9 upper portion.

A hard fishline guide member 9" is fixed to the fishline guide portion 9h.

Referring to the shape of a fishline guide hole 9n formed in the hard fishline guide member 91" fixed to the fishline guide portion 9h, the upper portion b thereof is formed as an inverted triangle portion and the lower portion c thereof is arranged in such a manner that it forms a small-width portion 9k' when the fishline 18 is wound around the spool.

The inside diameter of the upper portion b of the fishline guide hole 9m has a large width, that is, a width α, whereas the small-diameter portion 9k' of the lower portion c is located upwardly of the outer periphery diameter of the flanges 13b and 13c of the spool 13 and has a small-width, that is, a width ε.

The remaining portions of the second modification of the third embodiment are substantially identical in structure with those of the third embodiment.

Figure 16:
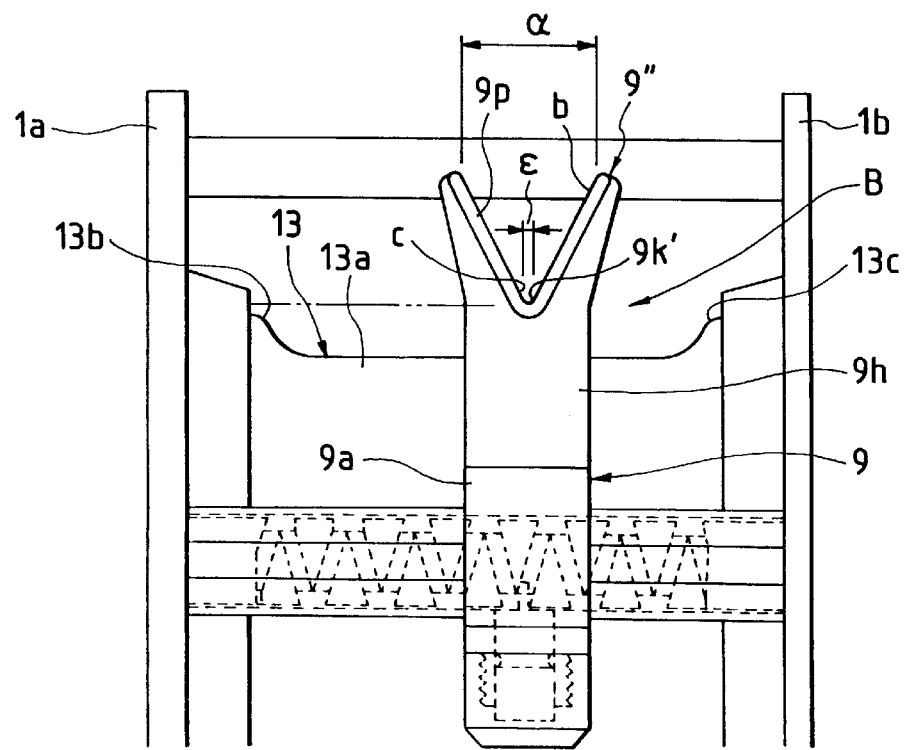
FIG. 16 is an enlarged front view of a third modification of a fishline guide device according to the third embodiment for use in a double bearing type reel.

Now, FIG. 16 shows a third modification according to the third embodiment, while FIG. 16 is an enlarged front view of a fishline guide employed in a fishing reel.

In the third modification of the third embodiment, a fishline guide portion 9h is arranged in the upper portion of the fishline guide body 9 of the fishline guide device B in such a manner that it is formed integrally with the fishline guide body 9 upper portion.

A hard fishline guide member 9" is fixed to the fishline guide portion 9h.

Referring to the shape of a fishline guide hole 9n formed in the hard fishline guide member 9" fixed to the fishline guide portion 9h, the upper portion b thereof is formed as a V-shaped portion and the lower portion c thereof is arranged in such a manner that it forms a small-width portion 9k' when the fishline 18 is wound around the spool.

The inside diameter or distance of the upper portion b of the fishline guide hole 9m has a large width, that is, a width α, whereas the small-diameter portion 9k' of the lower portion c is located upwardly of the outer periphery diameter of the flanges 13b and 13c of the spool 13 and has a small-width, that is, a width ε.

The remaining portions of the third modification of the third embodiment are substantially identical in structure with those of the third embodiment.

Figure 17:
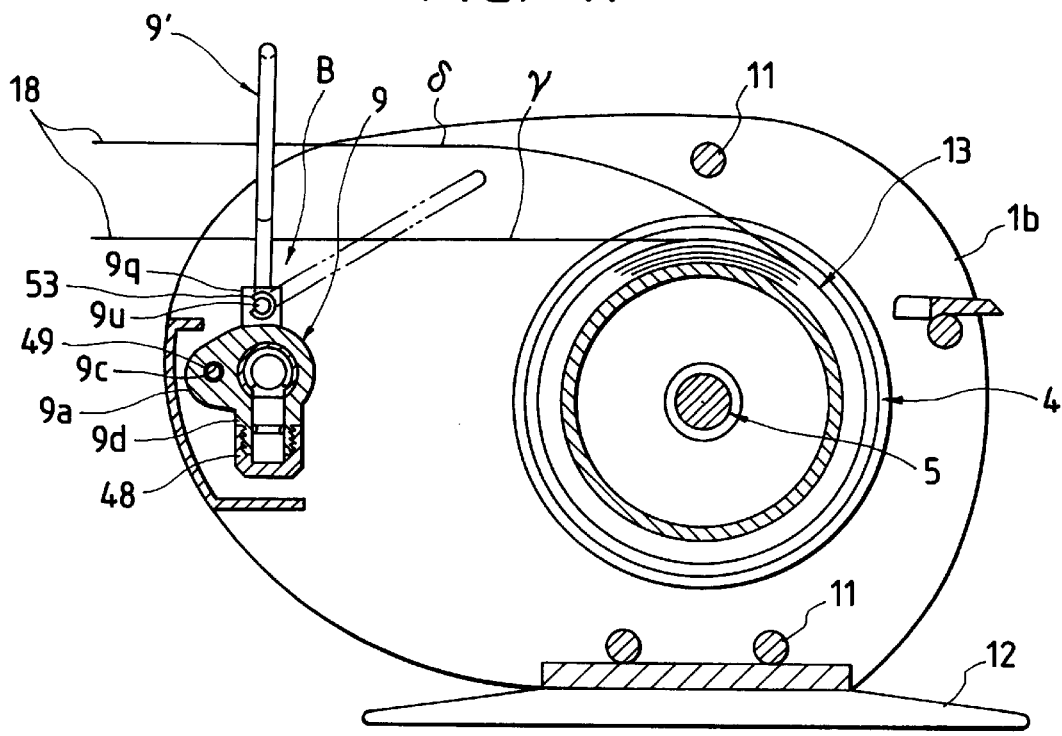
FIG. 17 is a sectional side view of the side frame inner side of a double bearing type reel to which a fourth embodiment of a fishline guide device according to the invention is applied.
Figure 18:
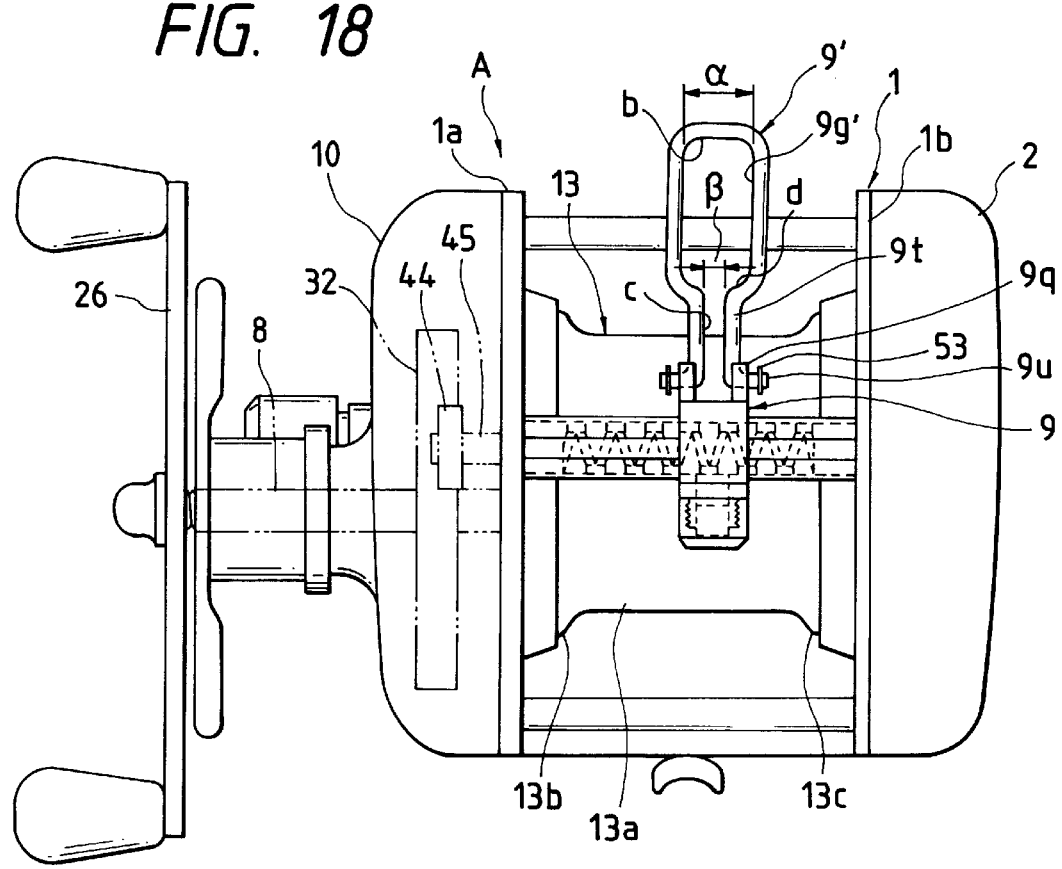
FIG. 18 is a front view of the double bearing type reel shown in FIG. 17.

Now, FIGS. 17 to 20 respectively show a fourth embodiment of a fishline guide device for use in a fishing reel according to the invention. In particular, FIG. 17 is a sectional side view of the side frame inner side of the fishing reel, FIG. 18 is a front view of the fishing reel, FIG. 19A is an enlarged sectional side view of the fishline guide device, FIG. 19B is an enlarged front view of the fishline guide device, and FIG. 20 is an enlarged sectional plan view of the main portions of the fishline guide device.

In the fourth embodiment, a high fishline guide portion 9' formed of a wire member is mounted on the upper portion of the fishline guide body 9 of the fishline guide device B in such a manner that it can be freely raised up and fallen down.

Two support and receive portions 9q and 9q are projectingly formed in the upper portion of the main body 9a of the fishline guide body 9, there are opened up transversely extending through holes 9r and 9r in the support and receive portions 9q and 9q respectively, and, in the respective inner sides of the support and receive portions 9q and 9q located in the positions of the through holes 9r and 9r, there are formed recessed grooves 9s and 9s which are used to click and stop the fishline guide portion 9' when the fishline guide portion 9' is raised up.

Alternatively, there may be formed recessed grooves which are used to click and stop the fishline guide portion 9' when the fishline guide portion 9' is fallen down.

The fishline guide portion 9' is structured in the following manner: that is, a large-width fishline guide hole 9g' having a width α is formed in the upper portion b thereof, two small-diameter vertical portions 9t and 9t each having a width β are formed in the lower portion c thereof, two support portions 9u and 9u are formed in such a manner that they are respectively bent outwardly from their respective vertical portions 9t and 9t, and two peripheral grooves 9v and 9v are formed in the respective outer peripheries of the two support portions 9u and 9u, while the upper portion b and lower portion c are connected with each other by a tapered connecting portion d.

The support portions 9u and 9u are respectively inserted into the through holes 9r and 9r in such a manner that each of them is prevented against removal by an E ring 53.

The remaining portions of the fourth embodiment are substantially identical in structure with those of the previously described first embodiment.

In the fourth embodiment, since the high fishline guide portion 9' is mounted on the fishline guide body 9 of the fishline guide device B, when the fishing reel employing the present fishline guide device B is carried to a fishing spot or is stored, the fishline guide portion 9' is fallen down in such a manner as shown by a two-dot chained line in FIG. 17.

Figure 21A:
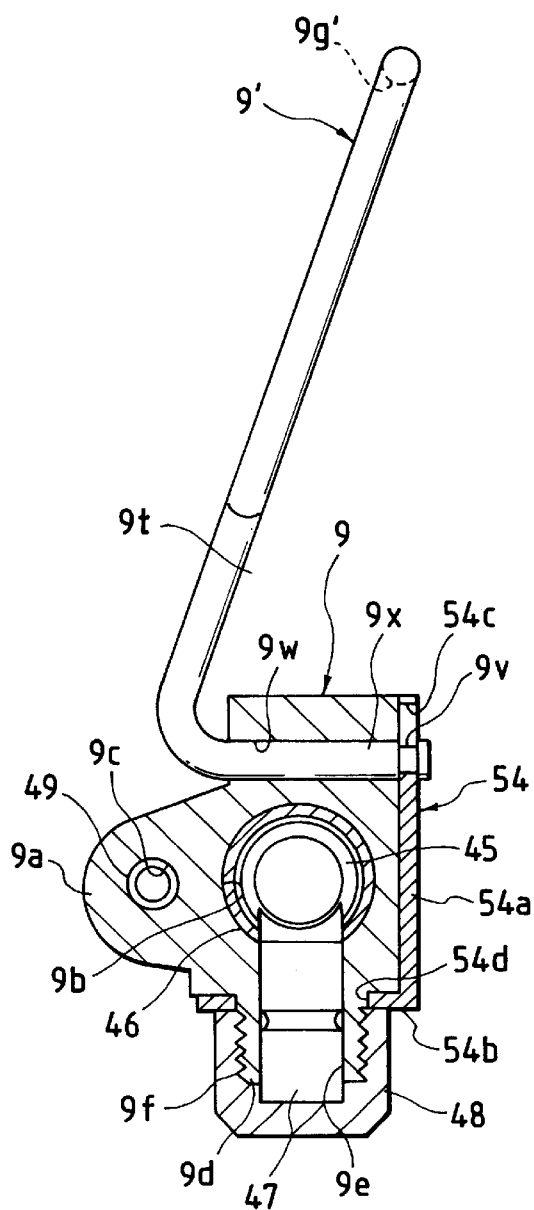
FIG. 21A is an enlarged sectional side view of a fishline guide device according to a fifth embodiment of the invention.
Figure 21B:
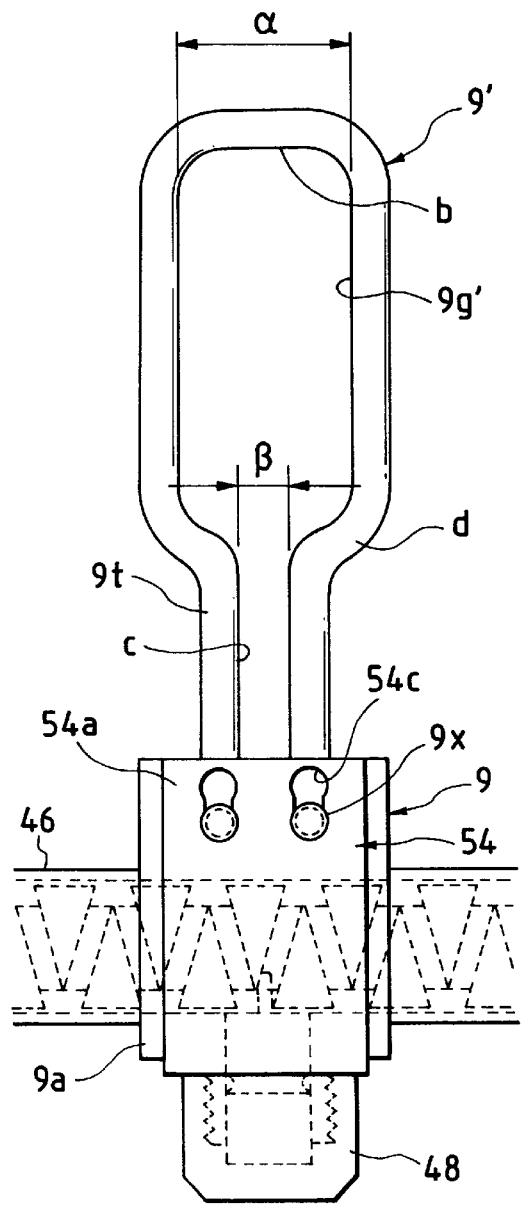
FIG. 21B is an enlarged back view of the fishline guide device according to the fifth embodiment of the invention.

Now, FIGS. 21A and 21B show a fifth embodiment of a fishline guide device for use in a fishing reel according to the invention. In particular, FIG. 21A is an enlarged sectional side view of a fishline guide device according to the fifth embodiment, while FIG. 21B is an enlarged back view of the present fishline guide device.

In the fifth embodiment, a high fishline guide portion 9' formed of a wire member is removably mounted on the upper portion of the fishline guide body 9 of the present fishline guide device B.

Two round through holes 9w and 9w are formed in the upper portion of the main body 9a of the fishline guide body 9 in such a manner that they respectively extend in the back and forth direction of the main body 9a.

The fishline guide portion 9' includes a large-width fishline guide hole 9g' having a width α formed in the upper portion b thereof, two small-diameter vertical portions 9t and 9t each having a width β respectively formed in the lower portion c thereof, two support portions 9x and 9x respectively bent backwardly from their respective vertical portions 9t and 9t, and two peripheral grooves 9v and 9v respectively formed in the respective outer peripheries of the two support portions 9x and 9x, while the upper portion b and lower portion c are connected with each other by a tapered connecting portion d.

The support portions 9x and 9x are respectively inserted into the through holes 9w and 9w and are prevented against removal by a securing plate 54.

The securing plate 54 is formed in an L-like shape which consists of a vertical surface 54a and a horizontal portion 54b.

The vertical surface 54a is in contact with the rear surface of the main body 9a and includes two suspension-type securing holes 54c formed therein; and, on the other hand, the horizontal portion 54b includes a through hole 54d formed therein, and the horizontal portion 54b is fitted with a projecting portion 9d projecting downwardly from the main body 9a and is pushed up and prevented against removal from the projecting portion 9d by a cap 48 which is threadedly engaged with the screw portion 9f of the outer periphery of the projecting portion 9d.

The remaining portions of the fifth embodiment are substantially identical in structure with those of the previously described first embodiment.

In the fifth embodiment, when the two support portions 9x and 9x are prevented against removal by the securing plate 54, the two suspension-type securing holes 54c of the securing plate 54 are secured to the peripheral grooves 9v and 9v respectively.

By removing the securing plate 54, the fishline guide portion 9' can be removed from the fishline guide body 9, which facilitates the replacement of the fishline guide portion 9'.

Figure 22A:
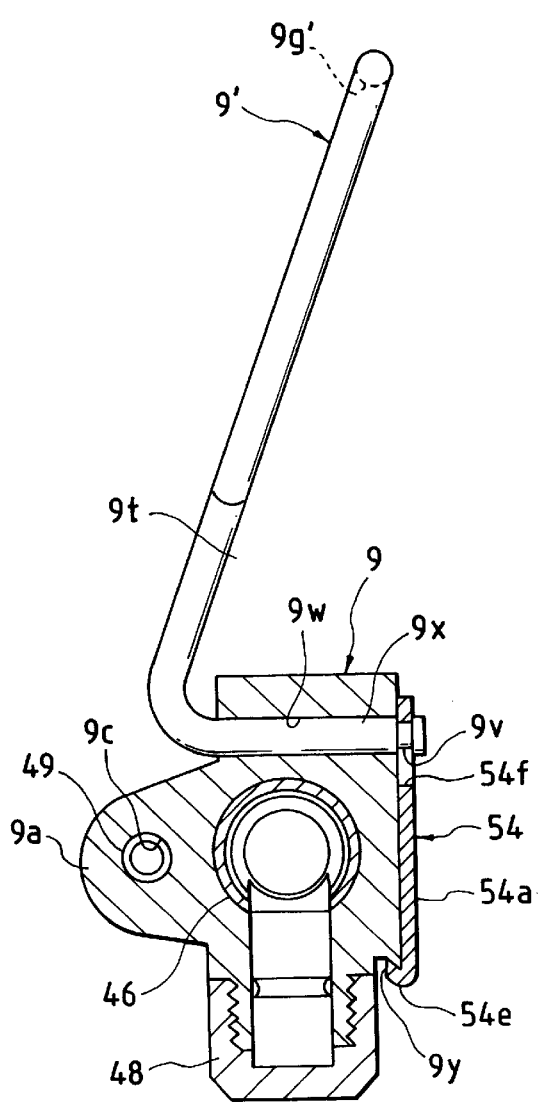
FIG. 22A is an enlarged sectional side view of a fishline guide device according to a sixth embodiment of the invention.
Figure 22B:
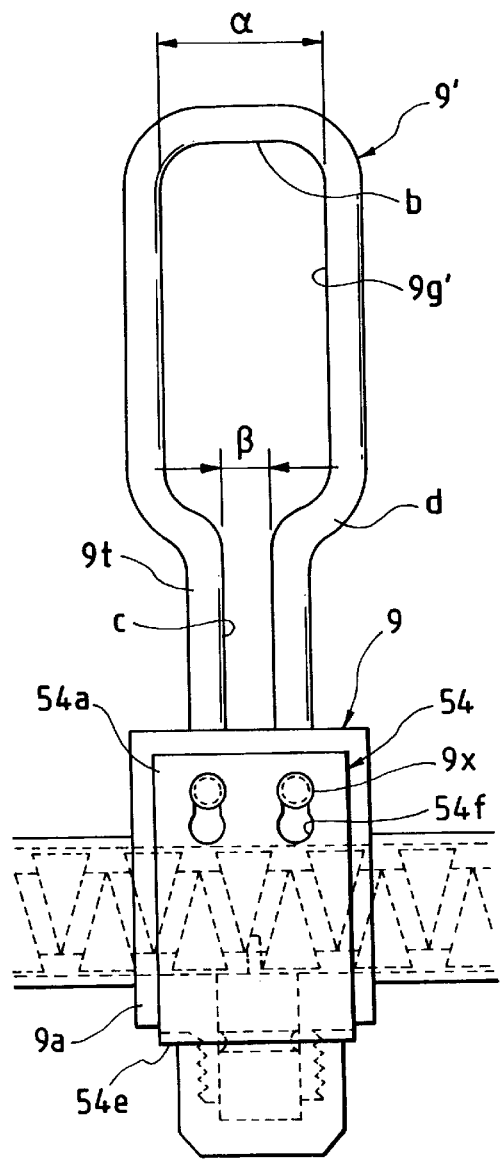
FIG. 22B is an enlarged back view of the fishline guide device according to the sixth embodiment of the invention.

Now, FIGS. 22A and 22B show a sixth embodiment of a fishline guide device for use in a fishing reel according to the invention: In particular, FIG. 22A is an enlarged sectional side view of a fishline guide device according to the sixth embodiment; and, FIG. 22B is an enlarged back view of the present fishline guide device.

In the sixth embodiment, a high fishline guide portion 9' formed of a wire member is removably mounted on the upper portion of the fishline guide body 9 of the present fishline guide device B.

Two round through holes 9w and 9w are formed in the upper portion of the main body 9a of the fishline guide body 9 in such a manner that they respectively extend in the back and forth direction of the main body 9a.

The fishline guide portion 9' includes a large-width fishline guide hole 9g' having a width α formed in the upper portion b thereof, two small-diameter vertical portions 9t and 9t each having a width β respectively formed in the lower portion c thereof, two support portions 9x and 9x respectively bent backwardly from their respective vertical portions 9*t* and 9*t*, and two peripheral grooves 9*v* and 9*v* respectively formed in the respective outer peripheries of the two support portions 9*x* and 9*x*, while the upper portion b and lower portion c are connected with each other by a tapered connecting portion d.

The support portions 9*x* and 9*x* are respectively inserted into the through holes 9*w* and 9*w* and are prevented against removal by a securing plate 54.

The securing plate 54 consists of a vertical surface 54*a* and a hook-shaped securing portion 54*e* formed in the lower end portion thereof.

The vertical surface 54*a* is in contact with the rear surface of the main body 9*a* and includes two suspension-type securing holes 54*f* formed in an upside-down manner with respect to the securing holes 54*c* employed in the above-mentioned fifth embodiment.

A hook-shaped securing portion 9*y* is formed in the main body 9*a* of the fishline guide body 9.

The remaining portions of the sixth embodiment are substantially identical in structure with those of the previously described first embodiment.

In the sixth embodiment, when the two support portions 9*x* and 9*x* are prevented against removal by the securing plate 54, the two suspension-type securing holes 54*f* of the securing plate 54 are secured to the peripheral grooves 9*v* and 9*v* respectively, while the hook-shaped securing portion 54*e* is secured to the hook-shaped securing portion 9*y*.

By removing the securing plate 54, the fishline guide portion 9' can be removed from the fishline guide body 9, which facilitates the replacement of the fishline guide portion 9'.

Now, FIGS. 23A and 23B show a seventh embodiment of a fishline guide device for use in a fishing reel according to the invention: In particular, FIG. 23A is an enlarged sectional side view of a fishline guide device according to the seventh embodiment; and, FIG. 23B is an enlarged back view of the present fishline guide device.

In the seventh embodiment, a separately produced fishline guide portion 55 is removably mounted on the upper portion of the fishline guide body 9 of the present fishline guide device B.

The fishline guide portion 55 is formed in an L-like shape which consists of a vertical portion 55*a* and a horizontal portion 55*b*, while a recessed groove 55*c* is formed in the upper surface of the leading end portion of the horizontal portion 55*b*.

A hard fishline guide member 9" is fixed to the vertical portion 55*a* of the fishline guide portion 55.

A square through hole 9*z* is formed in the upper portion of the main body 9*a* of the fishline guide body 9 in such a manner that it extend in the back and forth direction of the main body 9*a*.

The hard fishline guide member 9" is structured as follows: that is, the inside diameter of the upper portion b, in particular, the fishline guide hole 9*g'* formed therein has a large width, that is, a width α, whereas the small-diameter portion 9*k'* of the lower portion c is located upwardly of the outer peripheral diameter of the flanges 13*b* and 13*c* of the spool 13 and has a small-width, that is, a width ε.

The horizontal portion 55*b* of the fishline guide portion 55 is inserted into the square through hole 9*z* and is prevented against removal by a securing plate 54.

The securing plate 54 consists of a vertical surface 54*a* and a hook-shaped securing portion 54*e* formed in the lower end portion thereof.

The vertical surface 54*a* is in contact with the back surface of the main body 9*a* and includes a square through hole 54*g* formed therein.

A hook-shaped securing portion 9*y* is formed in the main body 9*a* of the fishline guide body 9.

The remaining portions of the seventh embodiment are substantially identical in structure with the previously described third embodiment.

When the horizontal portion 55*b* of the fishline guide portion 55 is prevented against removal by the securing plate 54, the square through hole 54*g* of the securing plate 54 is secured to the recessed groove 55*c* and the hook-shaped securing portion 54*e* is secured to the hook-shaped securing portion 9*y*.

By removing the securing plate 54, the fishline guide portion 55 can be removed from the fishline guide body 9, which facilitates the replacement of the fishline guide portion 55.

In the foregoing description, the one-way clutch F of a rolling type is incorporated into the outer periphery of the drive shaft 8. However, this is not limitative but the one-way clutch F of a rolling type may be omitted.

Also, in the foregoing description, the two left and right side frames 1*a*, 1*b*, fixing plate 1*c* and finger placement rod 1*d* of the side frame 1 are formed integrally with one another. However, they may be formed separately from one another and, after they are formed separately, the two side frames 1*a* and 1*b* may be held in parallel to each other.

Figure 24:
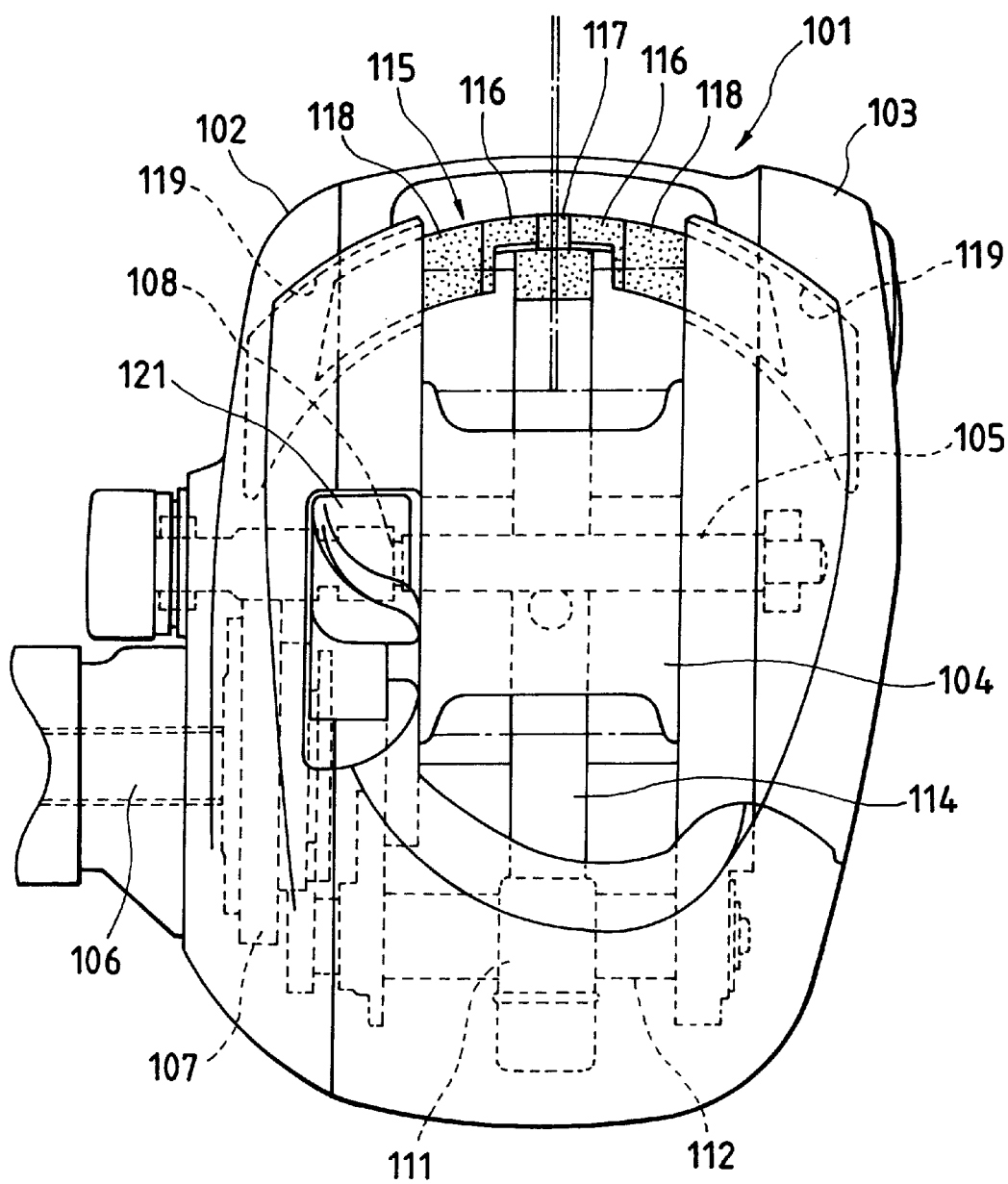
FIG. 24 is a plan view of an eighth embodiment of a double bearing type reel according to the invention.
Figure 25:
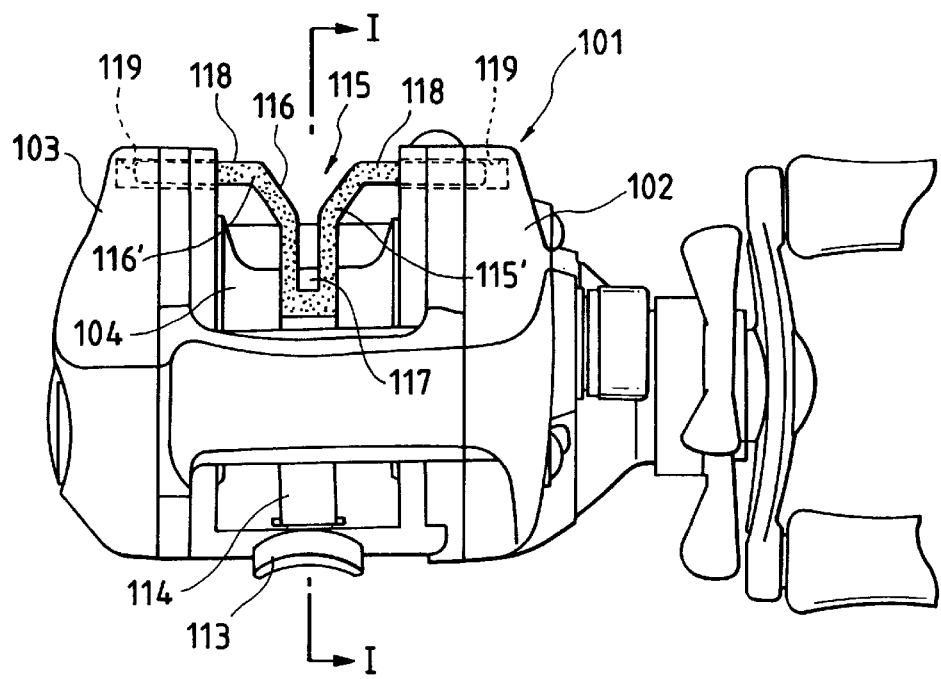
FIG. 25 a front view of the eighth embodiment.
Figure 26:
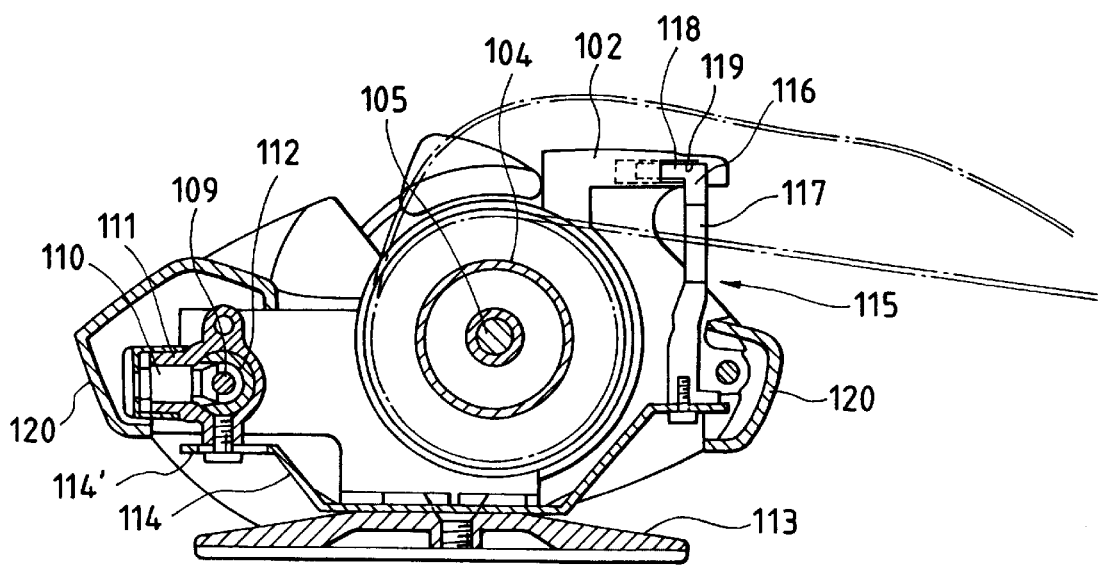
FIG. 26 is a section view of the eighth embodiment, taken along the line I—I shown in FIG. 25.

Now, FIGS. 24 to 26 show an eighth embodiment of a fishline guide device for use in a fishing reel according to the invention: In particular, between the right and left side plates 102 and 103 of a reel main body 101 of a double bearing type reel, there is supported a spool shaft 105 including a spool 104 thereon in such a manner that the spool shaft 105 can be rotated, while the spool shaft 105, as known well, is connected to a handle shaft 106 through a linking gear mechanism 107 and a clutch mechanism 108 in such a manner that the spool shaft 105 can be operated in linking with the handle shaft 106.

Also, in the rear of the spool 104 between the two side plates 102 and 103, there is provided a traverse cam shaft 109 which can be rotated in linking with the handle shaft 106, an engaging member 111 in engagement with the traverse cam shaft 109 through an engaging pin 110 is fitted with the upper portion of a guide cylinder 112 provided in the periphery of the traverse cam shaft 109 in such a manner that the engaging member 111 can be freely reciprocated, the rear end of a transmission rod 114 rotatably mounted on the leg portion 113 of the reel main body 101 is fitted with the engaging member 111 through an elongated hole 114', and a fishline insertion member 115 situated in front of the spool 104 is secured to the upper side of the front end portion of the transmission rod, thereby forming a level wind device (a fishline guide device).

And, the fishline insertion member 115 is composed of a fishline guide portion 117, which is opened upwardly and includes in the upper portion thereof a fishline induction portion (connecting portion) 116 spreading out widely in the upward direction from an upper end 115' of the fishline insertion member 115, and two arm portions 118 which respectively extend in the horizontal direction on the outside of an upper end portion 116' of the fishline induction portion 116; and, in particular, the arm portions 118 are respectively formed in an arc shape when they are viewed in their plan views, the outer end portions of the respective arm portions 118 are respectively fitted into two arc-shaped fitting holes 119 respectively formed in the two side plates 102 and 103 in such a manner that they are free to enter and leave their respective fitting holes 119, and the arm portions 118 are respectively structured in such a manner that the outer ends thereof are prevented from slipping off the fitting holes 119 when the fishline insertion member 115 reciprocates right and left.

The fishline induction portion 116 of the fishline guide portion 117, as can be seen from FIG. 25, is formed such that it spreads substantially in a straight line toward the inner end of the arm portion 118. However, this portion 116 can also be formed in a recessedly or projectingly gently curved shape. By the way, in the drawings, reference character 120 designates a protection cover, while 121 stands for a clutch lever included in the clutch mechanism 108.

Therefore, in the present embodiment, if the fishline is played out in such a manner that the clutch mechanism 108 is cut off and the spool shaft 105 is thereby free to rotate, then the fishline inserted from the spool 104 through the fishline guide portion 117 is, due to this play-out operation, is released to the upper portion of the fishline guide portion 117 through the wide fishline induction portion 116 disposed upwardly from the fishline guide portion 117 and is thereby played out with as small as possible resistance; and, in a fishline take-up operation after the fishline is played out, if the spool shaft 105 and traverse cam shaft 109 are rotated and the fishline insertion member 115 is thus reciprocated right and left in an arc manner in front of the spool 104 by the transmission rod 114, then the played-out fishline, without dropping down into between the fishline insertion member 115 and side plates 102, 103, is moved and guided by the arm portions 118 reciprocating right and left in an arc manner and is automatically guided to the fishline guide portion 117 having an upwardly opened opening, so that the fishline can be wound around the spool 104. In this case, the fishline induction portion 116 facilitates the above-mentioned moving and guiding operation of the fishline.

Figure 27:
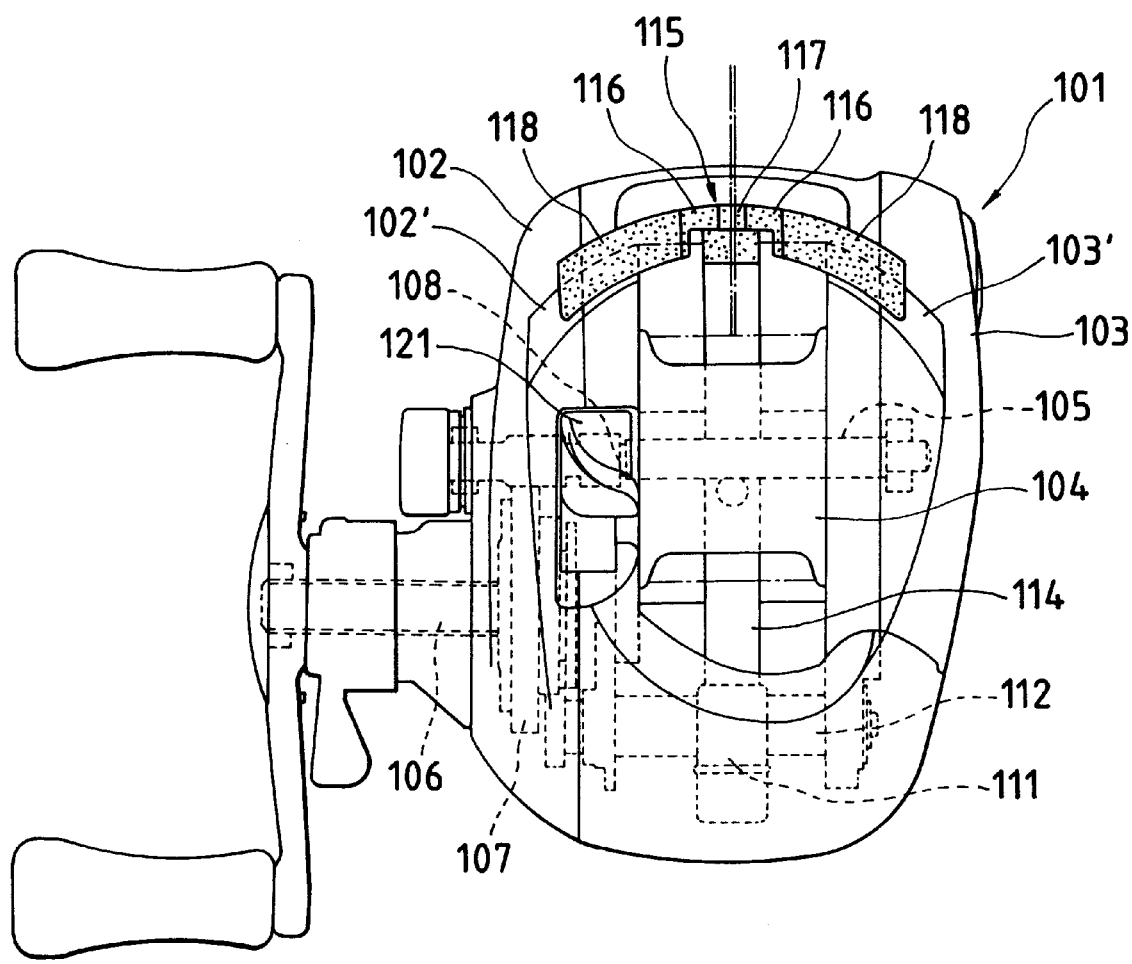
FIG. 27 is a plan view of a ninth embodiment of a double bearing type reel according to the invention.
Figure 28:
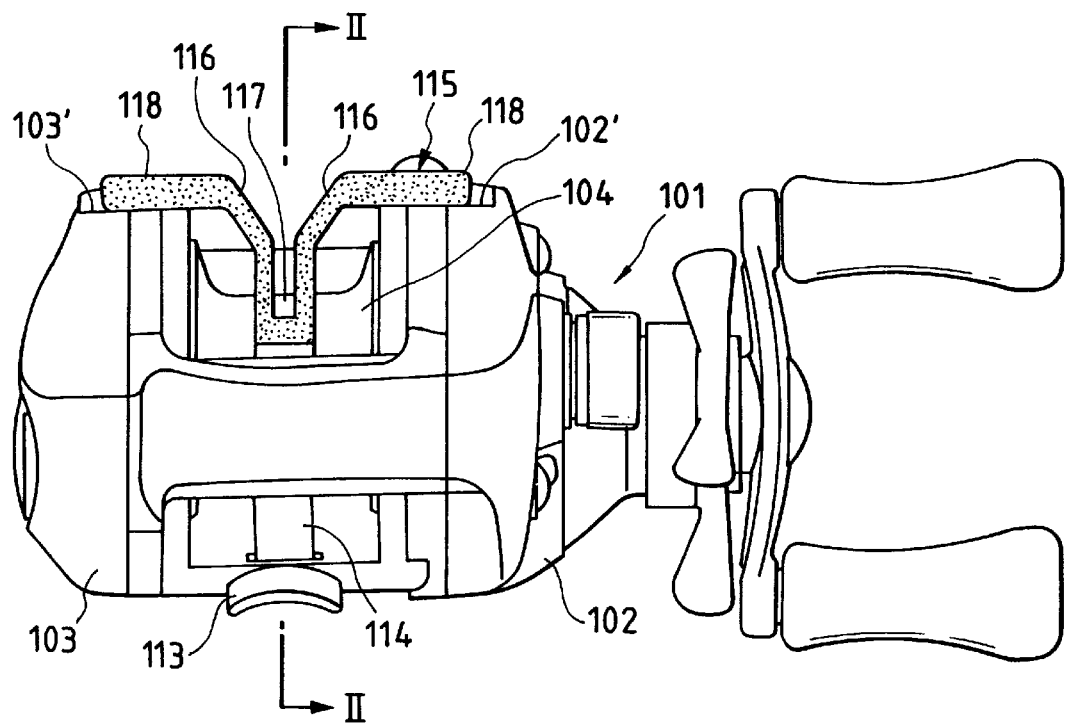
FIG. 28 is a front view of the ninth embodiment.
Figure 29:
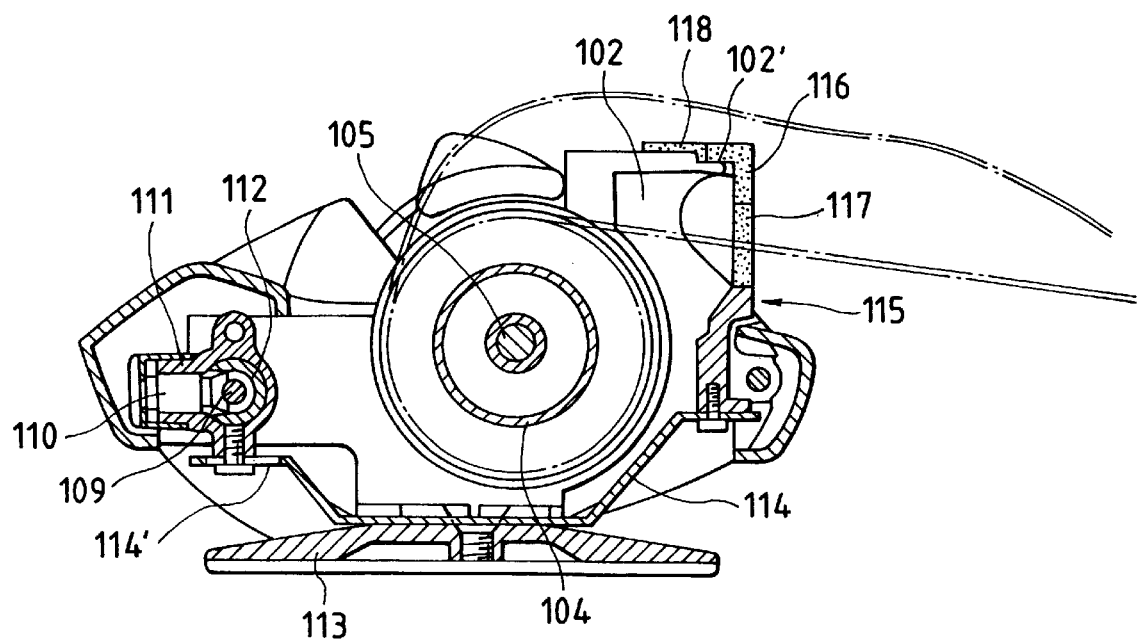
FIG. 29 is a section view of the ninth embodiment, taken along the line II—II shown in FIG. 28.
Figure 30:
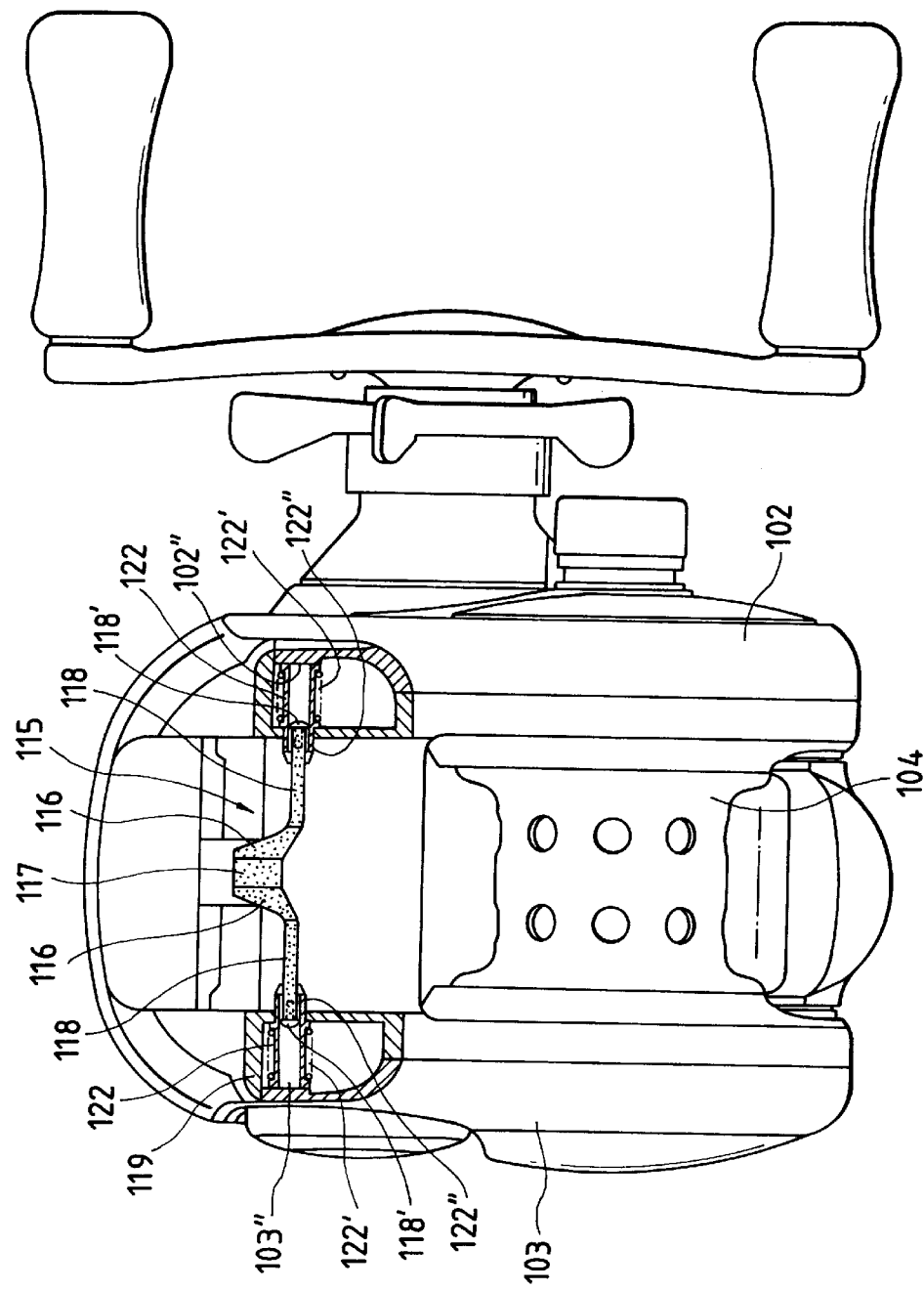
FIG. 30 is a partially cutaway plan view of a tenth embodiment of a double bearing type reel according to the invention.
Figure 31:
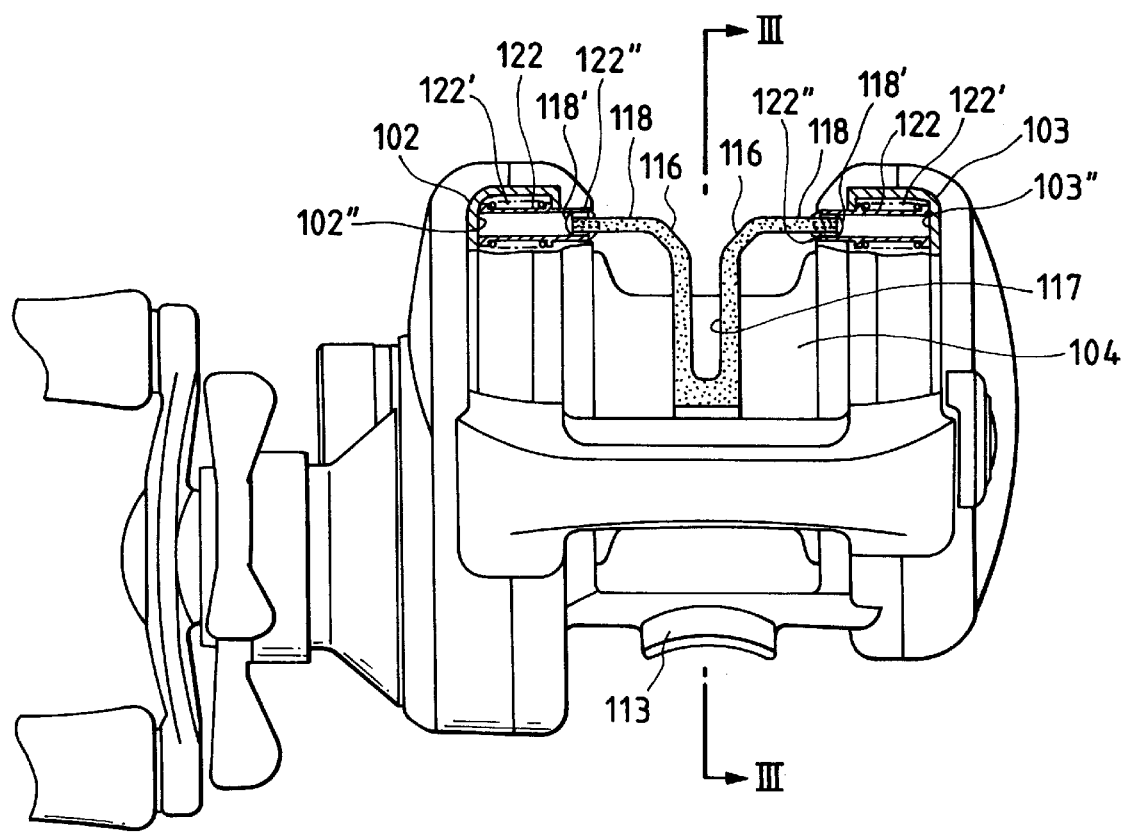
FIG. 31 is a partially cutaway front view of the tenth embodiment.

Now, in a ninth embodiment which is shown in FIGS. 27 to 29, instead of fitting the outer end portions of the arm portions 118 of the fishline insertion member 15 into the interior portions of the right and left side plates 102 and 103 in the previously described eight embodiment, the outer end portions of the arm portions 118 are overlappingly supported on stepped portion upper surfaces 102' and 103' respectively formed on the edge upper side of the two side plates 102 and 103 in such a manner that the outer end portions of the arm portions 118 are prevented from slipping off the stepped portion upper surfaces 102' and 103' when the fishline insertion member 115 is reciprocated right and left.

Figure 32:
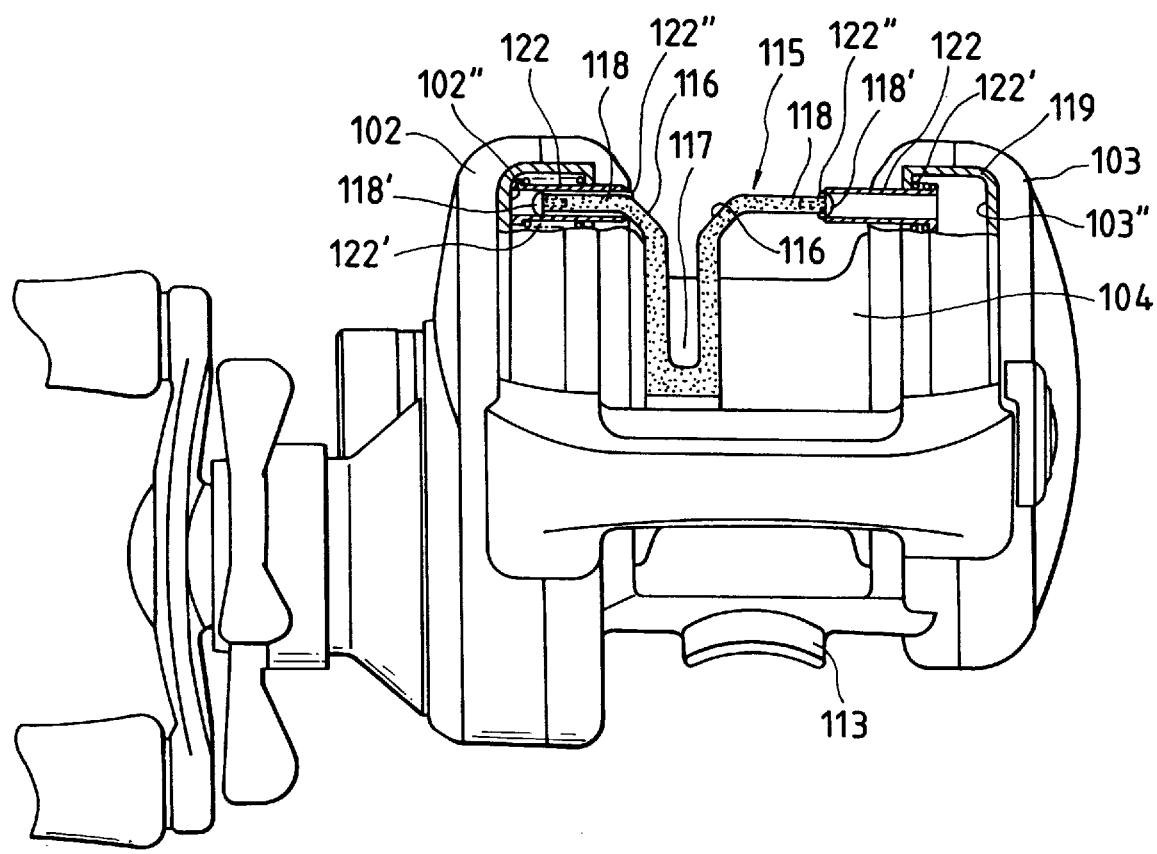
FIG. 32 is a partially cutaway front view of the tenth embodiment, showing how it is operated.
Figure 33:
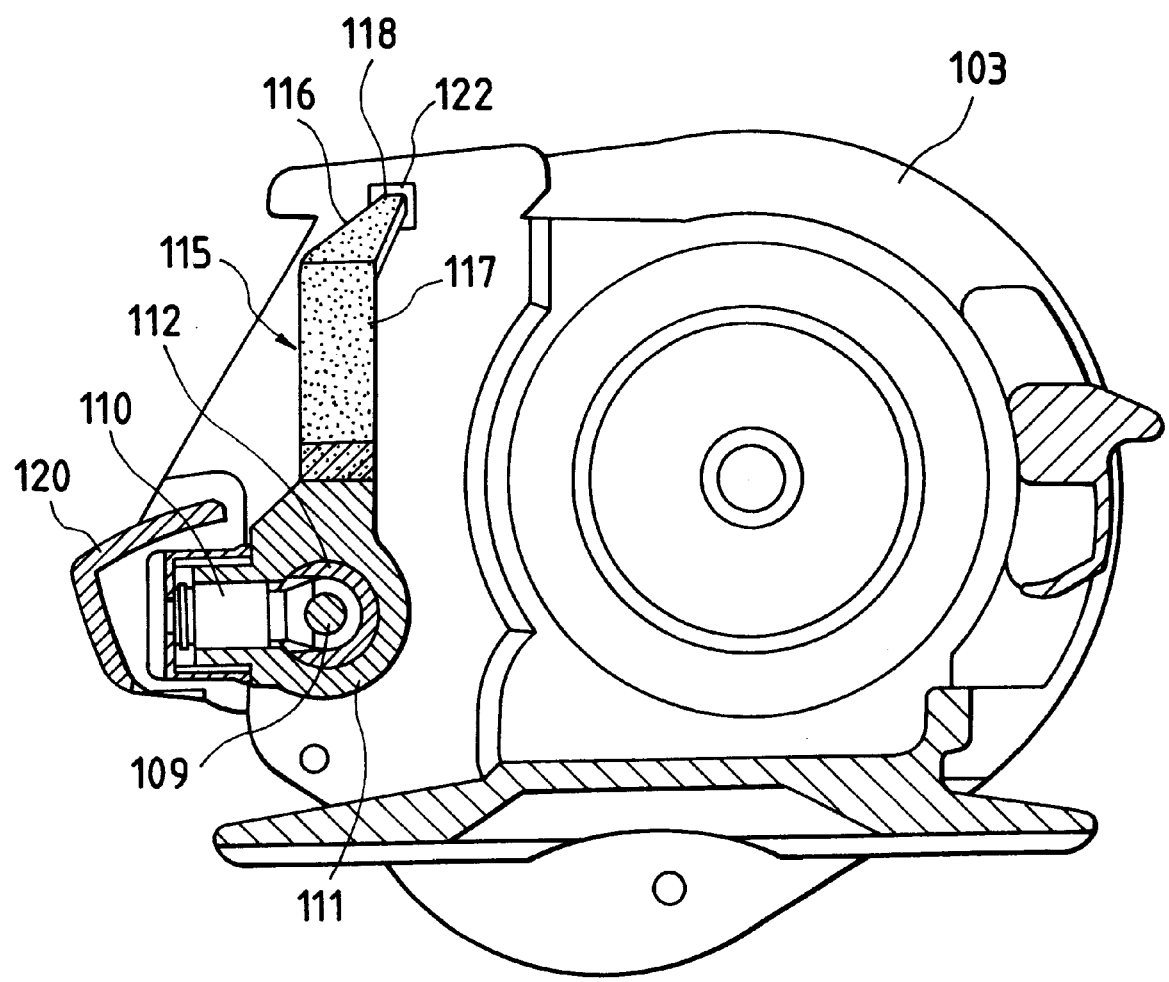
FIG. 33 is a section view of the tenth embodiment, taken along the line III—III shown in FIG. 31.

Further, in a tenth embodiment which is shown in FIGS. 30 to 33, the traverse cam shaft 109 of the level wind device is disposed in front of the spool 104, the fishline insertion member 115 is provided directly on the engaging member 111 in such a manner that the fishline insertion member 115 can be freely reciprocated right and left in a linear manner, two expansion cylinders 122 are respectively fitted with the outer end portions of the arm portions 118 which respectively extend linearly on the two sides of the fishline induction portions 116 from the upper end portions thereof, the expansion cylinders 122 are respectively secured and supported in such a manner that they can be freely moved into the fitting holes 119 formed in the two side plates 102 and 103, the expansion cylinders 122 are also energized toward the respective inside surfaces 102" and 103" of the two side plates 102 and 103 by their respective energizing springs 122', and the securing portions 122" of the expansion cylinders 122, which are formed in the leading end portions of the expansion cylinders 122, can be respectively engaged with their respective securing pins 118' provided in the outer end portions of the arm portions 118 in such a manner that the securing portions 122" are prevented from slipping off the securing pins 118'. With use of this structure, if the reciprocating fishline insertion member 115 moves, for example, to the left as shown in FIG. 32, then the securing pin 118' of the right arm portion 118 is moved left within the expansion cylinder 122 and is engaged with the securing portion 122" thereof and, after then, the securing pin 118' contracts the energizing spring 122' against the energizing force thereof and pulls out the expansion cylinder 122 from the side plate 103 to thereby expand its associated arm portion 118; and, at the same time, the energizing spring 122' of the left fishline guide portion 18, while energizing its associated expansion cylinder 122 into the side plate 102, advances into this expansion cylinder 122 to thereby contracts its associated arm portion 118. In this manner, according to the tenth embodiment of the invention, the operation to expand one of the arm portions 118 on the two sides of the fishline guide portion 117 and, at the same time, the operation to contract the other arm portion 18 are repeated alternately on the right and left sides, whereby, similarly to the previously described eight and ninth embodiments, the fishline can be moved and guided smoothly to the fishline guide portion 117, that is, while preventing the fishline from dropping down into between the fishline insertion member 115 and side plates 102, 103, the fishline can be played out and taken up. With use of the tenth embodiment, the reciprocating stroke of the fishline insertion member 115 can be increased.

By the way, in the illustrated eight to tenth embodiments of the invention, the fishline induction portions 116 are so formed as to extend continuously with the upper portion of the fishline guide portion 117. However, this is not limitative but, for example, it is also possible to use a fishline guide portion 117 from which such fishline induction portions 116 are omitted.

In addition, in the eight to tenth embodiments of the invention, a cover member is not provided between the left and right side plates 102 and 103 at a position above the fishline insertion member 115, so as to prevent the casting distace of the terminal tackles from declining by a contact of the fishline with the cover member in the fishline play-out state.

Now, FIGS. 34 to 40 show an eleventh embodiment of a double bearing type reel according to the invention. At first, description will be given below of the whole structure of a double bearing type reel according to the eleventh embodiment with reference to FIG. 34 which is a plan view of the eleventh embodiment, FIG. 35 which is a front view thereof, FIG. 36 which is a section view thereof taken along the line IV—IV shown in FIG. 34, and FIG. 37 which is a section view thereof taken along the line V—V shown in FIG. 34.

In particular, a reel main body 201 comprises two left and right frames 201a, 201b and two left and right side plates 203a, 203b respectively including left and right covers 202a, 202b. And, between the two left and right side plates 203a and 203b, a spool shaft 205a with a spool 205 mounted thereon is rotatably supported through a bearing. In the right side plate side end portion of the spool shaft 205a, there is mounted a pinion 207 in such a manner that it can be moved between a position where it can be engaged with the spool shaft 205a and a position where it cannot be engaged with the spool shaft 205a (that is, it can be moved in the axial direction thereof) by means of operation of a clutch operation member to be discussed later.

A handle shaft 209a with a handle 209 mounted thereon is rotatably supported by the right side plate 203b and, on the base end side of the handle shaft 209a, there is mounted a drive gear 210 which can be meshingly engaged with the pinion 207. With use of this structure, if the handle 209 is operated or rotated, then the spool 205 can be driven or rotated through the drive gear 210 and pinion 207. Also, within the right side plate 203b, there is disposed a clutch mechanism which will be discussed later; and, the spool 205 can be switched over between its fishline play-out state (clutch-off state) and its fishline take-up state (clutch-on state) by a clutch operation member.

Between the left and right side plates 203a and 203b on the fishline play-out direction side thereof with respect to the spool 205, there is interposed a fishline guide device 215. The fishline guide device 215 includes a traverse cam shaft 217, which includes a traverse cam groove formed on the outer peripheral surface thereof and one end portion with a gear 216a mounted thereon, and a fishline guide body 219 which can be engaged with the traverse cam groove and can be slided along a guide shaft 218 supported between the left and right side plates 203a and 203b in such a manner that the fishline guide body 219 is prevented against rotation. The fishline guide body 219 is supported between the left and right side plates 203a and 203b, is held by a cylindrical body 217a storing the traverse cam shaft 217 therein, and is engaged with the traverse cam groove through an elongated hole 217b which is so formed in the cylindrical member 217a as to extend in the axial direction thereof. The gear 216a is in meshing engagement with the drive gear 210 through an idle gear 216b and, if the handle 209 is operated or rotated, then the fishline guide body 219 can be driven or reciprocated right and left through the gears 216b, 216a and traverse cam shaft 217 in such a manner that it is prevented against rotation. Also, the fishline guide body 219 extends in the vertical direction and includes in the upper end portion thereof a bent portion 219a bent toward the spool side, while the bent portion 219a includes an elongated hole 219b so formed as to extend along the two side plates 203a and 203b.

A fishline guide member 220 is in engagement with the fishline guide body 219. The fishline guide member 220, which is formed in a frame-like shape, includes a fishline guide portion 220a used to guide the fishline right and left to the spool 205 in the fishline take-up operation, and an induction portion 220b which, when the fishline is played out, releases or opens the front portion of the spool 205 and also, when the fishline play-out state is switched over to the fishline take-up state, induces the fishline held in its free state to the fishline guide portion 220a.

Figure 34:
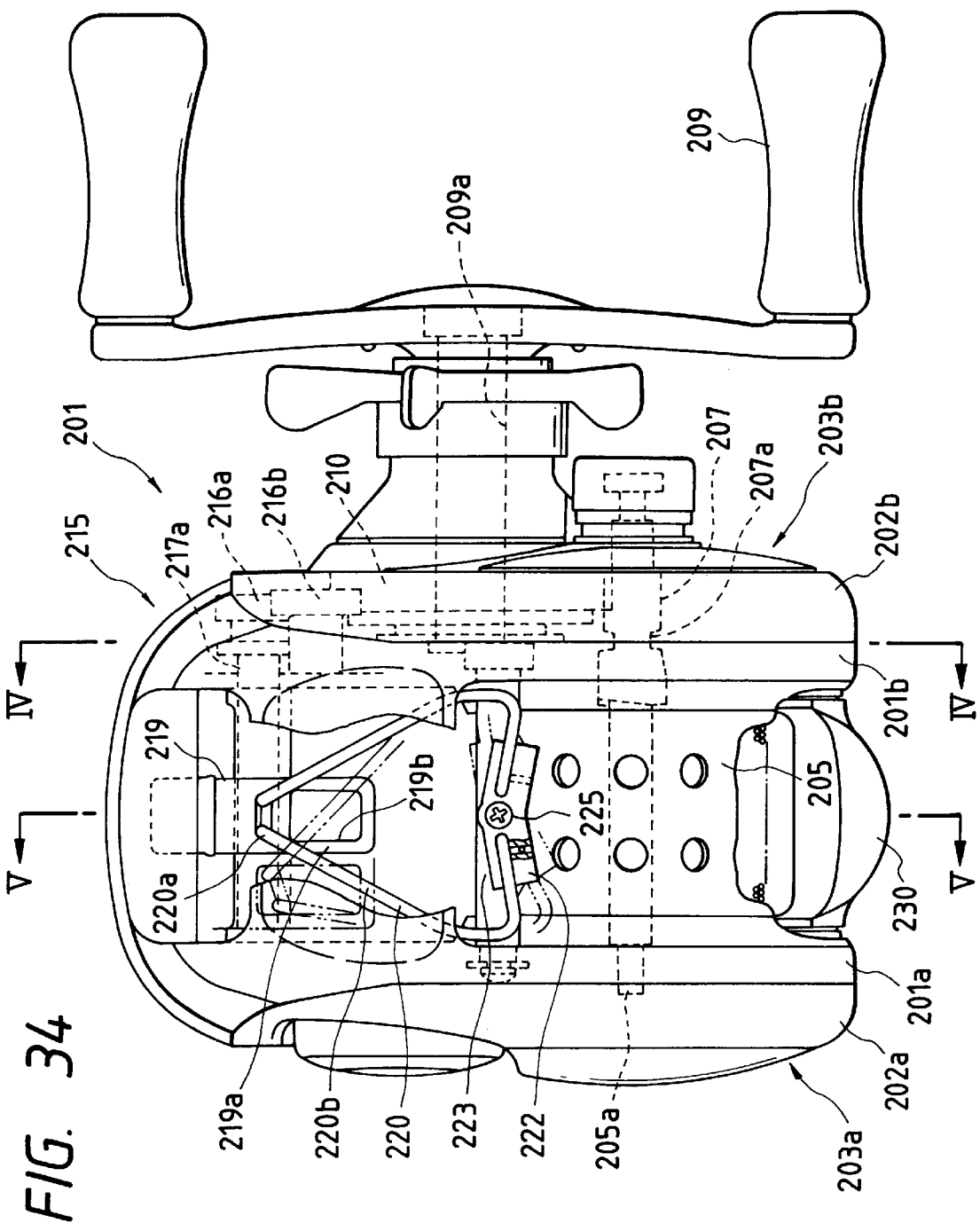
FIG. 34 is a plan view of an eleventh embodiment of a double bearing type reel according to the invention.
Figure 35:
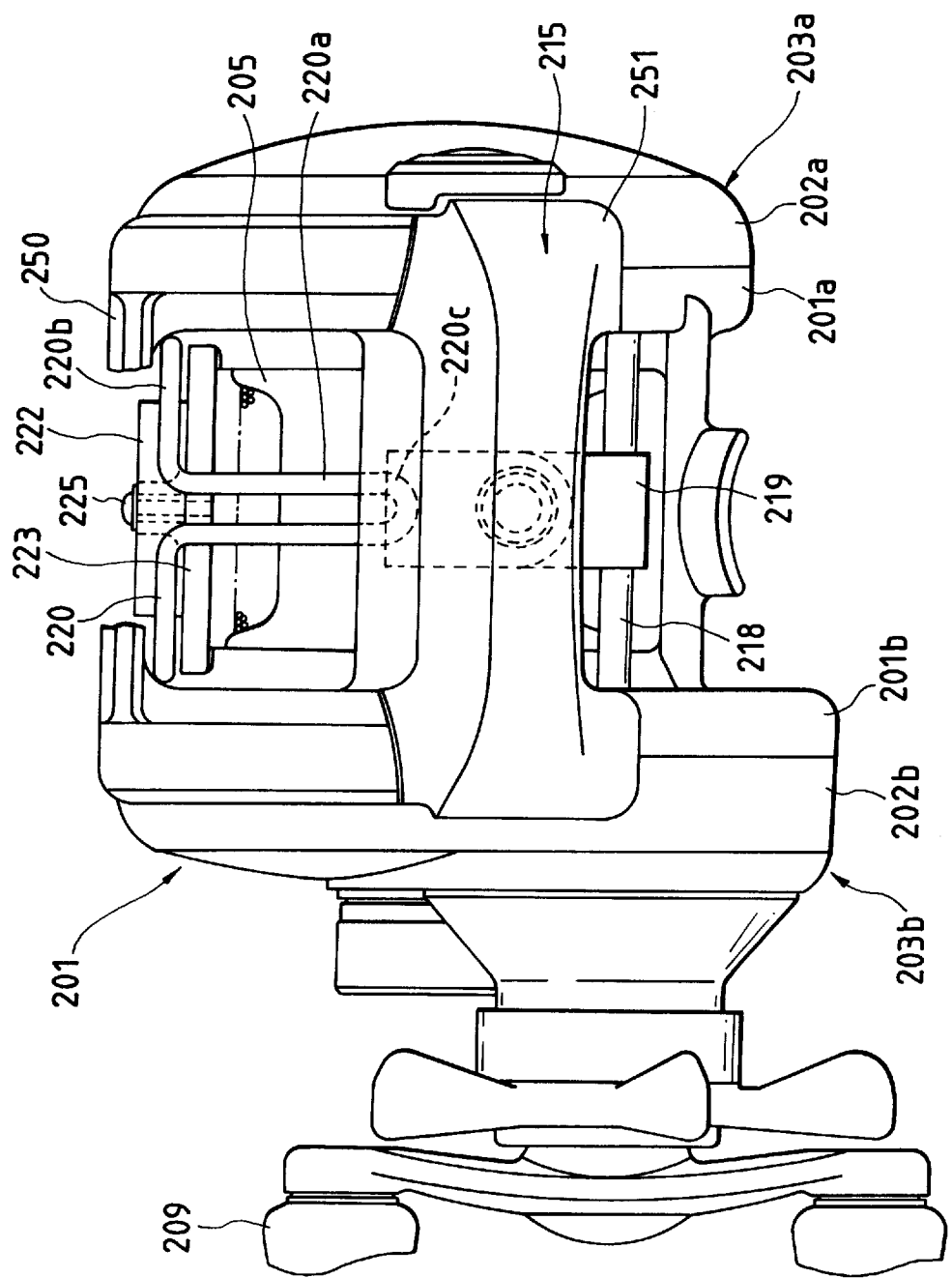
FIG. 35 is a front view of the double bearing type reel shown in FIG. 34.
Figure 37:
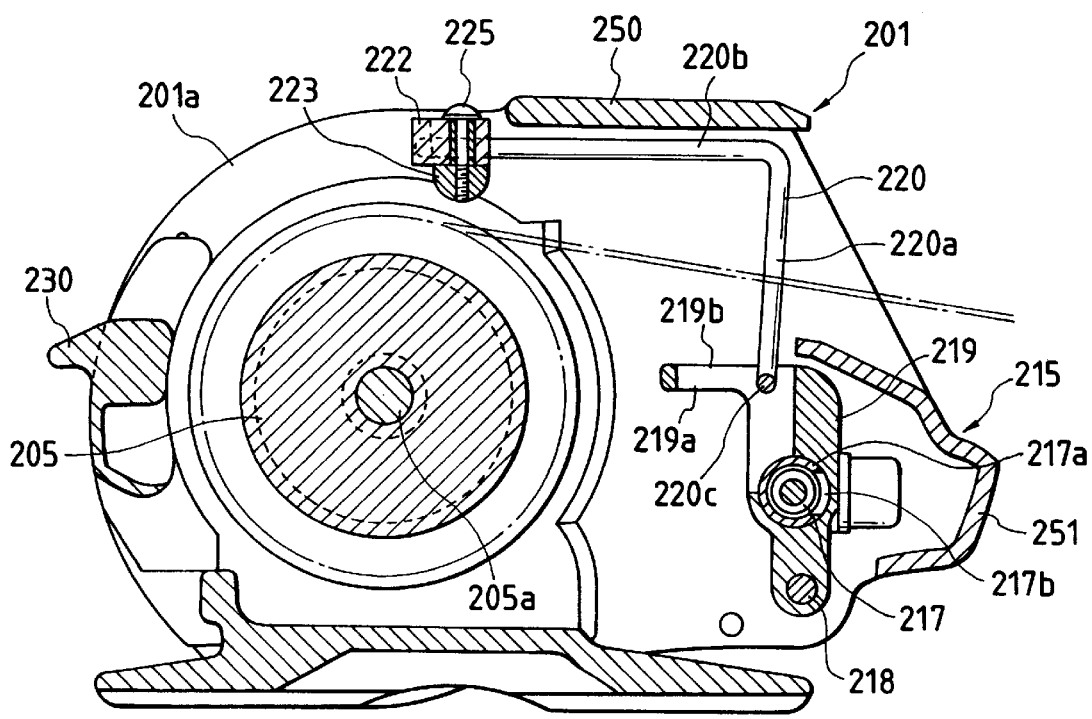
FIG. 37 is a section view of the double bearing type reel shown in FIG. 34, taken along the line V—V and showing the clutch-on state thereof.

In particular, the fishline guide portion 220a is formed in U-shape extending in the vertical direction and is also formed in such a manner that, in the fishline take-up operation shown in FIG. 35, it has a length which enables the fishline guide portion 220a to guide always the fishline wound around the spool; and, the fishline guide portion 220a includes a bent portion 220c formed on the leading end side thereof, while the bent portion 220c is inserted into the elongated hole 219b formed in the bent portion 219a of the fishline guide body 219. And, the base end side of the U-shaped fishline guide portion 220a, as shown in FIG. 37, is bent substantially at right angles toward the spool side and also, as shown in FIG. 34, includes an induction portion 220b which spreads out gradually toward the spool side.

In the fishline guide member 220 including the U-shaped fishline guide portion 220a and the induction portion 220b bent in the upper end portion of the fishline guide portion 220a and spreading out gradually toward the spool side, the leading end portions of the induction portion 220b are respectively bent inwardly and the bent end portions thereof are respectively supported by a support base seat 222. The support base seat 222, in turn, is supported by a pillar 223 supported between the two side plates 203a and 203b in such a manner that the support base seat 222 can be rotated about a screw 225. And, in the fishline take-up operation, the fishline guide body 219 is reciprocated right and left through the traverse cam shaft 217. When the fishline guide portion 220a is reciprocated right and left together with the fishline guide body 219 through the elongated hole 219b due to the right and left reciprocating motion of the fishline guide body 219, the support base seat 222 is reciprocatingly rotated within a given range of angles.

Therefore, when the handle 209 is operated to take up the fishline, the spool 205 is rotated through the drive gear 210 and pinion 207, and the fishline guide portion 220a is rotated in an arc manner in front of the spool 205 about the screw 225 of the support base seat 222 due to the right and left reciprocating motion of the fishline guide body 219, so that the fishline can be wound around the spool 205 uniformly.

Figure 36:
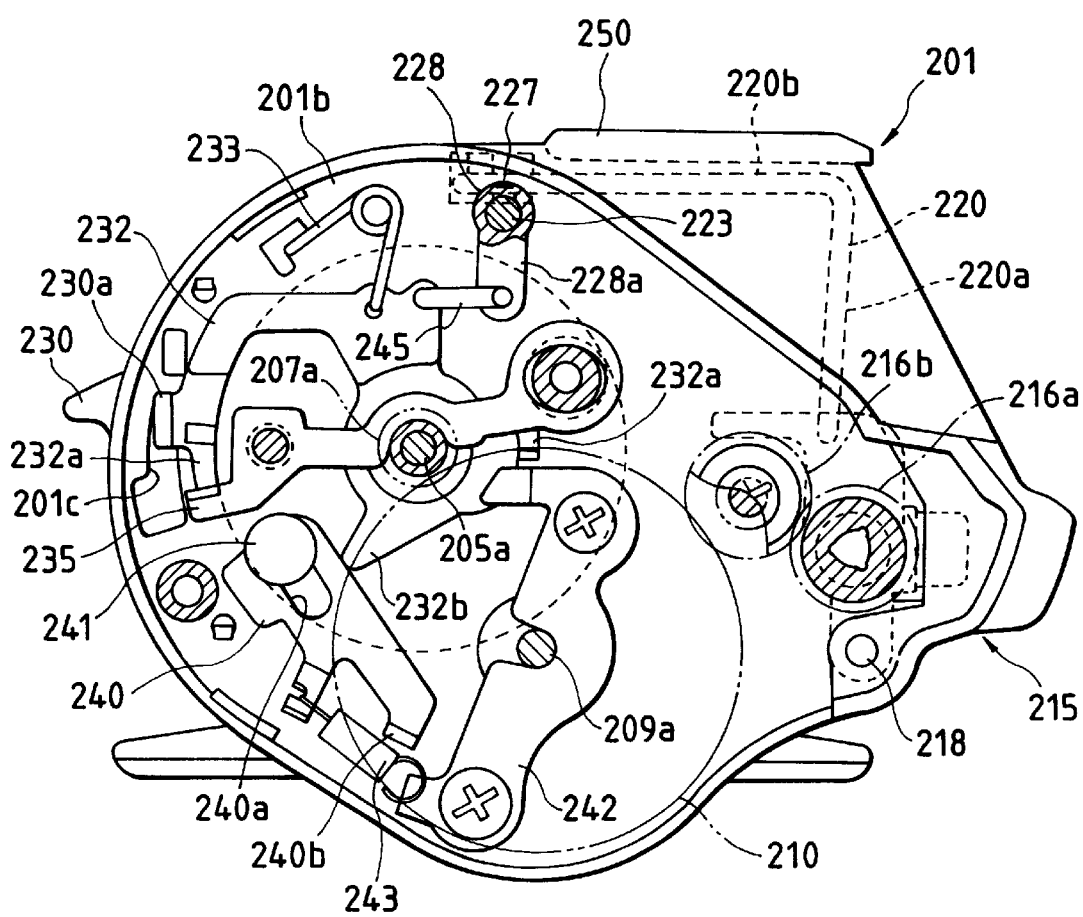
FIG. 36 is a section view of the double bearing type reel shown in FIG. 34, taken along the line IV—IV and showing the clutch-on state thereof.

Also, the pillar 223, in particular, the end portion thereof is integrally connected with a rotary body 228 through a screw 227, that is, the pillar 223 is structured in such a manner that it can be rotated clockwise by a given angle from its state shown in FIG. 36 by switching the clutch mechanism over to the clutch-off state which will be described below in detail.

Here, description will be given below of the structure of the clutch mechanism for switching the spool 205 between the fishline play-out state and fishline take-up state with reference to FIGS. 36 and 38.

The present clutch mechanism is structured in such a manner that, if the pinion 207 shown in FIG. 34 is moved toward the handle 209 side, then the pinion 207 is removed from its engagement with the spool shaft 205a so that the spool 205 can be rotated freely. That is, the spool shaft 205a includes a fitting portion with which the pinion 207 can be fitted when it is slided and thus, if the pinion 207 is fitted with the fitting portion of the spool shaft 205a, then the spool shaft 205a is rotated integrally with the pinion 207; and, on the other hand, when the spool shaft 205a is removed from its fitting engagement with the pinion 207, then the spool shaft 205a can be rotated freely. The movement of the pinion 207 toward the handle 209 side can be achieved by operating with a finger, a clutch operation member 230 which is interposed between the left and right side plates 203a and 203b on the rear side of the spool 205 in such a manner that it can be moved in the upward and downward directions.

In the right side surface of the clutch operation portion 230, there is formed a connecting portion 230a which projects through an elongated hole 201c formed in the right frame 201b. The connecting portion 230a is in engagement with a clutch plate 232 into which the spool shaft 205a is inserted and also which is supported in such a manner that it can be rotated about the spool shaft 205a. The clutch plate 232 includes a switch and hold spring 233 disposed between the right frame 201b and itself, whereby the clutch plate 232 can be switched between and held in a clutch-on state (fishline take-up state) shown in FIG. 36 and a clutch-off state (fishline play-out state) shown in FIG. 38.

On the other hand, the pinion 207 includes in the outer peripheral surface of the central portion thereof a circumferential groove 207a with which an operation plate 235 including two arm portions is fitted over the range of substantially 180°. The operation plate 235 is structured such that the two arm portions thereof are respectively supported on their respective shafts, while the operation plate 235 is normally energized by a pressure spring (not shown) so as to be in contact with the surface of the clutch plate 232. On the other hand, the clutch plate 232 includes in the peripheral end portion thereof a pair of cam surfaces 232a which are respectively formed as inclined surfaces and can be engaged with the two arm portions of the operation plate 235. That is, if the clutch plate 232 is rotated counterclockwise from its position shown in FIG. 36 by operating the clutch operation portion 230, then the operation plate 235 is lifted up in a direction perpendicular to the surface of the drawing or FIG. 36 due to the inclination of the cam surfaces 232a against the energizing force of the pressure spring. In response to this lift-up motion of the operation 235, the pinion 207 is slided to a position (a clutch-off state; see FIG. 38) where the pinion 207 is free to rotate with respect to the spool shaft 205a.

Next, description will be given below of a mechanism which switches the clutch mechanism from the clutch-off state over to the clutch-on state.

The position of the clutch operation member 230 is held in either of the clutch-off state or clutch-on state by the switch and hold spring 233. Therefore, if the clutch operation member 230 held at its pressed position is returned to its initial position, then the clutch mechanism is switched over to and held in the clutch-on state. The return of the clutch operation member 230 to the initial position can be achieved by operating such a switching member 240 as shown in FIG. 36 (of course, such return can also be attained by operating the clutch operation member 230 with a finger).

The switching member 240 is supported on the right frame 201b through a pin 241 provided in an elongated hole 240a formed in the switching member 240. On the middle portion of the switching member 240, there is mounted the other end of a tension spring 243 having one end fixed to a removal preventive member 242, while the tension spring 243 pulls and energizes the switching member 240 counterclockwise about the pin 241. Also, the switching member 240 includes in the leading end portion thereof an engaging projection portion 240b meshingly engageable with a ratchet (not shown) which is fitted with and fixed to the handle shaft 209a and is disposed adjacent to the drive gear 210.

The clutch plate 232 includes a projection 232b which can be contacted with the switching member 240. In particular, the switching member 240, in the clutch-on state shown in FIG. 36, is restricted by the projection 232b, that is, the rotation of the switching member 240 due to the tension spring 243 is restricted by the projection 232b; whereas, if the clutch plate 232 is rotated counterclockwise due to the pressing operation of the clutch operation member 230, then the restriction is removed so that the switching member 240 is rotated counterclockwise about the pin 241.

Figure 38:
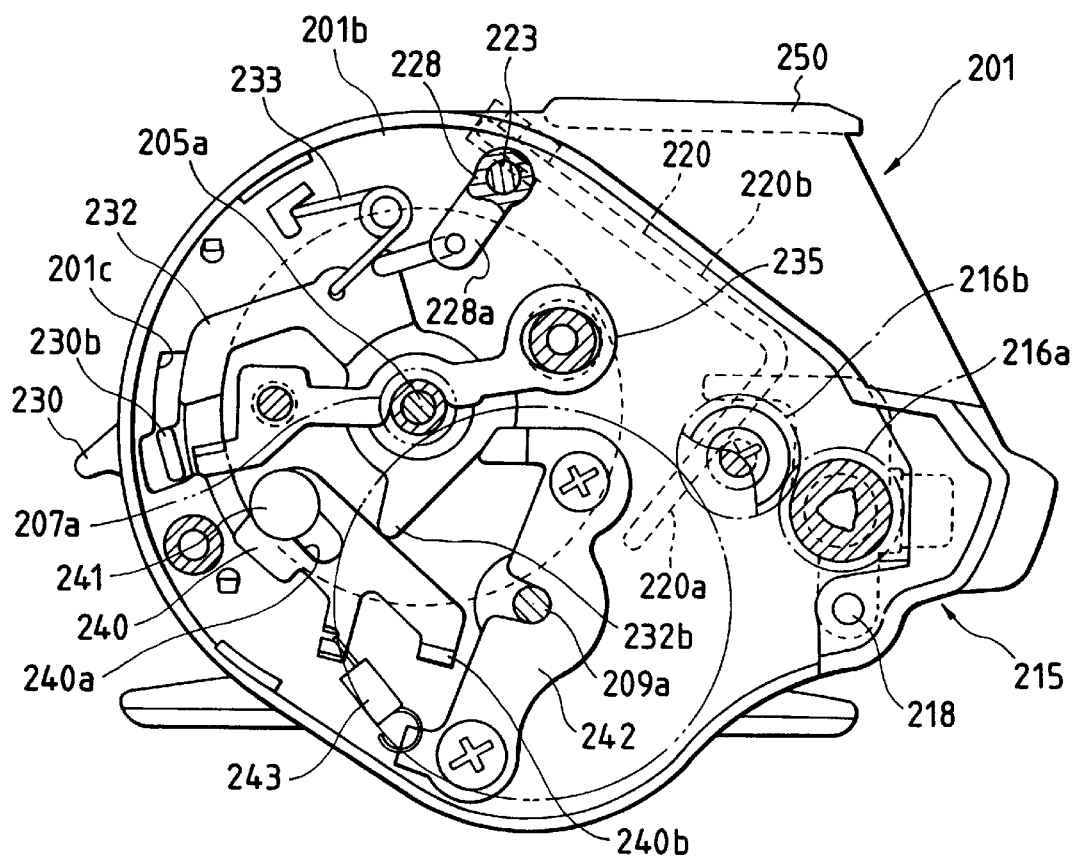
FIG. 38 is a section view of the double bearing type reel shown in FIG. 34, taken along the line IV—IV and showing the clutch-off state thereof.

Due to the counterclockwise rotation of the switching member 240, the engaging projection portion 240b is switched over to a state in which it is meshingly engageable with the ratchet (not shown) (that is, the clutch-off state; see FIG. 38). In this state, if the handle is operated to take up the fishline, then the ratchet is driven or rotated clockwise so that it pushes out the engaging projection portion 240b. As a result of this, the switching member 240 is rotated clockwise to thereby rotate the clutch plate 232 clockwise. And, when the clutch plate 232 is rotated clockwise to a certain degree, then the clutch mechanism is held in the clutch-on state shown in FIG. 36 due to the function of the switch and hold spring 233.

In this manner, the clutch mechanism can be switched from the clutch-off state over to the clutch-on state by means of the rotational operation of the handle 209 in the fishline take-up direction. By the way, the above-mentioned clutch mechanism and return mechanism are generally known and they can be changed or modified in a various manner.

According to the present embodiment, the pillar 223, which is used to support the above-mentioned fishline guide member 220, is structured such that it can be rotated through the pressing operation of the clutch operation member 230. That is, the clutch plate 232 is connected by a connecting bar 245 to an extension portion 228a which is formed integrally with the rotary body 228; and thus, by operating or pressing the clutch operation member 230 in the clutch-on state shown in FIG. 36, the pillar 223, as shown in FIG. 38, is rotated clockwise through the clutch plate 232 and connecting bar 245. As a result of this, the fishline guide member 220 supported by the pillar 223, due to the operation of the clutch operation member 230, is rotated from its state shown in FIG. 36 to its state shown in FIG. 38.

Next, description will be given below of the operation of the above-mentioned double bearing type reel.

Figure 39:
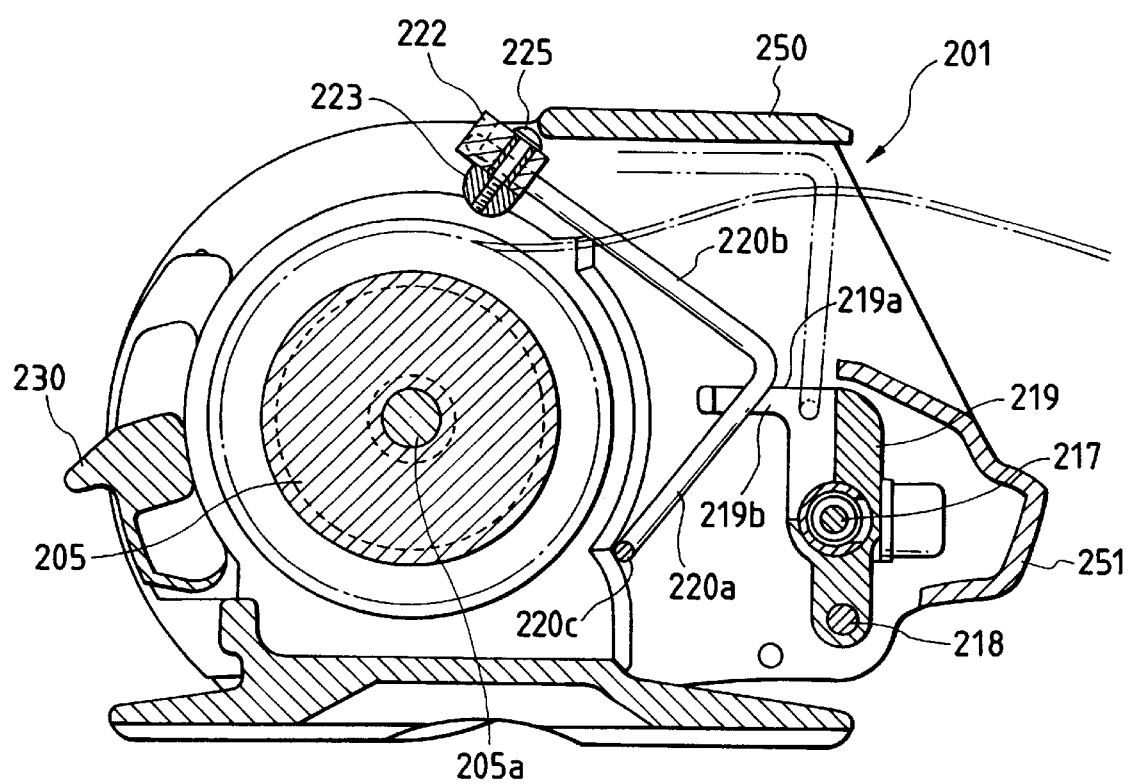
FIG. 39 is a section view of the double bearing type reel shown in FIG. 34, taken along the line V—V and showing the clutch-off state thereof.

From the fishline take-up state (clutch-on state) shown in FIGS. 34 to 37, if the clutch operation member 230 is operated or pressed, then the above-mentioned clutch mechanism is operated in such a manner as shown in FIG. 38, so that the spool 205 is switched over to its freely rotatable state (clutch-off state). Also, since the pillar 223 is also rotated in this operation, the fishline guide member 220 mounted on the pillar 223 is rotated because the fishline guide portion 220a of the fishline guide member 220, as shown in FIG. 39, inserted into the fishline guide body 219 deeply along the elongated hole 219b formed in the fishline guide body 219.

Figure 40:
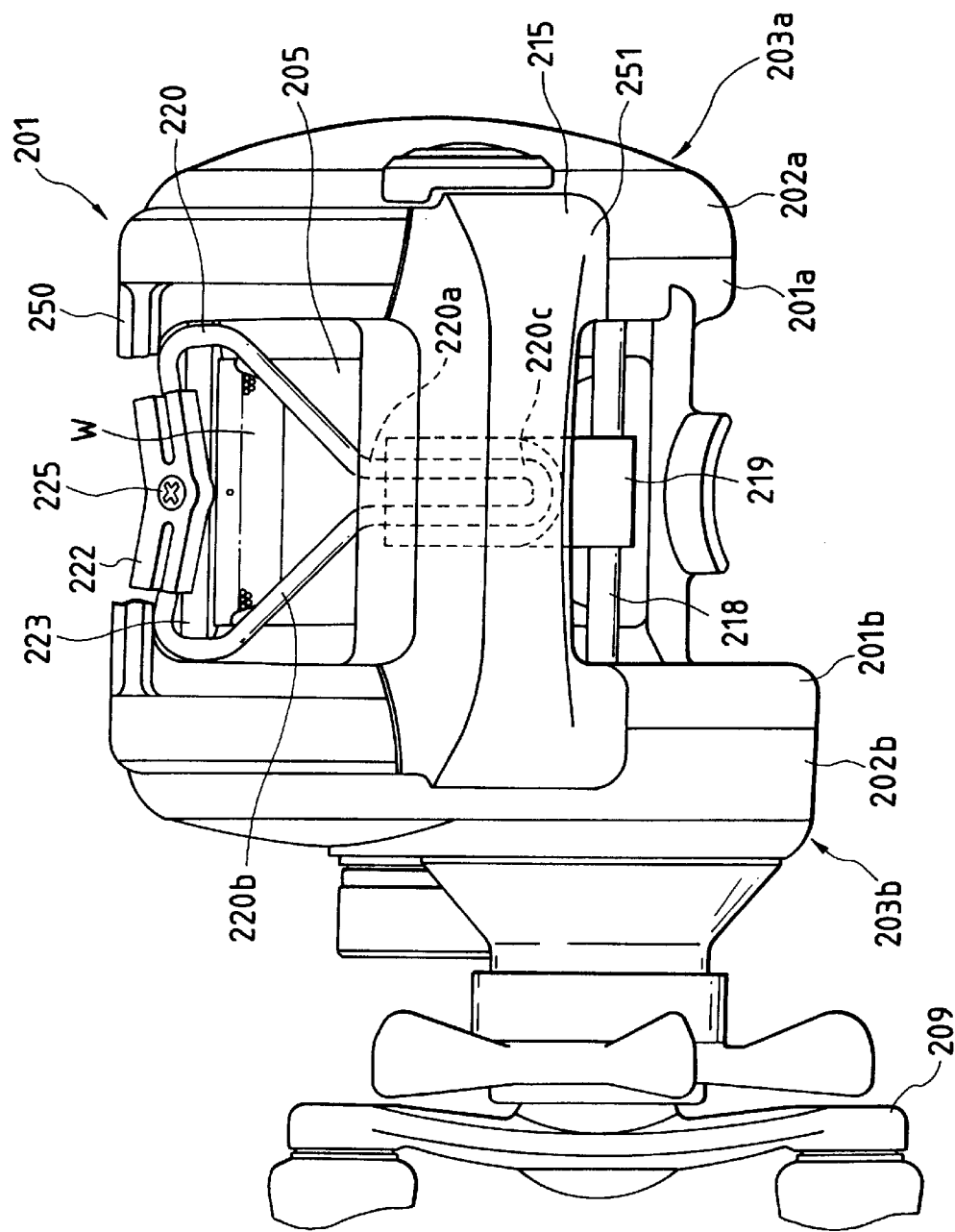
FIG. 40 is a front view of the double bearing type reel shown in FIG. 34, showing the clutch-off state thereof.
Figure 41:
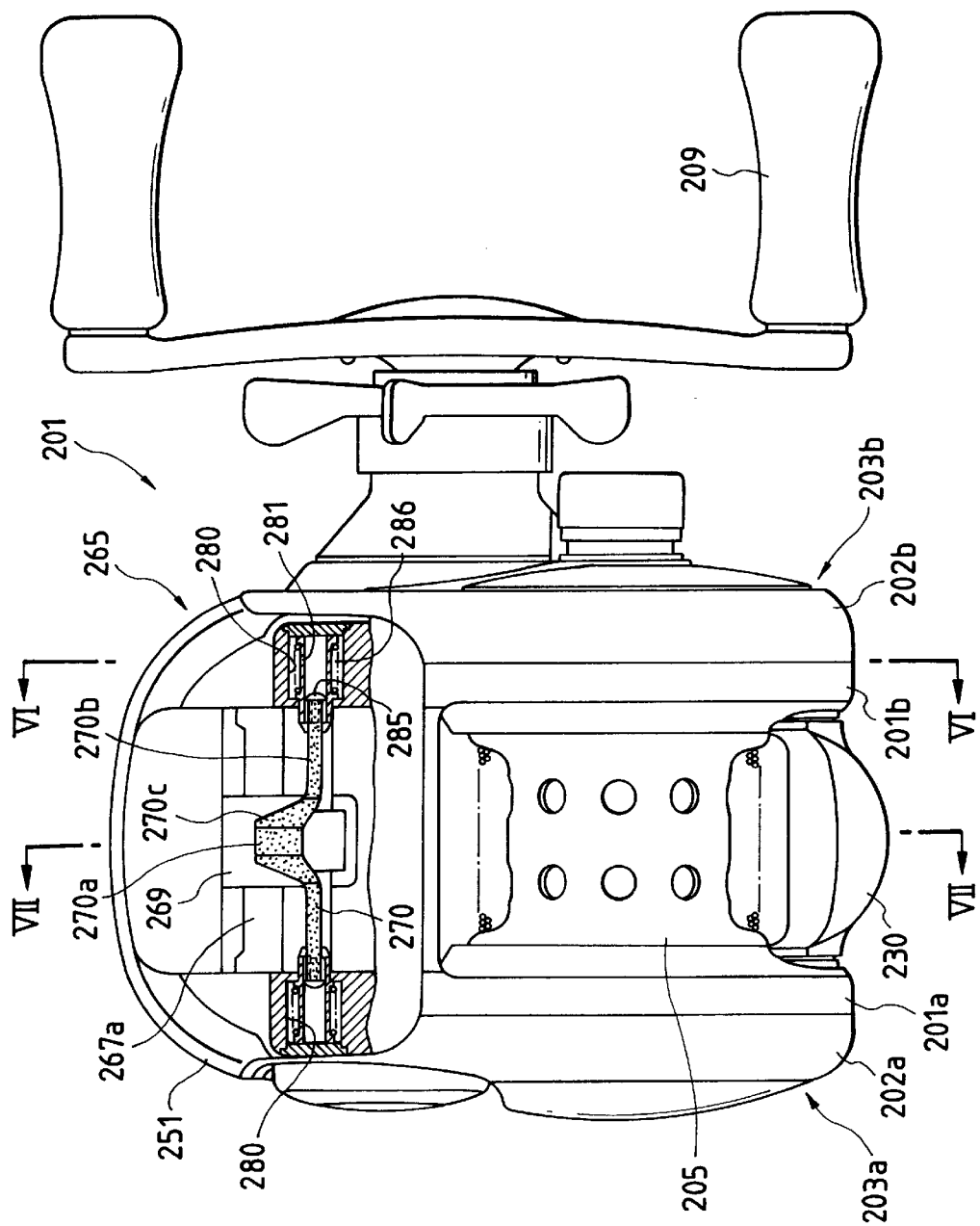
FIG. 41 is a plan view of a twelfth embodiment of a double bearing type reel according to the invention.

The fishline guide member 220 in the clutch-off state is rotated as shown in FIG. 40 and, in this state, the induction portion 220b having a shape spreading out gradually toward the spool side releases or opens the front portion of the spool 205 widely. The fishline wound around the spool 205 is played out through the induction portion 220b which holds the front portion of the spool 205 in a widely open state. In this case, preferably, the induction portion 220b, as shown in FIG. 40, when it is viewed from the front side thereof, may be formed in such a shape as can release or open substantially the whole of a fishline winding area W. With use of this shape, the fishline to be played out is prevented from touching at the induction portion 220b. That is, since the fishline does not receive any friction resistance at all when it is played out, not only the terminal tackles can be cast further longer but also the fishline can be prevented against damage when it is played out.

Further, after the terminal tackles are cast, the handle 209 is operated to take up the fishline. Through the take-up operation of the handle 209, as described above, the clutch mechanism is switched from the clutch-off state over to the clutch-on state. Due to this clutch switching operation, the fishline guide member 220 is rotated from the state shown in FIGS. 39 and 40 to the state shown in FIGS. 35 and 37. In this rotational operation, the fishline, which is enclosed by the induction portion 220b and is held in its free state, can be positively guided while it is in sliding contact with the induction portion 220b due to the rotation of the induction portion 220b, and can be induced to the fishline guide portion 220a of the fishline guide member 220.

On the other hand, since the bent portion 220c formed on the leading end side of the fishline guide portion 220a of the fishline guide member 220 is inserted deeply into the elongated hole 219 of the fishline guide body 219, in response to the take-up operation of the handle, the fishline guide portion 220*a* is rotated about the screw 225 of the support base seat 222 in an arc manner in front of the spool 205 due to the right and left reciprocating motion of the fishline guide body 219, so that the fishline can be wound uniformly around the spool 205. By the way, as described above, because the fishline guide portion 220*a* is arranged such that it has a length which enables itself to always guide the fishline wound around the spool 205, in the fishline take-up operation, the fishline is prevented from being displaced from the fishline guide portion 220*a*.

As described above, according to the present embodiment, in the fishline play-out operation, since no friction resistance is applied at all to the fishline to be played out, not only the casting distance of the terminal tackles can be enhanced but also it is possible to prevent the fishline against damage as well as prevent a backlash from occurring. Also, in the fishline take-up operation, simply by operating the handle 209 for taking up the fishline, the fishline can be positively induced to the fishline guide portion 220*a*, which eliminates the need to pick up the fishline by hand and induce it to the fishline guide portion 220*a*. Further, since the front portion of the spool 205 is held in a widely opened state, the fishline can be set more easily.

In the above-mentioned embodiment, because the fishline guide member 220 is a part which can be rotated, preferably, a cover member 250 for covering the fishline guide member 220 may be provided such that it is interposed between the left and right side plates 203*a* and 203*b*. Also, similarly, since the fishline guide body 219 is a part which can be moved right and left, preferably, a cover member 251 for covering the fishline guide body 219 from the front portion thereof may be provided such that it is interposed between the left and right side plates 203*a* and 203*b*.

Also, the shape of the fishline guide member 220 according to the above-mentioned embodiment is just an example; that is, the shape of the induction portion 220*b* thereof is not limited to the shown shape, but other shape can be employed, provided that, when the fishline guide member 220 is held in the fishline play-out state, in opening the front portion of the spool and moving the fishline guide member 220 from the fishline play-out state to the fishline take-up state, the induction portion 220*b* is able to induce the fishline held in the free state to the fishline guide portion 220*a*. For example, the induction portion 220*b* can be formed in a shape which, as in the above-mentioned embodiment, encloses the fishline completely when the fishline is played out, or a shape which encloses the fishline partially, or a shape which can reduce, to a certain degree, a friction applied to the fishline when the fishline is played out.

Further, in the above-mentioned embodiment, the fishline guide member 220 is structured such that it is supported to be rotatable with respect to the pillar 223 supported between the left and right side plates 203*a* and 203*b*. However, the fishline guide member 220 supporting method as well as the method for moving or switching the fishline guide member 220 between the fishline play-out and take-up states can also be changed in a various manner.

Now, description will be given below of a twelfth embodiment of a double bearing type reel according to the invention in which the shape and supporting method of the fishline member 220 of the eleventh embodiment are modified with reference to FIGS. 41 to 47. However, in the twelfth embodiment, with regard to the parts thereof which are identical in structure with those employed in the eleventh embodiment, such as the clutch mechanism for switching the spool between the fishline play-out and take-up states and the like, the detailed description thereof is omitted here.

Figure 42:
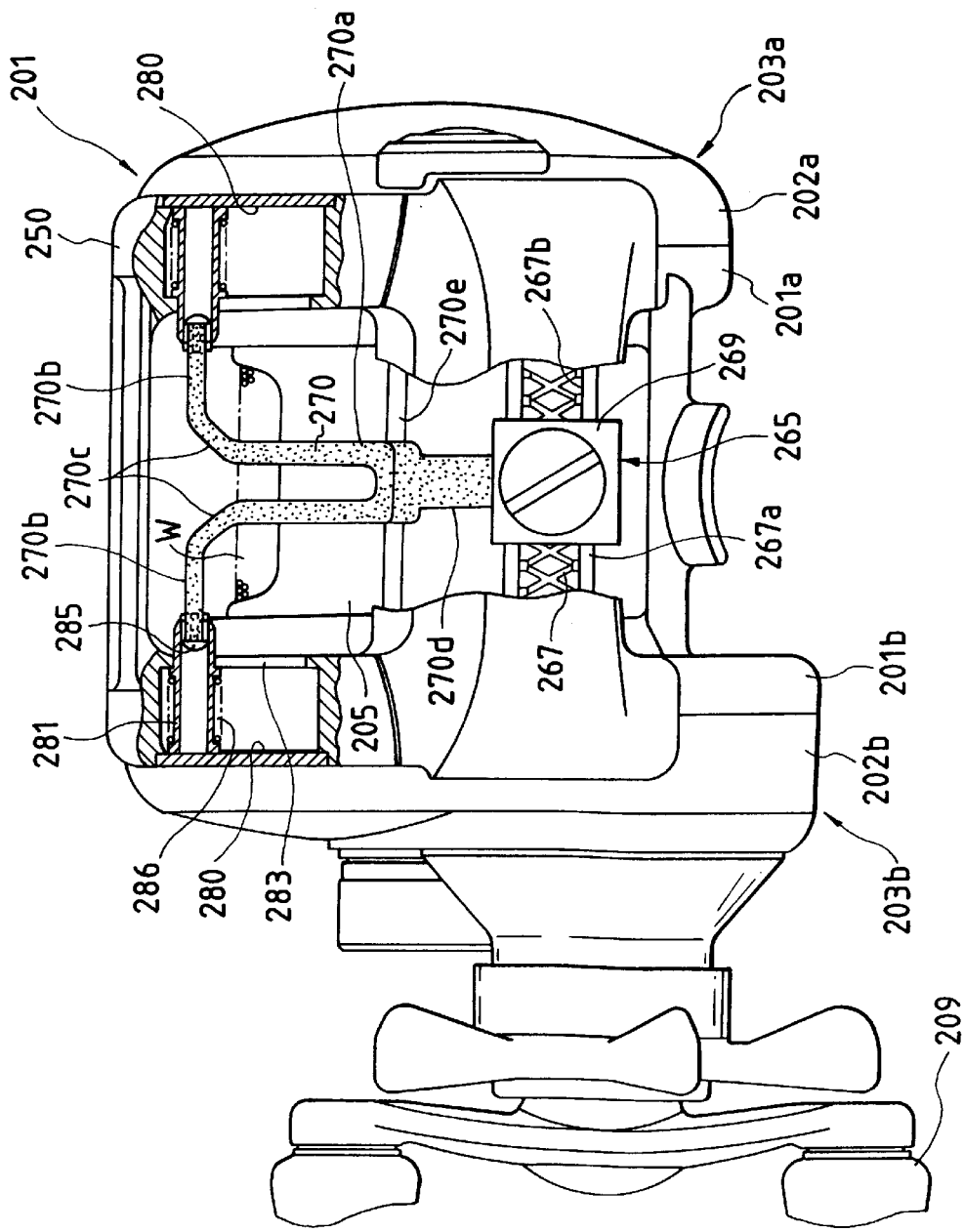
FIG. 42 is a front view of the double bearing type reel shown in FIG. 41.

In the present embodiment, there is employed a fishline guide device 265 which includes a fishline guide member 270. The fishline guide member 270, as shown in FIG. 42, includes a U-shaped fishline guide portion 270*a*, two arm portions 270*b* respectively extending in the horizontal direction from the upper end portion of the fishline guide portion 270*a*, and two induction portions (connecting portion) 270*c* which are respectively inclined from the respective arm portions 270*b* toward the fishline guide portion 270*a* in such a manner that they approach each other. The fishline guide device 265 further includes a traverse cam shaft 267 with which there is engaged a fishline guide member 269 so arranged as to reciprocate right and left due to the rotation of the traverse cam shaft 267. The fishline guide member 269 is supported between the left and right side plates 203*a* and 203*b* and is also held by a cylindrical member 267*a* storing the traverse cam shaft 267 therein, while the fishline guide member 269 is further in engagement with the above-mentioned traverse cam groove through an elongated hole 267*b* so formed in the cylindrical member 267*a* as to extend in the axial direction thereof.

Figure 44:
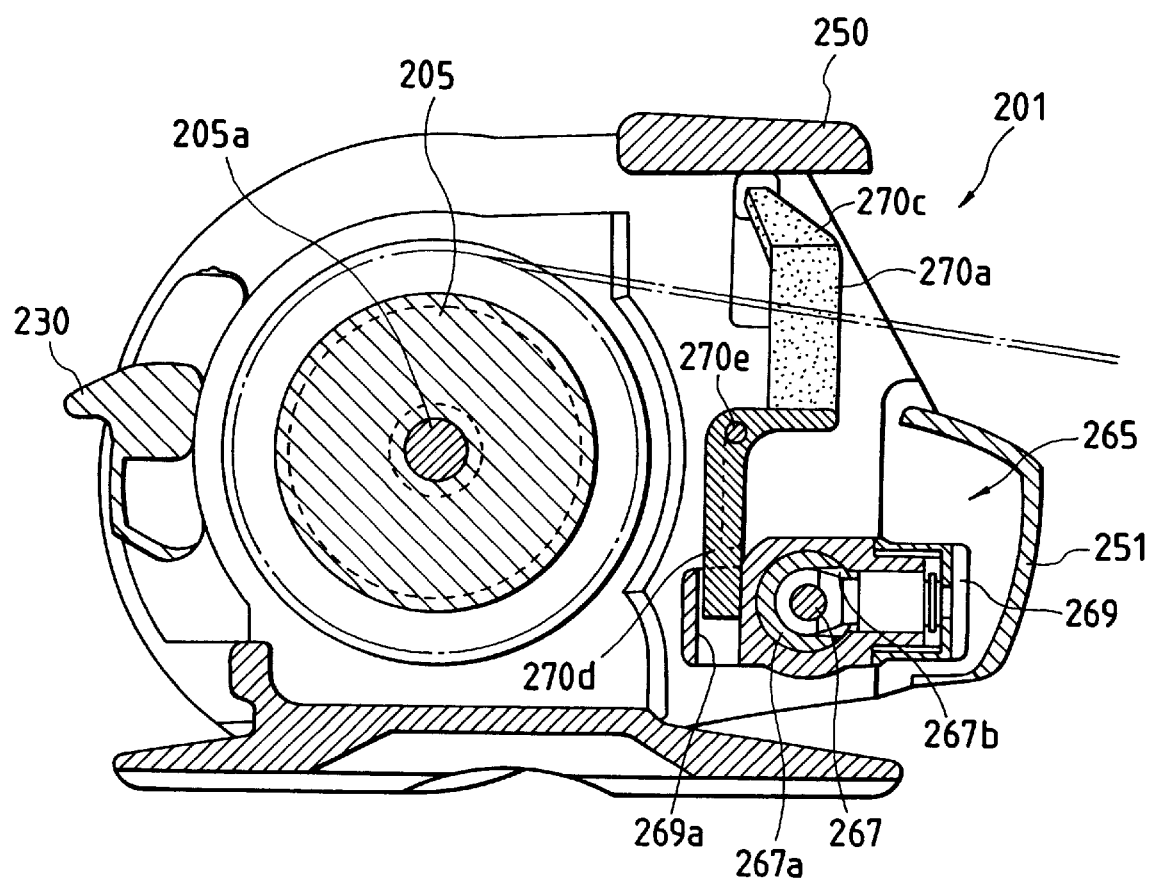
FIG. 44 is a section view of the double bearing type reel shown in FIG. 41, taken along the line VII—VII and showing the clutch-on state thereof.

The fishline guide body 269, as shown in FIG. 44, extends toward the spool 205 and includes, in the extending portion thereof, a through hole 269*a* which extends along the vertical direction thereof. In the upper end portion of the through hole 269*a*, there is slidably disposed a hold portion 270*d* with which the fishline guide portion 270*a* of the fishline guide member 270 is connected in an integral manner. Through the hold portion 270*d*, there is inserted a guide bar 270*e* which extends toward the left and right side plates, while the guide bar 270*e* is disposed in two elongated holes (although only one of them, that is, the elongated hole 201*e* of the right frame 201*b* is shown) which are respectively formed in the left and right frames 201*a* and 201*b* such that they extend in the vertical direction.

Figure 43:
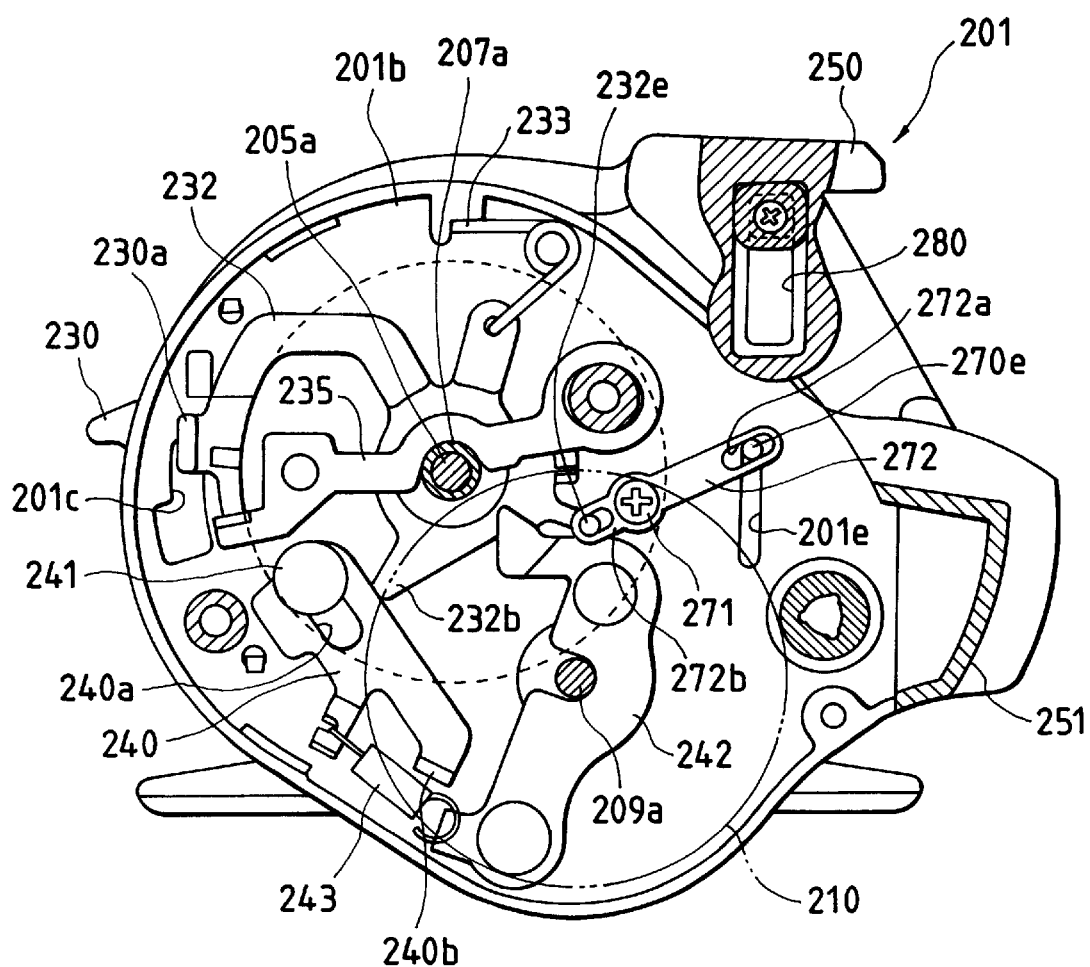
FIG. 43 is a section view of the double bearing type reel shown in FIG. 41, taken along the line VI—VI and showing the clutch-on state thereof.
Figure 45:
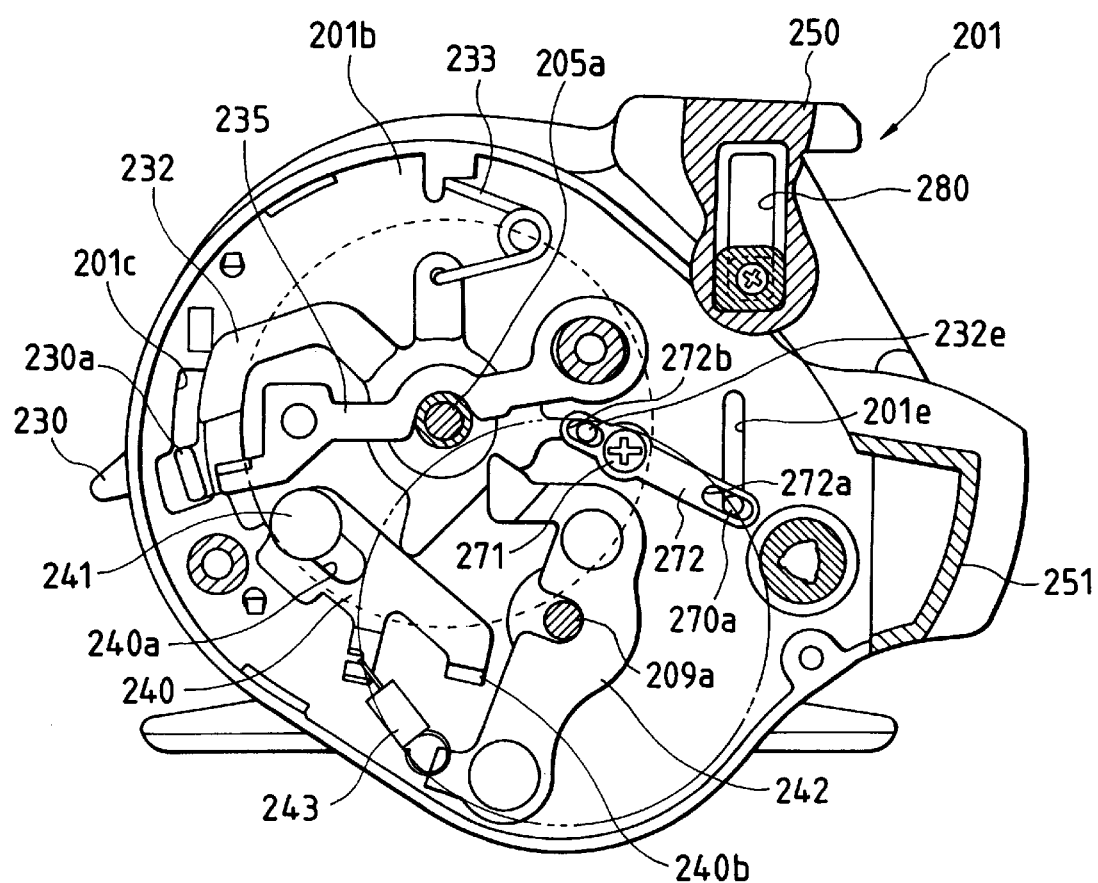
FIG. 45 is a section view of the double bearing type reel shown in FIG. 41, taken along the line VI—VI and showing the clutch-off state thereof.
Figure 46:
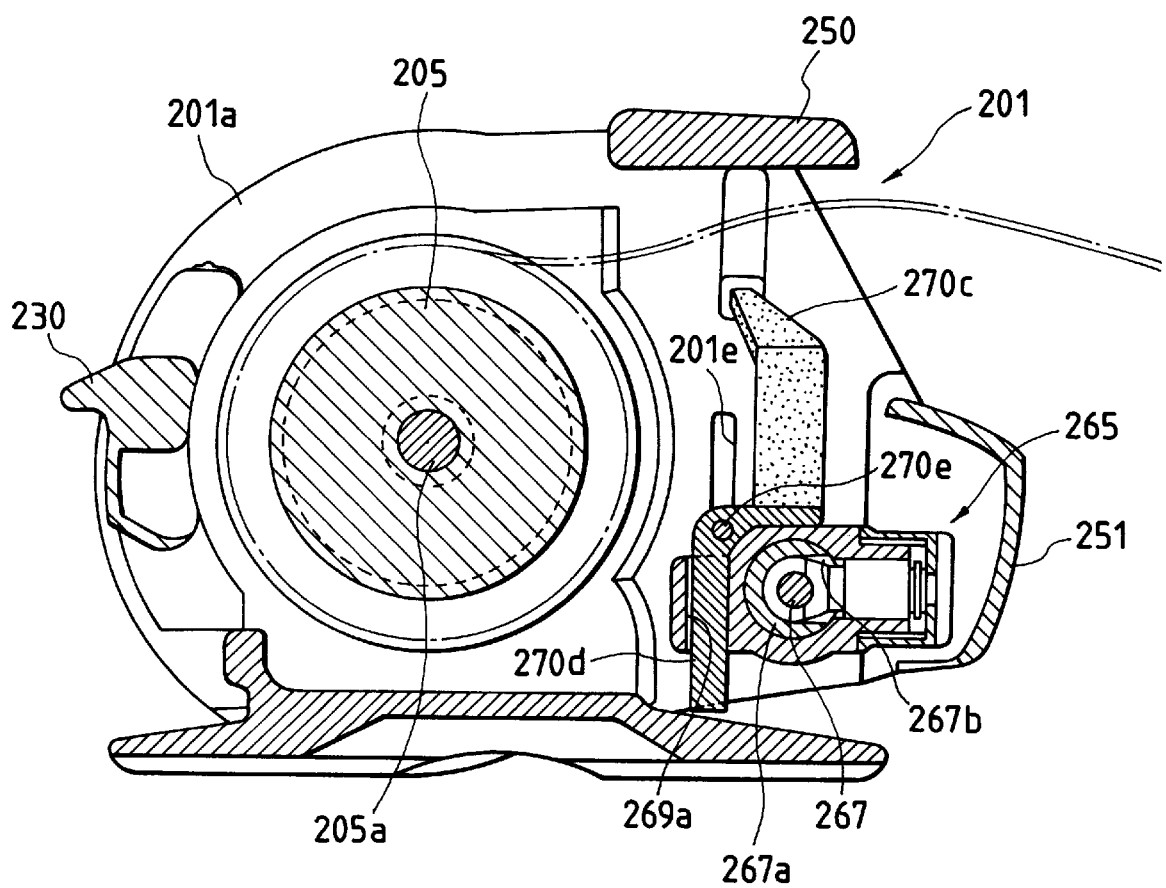
FIG. 46 is a section view of the double bearing type reel shown in FIG. 41, taken along the line VII—VII and showing the clutch-off state thereof.

A connecting member 272 is rotatably supported on the right frame 201*b* by a screw 271 and includes two elongated holes 272*a* and 272*b* respectively formed in the two end portions thereof, while the guide bar 270*e* and a pin 232*e* projectingly provided in the clutch plate 232 are in engagement with the elongated holes 272*a* and 272*b* respectively. As a result of this, the clutch operation portion 230 is operated and the clutch plate 232 is thereby rotated counterclockwise, so that the guide bar 270*e* is moved downwardly through the connecting member 272. That is, through the clutch-off operation, as shown in FIGS. 45 and 46, the hold portion 270*d* of the fishline guide member 270 is slided along the through hole 269*a* formed in the fishline guide body 269, so that the fishline guide member 270 is moved downwardly. By the way, if the clutch mechanism is switched over to the clutch-on state, then the fishline guide member 270 is moved in the upward direction, as shown in FIGS. 43 and 44.

Figure 47:
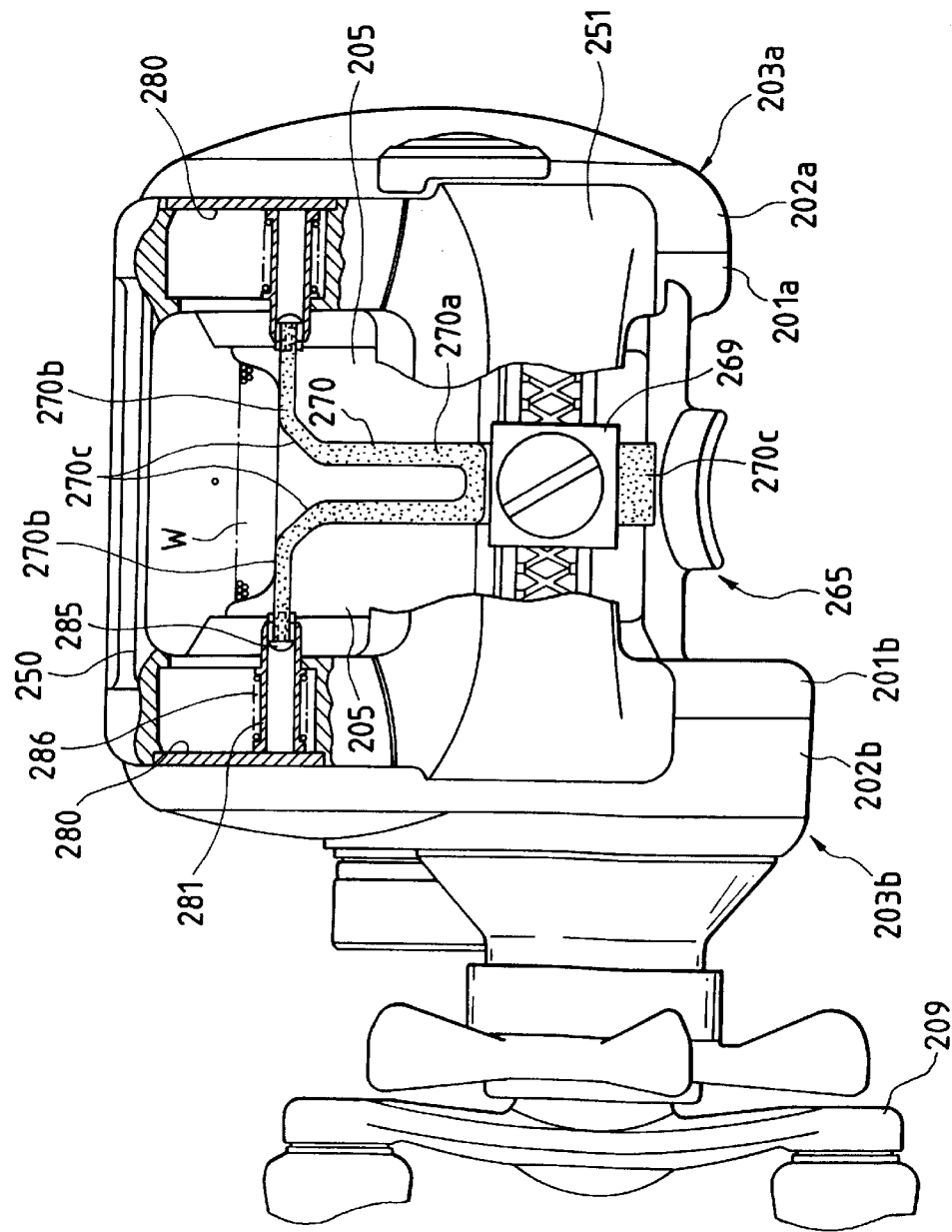
FIG. 47 is a front view of the double bearing type reel shown in FIG. 41, showing the clutch-off state thereof.
Figure 48A:
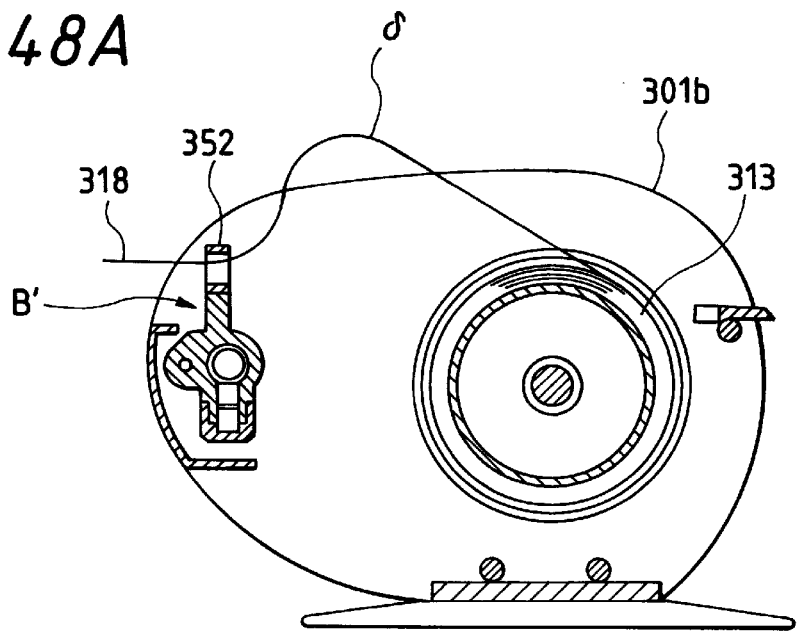
FIG. 48A is a sectional side view of the side frame inner side of a conventional double bearing type reel; and, FIG. 48B is a sectional plan view of the main portions of the conventional double bearing type reel.
Figure 48B:
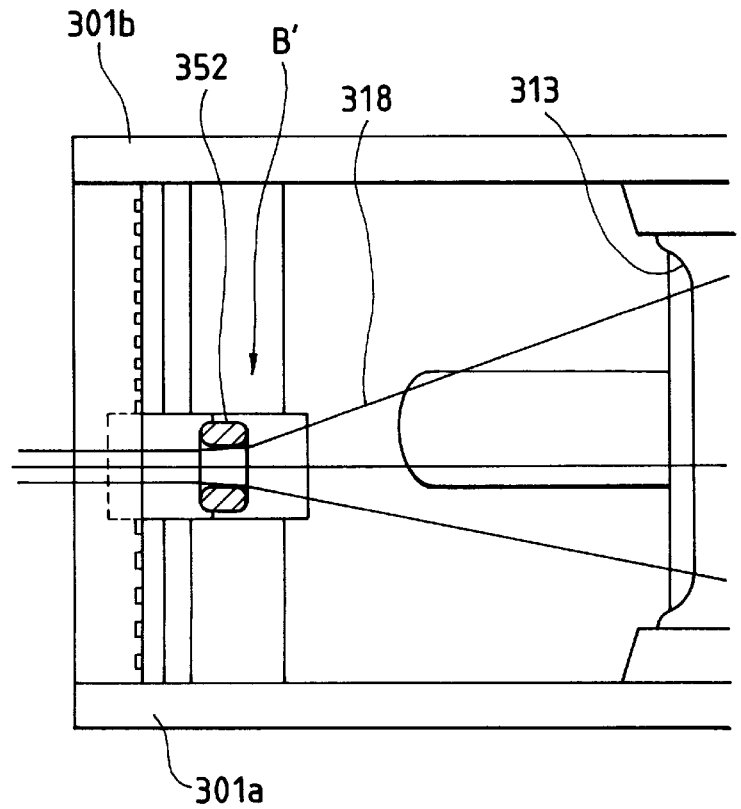

Preferably, the stroke of the vertical-direction motion of the fishline guide member 270 may be set as shown in FIGS. 42 and 47. That is, the stroke may be set in such a manner that, when the fishline guide member 270 is present at an upper position shown in FIG. 42, the fishline guide portion 270*a* can cover the fishline winding area W in the vertical direction and, when the fishline guide member 270 is present at a lower position shown in FIG. 47, the respective arm portions 270*b* of the fishline guide member 270 are situated below the fishline winding area W. With use of this structure, when the clutch mechanism is switched over to the clutch-off state, the whole front portion of the spool 205 can be opened and, when the clutch mechanism is switched over to the clutch-on state, the fishline held in the played-out state can be positively induced to the fishline guide portion 270a through the induction portions 270c.

Also, the two arm portions 270b of the fishline guide member 270 respectively extending toward the left and right side plates 203a and 203b are supported such that they can be moved in the vertical direction as well as in the right and left directions with respect to the left and right side plates 203a and 203b. Now, description will be given here of the means for supporting the two arm portions 270b of the fishline guide member 270. By the way, the supporting structures of the two arm portions are identical on the right and left directions and, therefore, description will be given below here of only the right side plate side structure with reference to FIGS. 41 to 43.

In the frame 201b and cover member 202b, there is formed a guide groove 280 which extends in the vertical direction thereof. Within the guide groove 280, there is disposed a collar 281 (expansion cylinder) which extends toward the central portion of the reel and is held such that it can be moved in the vertical direction. The leading end portion of the collar 281 projects out from an elongated hole 283 formed in the frame 201b so as to extend along the guide groove 280 and stores the arm portion 270b of the fishline guide member 270 in the interior portion thereof. By the way, the arm portion 270b can be slided within the collar 281 and is prevented against removal from the collar 281 by the head portion of a screw 285 (securing pin) fixed to the end face of the arm portion 270b. Also, between the base end portion of the collar 281 and the back surface of the cover 202b, there is interposed an energizing spring 286 for energizing the collar 281 which is pulled out from the elongated hole 283 due to the movement of the arm portion 270b in such a manner that the energizing spring 286 returns the collar 281 to its original position.

According to the above-mentioned structure, the two arm portions 270b of the fishline guide member 270 are supported by the collar 281 and guide groove 280 in such a manner that they can be moved in the vertical direction. Also, when the fishline guide member 270 is moved right and left, the two arm portions 270b are respectively slided within the collars 281 and, when the leading end of one of the two arm portions 270b is situated in the base end portion of its associated collar 281, the other arm portion 270b pulls out the leading end side of the other collar 281 by means of the head portion of the screw 285 provided therein. Due to this, the two arm portions 270b of the fishline guide member 270 are supported such that they can be moved in the right and left direction. By the way, the two arm portions 270b are structured such that, when they are moved right and left in this manner, the respective end portions thereof pull out the leading end sides of their respective collars 281 from the respective elongated holes 283, which makes it possible to secure the moving stroke in the right and left direction.

Next, description will be given below of the operation of the double bearing type reel according to the present embodiment.

From the fishline take-up state (clutch-on state) shown in FIGS. 41 to 44, if the clutch operation member 230 is operated or pressed down, then the clutch mechanism is operated in such a manner as shown in FIG. 45, so that the spool 205 is switched over to the freely rotatable state (that is, the clutch-off state). In this case, due to the rotation of the clutch plate 232 and the operation of the connecting member 272, the hold portion 270b is slided downwardly along the through hole 269a formed in the fishline guide body 269, so that the whole fishline guide member 270 can be moved downwardly.

When the clutch mechanism is held in the clutch-off state, the fishline guide member 270, as shown in FIGS. 46 and 47, is moved down to its lower position, and the two arm portions 270b of the fishline guide member 270 are situated downwardly of the fishline winding area W, thereby releasing or opening the front portion of the spool 205 widely. The fishline wound around the spool 205 is played out from the thus widely opened portion. The fishline to be played out from the widely opened portion cannot touch the fishline guide member 270 at all and, therefore, when it is played out, the fishline receives no friction resistance, which not only makes it possible to cast the terminal tackles further longer but also can prevent the fishline against damage when it is played out.

And, after the terminal tackles are cast, by operating the handle 209 for taking up the fishline, the clutch mechanism can be switched from the clutch-off state over to the clutch-on state. Due to this clutch mechanism switching operation, the fishline guide member 270 is moved from the state shown in FIGS. 46 and 47 to the state shown in FIGS. 42 and 44. At the then time, the fishline held in the free state can be guided positively by the induction portions 270c moving up from their lower positions to their upper positions, so that the fishline can be induced to the fishline guide portion 270a of the fishline guide member 70.

Due to the take-up operation of the handle 209, the fishline guide member 270 is reciprocatingly moved in the right and left direction through the fishline guide body 269, so that the fishline can be wound uniformly around the spool 205. By the way, as described above, since the fishline guide portion 270a covers the fishline winding area W in the fishline take-up operation, there is no possibility that, in the fishline take-up operation, the fishline can be displaced from the fishline guide portion 270a.

As described above, according to the present embodiment, similarly to the previously described twelfth embodiment, not only the casting distance of the terminal tackles can be enhanced, but also it is possible to prevent the fishline against damage and the occurrence of the backlash. Also, in the fishline take-up operation, simply by operating the handle 209 for taking up the fishline, the fishline can be induced positively to the fishline guide portion 270a. Further, the front portion of the spool 205 can be opened more widely than the previously described eleventh embodiment.

By the way, similarly to the previously described eleventh embodiment, preferably, cover members 250 and 251 may be disposed between the left and right side plates 203a and 203b respectively at a position above the fishline guide member 270 and at a position in front of the fishline guide body 269.

In the illustrated eleventh and twelfth embodiments, the fishline guide member 220, 270 is structured such that it can be moved due to the operation of the clutch operation portion 230 of the clutch mechanism. However, this is not limitative but, for example, the fishline guide member can also be structured such that it can be moved independently of the operation of the clutch operation portion 230.

Since the present invention is enforced in the above-mentioned manner, there can be provided the following effects.

According to the first to seventh embodiments of the invention, when the fishline is taken up, the fishline is guided by the small-width portion of a fishline guide hole formed in the fishline guide device to be wound parallel around the spool and, when the fishline is played out, the friction resistance of the fishline due to the upward spreading thereof can be reduced, which can enhance the casting distance of the terminal tackles, the life of the fishline and the efficiency of the fishline insertion operation.

Further, when the fishline is taken up, the fishline can be positively guided by the small-width portion of the fishline guide hole to thereby stabilize the passage of the fishline, so that the fishline can be wound around the spool in an excellent winding condition; and, at the same time, when the fishline is played out, the friction resistance of the fishline can be reduced, which in turn can improve the casting distance of the terminal tackles.

In addition, in the fishline play-out operation, even if the fishline is played out in such a manner that it spreads more widely in the upward direction than the flange outer peripheral diameter of the spool, the contact friction resistance of the fishline with respect to the inner surface of the fishline guide hole can be reduced, so that the casting distance of the terminal tackles as well as the life of the fishline can be improved.

In addition, according to the eighth to tenth embodiments of the invention, even if the fishline is played out in such a manner that it spreads out more widely than the outside diameter of the flange of the spool, the fishline can be released quickly and smoothly from the opening of the fishline guide portion of the fishline insertion member, that is, the fishline can be played out with as small as possible resistance, so that the carrying distance of the fishline can be increased. At the same time, when taking up the fishline once played out, the fishline, wherever it is situated, can be moved and guided automatically and smoothly to the fishline guide portion through the arm portions of the fishline insertion member, that is, the fishline can be surely prevented from dropping down into between the fishline insertion member and side plates, so that the fishline can be taken up smoothly and positively around the spool. In other words, according to the invention, a series of fishing operations from the play-out of the fishline to the take-up thereof can be carried out smoothly and easily, the twining and damage of the fishline can be prevented, and the durability of the fishline can be enhanced.

Especially, when the upper portion of the abovementioned fishline guide portion is formed as a fishline induction portion which spreads out wide in the upward direction, the upwardly releasing operation of the fishline from the fishline guide portion in the fishline play-out operation as well as the moving and guiding operation of the fishline to the fishline guide portion in the fishline take-up operation can be executed further smoothly and easily, which in turn can improve the carrying distance and durability of the fishline.

Also, when the arm portions of the fishline insertion member are movably supported within or on their respective side plates, not only the fishline can be moved and guided to the fishline guide portion stably and strongly, but also the fishline insertion member can be guided and held stably and strongly from both sides thereof between the two side plates. This can prevent both the fishline and fishline insertion member from being damaged due to shocks given thereto and, at the same time, this can prevent the twining of the fishline further positively.

Further, when the fishline insertion member and traverse cam shaft of the level wind device are disposed respectively before and behind the spool in such a manner that they are spaced from each other, the balance of the whole of the fishing reel can be kept, the space of the fishing reel can be used effectively, and seawater, dust and the like are prevented from attaching to the traverse cam shaft; and, at the same time, the strength of the fishline insertion member provided separately from the traverse cam shaft can be increased. This can improve the efficiency of the operation of the fishing reel as well as durability of the fishing reel.

In addition, when the arm portions of the fishline insertion member are formed in such a manner that they can be freely expanded and contracted, the reciprocating stroke of the fishline insertion member can be increased, and the fishline guide portion of the fishline insertion member can be positioned in such a manner that it is properly opposed to the whole length of the fishline winding width of the spool, thereby being able to wind the fishline around the spool parallel in order as well as to make the fishing reel compact.

According to the eleventh and twelfth embodiments of the invention, since, in the fishline play-out operation, no friction resistance from the fishline guide member can be applied to the fishline to be played out, not only the casting distance of the terminal tackles can be enhanced, but also the damage of the fishline as well as the occurrence of the backlash can be prevented.

Also, because, in the fishline play-out operation, the fishline is induced positively to the fishline guide portion of the fishline guide member, there is eliminated the need to pick up the fishline with a finger and guide it to the fishline guide portion, which makes it possible to carry out smoothly a series of fishing operations necessary to switch the fishline play-out operation over to the fishline take-up operation.

What is claimed is:

1. A double bearing type reel comprising:
   a reel main body having a pair of side plates;
   a spool rotatably supported between the side plates; and
   a fishline guide device reciprocatingly provided between the side plates extending in front of the spool, said fishline guide device winding a fishline parallel around the spool;
   wherein the fishline guide device includes a fishline guide portion defined by a fishline guide hole having a lower portion which guides the fishline in a fishline take-up state and an upper portion which guides the fishline in a fishline play-out state, the upper portion being larger in width than the lower portion; and
   wherein said fishline guide portion is movably mounted between said side plates and said fishline guide portion moves in response to a change from said fishline take-up state to said fishline play-out state.

2. A double bearing type reel according to claim 1, wherein the upper portion and the lower portion respectively have an uniform width in a substantially vertical direction, the width of the upper portion being larger than the width of the lower portion.

3. A double bearing type reel according to claim 1, wherein the fishline guide hole has a tapered connecting portion connecting between the upper portion and the lower portion.

4. A double bearing type reel according to claim 1, the spool has a pair of flange portions in both ends thereof, and a bottom portion of the lower portion is disposed adjacently to the height of an outer peripheral diameter of the flange portions of the spool in a substantially horizontal direction.

5. A double bearing type reel accoirding to claim 1, wherein said fishline guide portion is pivotally mounted between said side plates.

6. A double bearing type reel according to claim 1, wherein said fishline guide portion is engaged with said fishline guide device in said fishline take-up state and is disengaged from said fishline guide device in said fishline play-out state.

7. A double bearing type reel according to claim 1, wherein a plane defined by the upper portion is substantially parallel to a direction of said fishline in said fishline take-up state, and the plane defined by the upper portion intersects said direction of said fishline in said fishline play-out state.

8. A double bearing type reel according to claim 1, further comprising a clutch operator for switching between said fishline take-up state and said fishline play-out state, said clutch operator being mechanically linked to said fishline guide portion to induce movement of said fishline guide portion.

9. A double bearing type reel comprising:

a reel main body having a pair of side plates extending in substantially a vertical direction;

a spool rotatably supported between the side plates and having a pair of flange portions in both ends of the spool, said spool defining an axis extending in substantially a horizontal direction;

a fishline guide device reciprocatingly provided between the side plates extending in front of the spool, said fishline guide device winding a fishline parallel around the spool;

wherein the fishline guide device includes a fishline guide portion which is disposed above an outer periphery of the flange portion of the spool in said vertical direction, and further wherein the fishline guide portion is defined by a fishline guide hole having a small-width U-shaped portion opened upwardly in said vertical direction, and an upper portion communicating with the small-width portion and having a width larger than the small-width portion; and wherein said fishline guide portion is selectively displaceable from an elongated hole formed in said fishline guide device during operation of said double bearing type reel.

10. A double bearing type reel according to claim 9, wherein said fishline guide portion is pivotally mounted between said side plates and said fishline guide portion pivots in response to a change from said fishline take-up state to said fishline play-out state.

11. A double bearing type reel according to claim 9, wherein said fishline guide portion is engaged with said fishline guide device in said fishline take-up state and is disengaged from said fishline guide device in said fishline play-out state.

12. A double bearing type reel according to claim 9, wherein a plane defined by the upper portion is substantially parallel to a direction of said fishline in said fishline take-up state, and the plane defined by the upper portion intersects said direction of said fishline in said fishline play-out state.

13. A double bearing type reel comprising:

a reel main body having a pair of side plates;

a spool rotatably supported between the side plates;

a fishline guide device reciprocatingly provided between the side plates extending in front of the spool, said fishline guide device winding a fishline parallel around the spool, the fishline guide device including a fishline guide portion guiding the fishline right and left in a fishline take-up state, and an induction portion inducing the fishline released from the fishline guide portion in a fishline play-out state; and a clutch mechanism switching a driving of the spool between the fishline take-up and play-out states;

wherein the fishline guide device is responsive to a switching operation of the clutch mechanism, so that an orientation of the fishline guide portion with respect to the spool is changed when switching from the fishline take-up state to the fishline play-out state.

14. A double bearing type reel according to claim 13, wherein the induction portion is provided so as to spread out gradually from upper ends of the fishline guide portion toward a rear portion of the reel main body.

15. A double bearing type reel according to claim 13, wherein said fishline guide portion is pivotally mounted between said side plates and said fishline guide portion pivots in response to said switching operation from said fishline take-up state to said fishline play-out state.

16. A double bearing type reel according to claim 13, wherein said fishline guide portion is engaged with said fishline guide device in said fishline take-up state and is disengaged from said fishline guide device in said fishline play-out state.

17. A double bearing type reel according to claim 13, wherein a plane defined by the induction portion is substantially parallel to a direction of said fishline in said fishline take-up state, and the plane defined by the induction portion intersects said direction of said fishline in said fishline play-out state.

18. A double bearing type reel comprising:

a reel main body having a pair of side plates;

a spool rotatably supported between the side plates;

a fishline guide device reciprocatingly provided between the side plates extending in-front of the spool, said fishline guide device winding a fishline parallel around the spool; and a traverse cam shaft reciprocating the fishline guide device, wherein the fishline guide device includes a fishline guide portion having a substantially U-shape portion opened upwardly and supported to the reel main body, and a fishline guide main body provided in front of the spool and interlocking with a rotation of the traverse cam shaft, said fishline guide main body having a hole portion receiving a tip portion of the fishline guide portion, whereby the fishline guide portion is selectively movable into and out of the hole portion.

19. A double bearing type reel according to claim 18, further comprising:

a clutch mechanism switching a driving of the spool between the fishline take-up and play-out states, wherein the fishline guide device is responsive to a switching operation of the clutch mechanism, so that an orientation of the fishline guide portion is changed between the fishline take-up and play-out states.

20. A double bearing type feel according to claim 19, wherein the fishline guide portion is supported to the reel main body through an induction portion connecting with an upper end of the fishline guide portion.

21. A double bearing type reel according to claim 19, wherein said fishline guide portion is pivotally mounted between said side plates and said fishline guide portion pivots in response to said switching operation from said fishline take-up state to said fishline play-out state.

22. A double bearing type reel according to claim 18, wherein said fishline guide portion further comprises an upper portion extending from said U-shape portion, wherein a plane defined by the upper portion is substantially parallel to a direction of said fishline in said fishline take-up state, and the plane defined by the upper portion pivots with respect to said spool to thereby intersect said direction of said fishline in said fishline play-out state.

* * * * *